US012630256B2

(12) United States Patent
    Gil et al.

(10) Patent No.: US 12,630,256 B2
(45) Date of Patent: May 19, 2026

(54) FRONT SUSPENSION SYSTEM

(71) Applicant: Kangaroo Design Inc., Richmond Hill (CA)

(72) Inventors: Lahav Gil, Richmond Hill (CA); Ariel Gil, Richmond Hill (CA)

(73) Assignee: PERLINK, Richmond Hill (CA)

( * ) Notice: Subject to any disclaimer, the term of this patent is extended or adjusted under 35 U.S.C. 154(b) by 0 days.

(21) Appl. No.: 18/911,716

(22) Filed: Oct. 10, 2024

(65) Prior Publication Data

US 2025/0187698 A1      Jun. 12, 2025

Related U.S. Application Data

(60) Provisional application No. 63/609,120, filed on Dec. 12, 2023.

(51) Int. Cl.
    *B62K 25/24*      (2006.01)
    *B62K 25/04*      (2006.01)

(52) U.S. Cl.
    CPC ........ *B62K 25/24* (2013.01); *B62K 2025/045* (2013.01)

(58) Field of Classification Search
    CPC ........ B62K 2025/045; B62K 2025/048; B62K 25/16; B62K 25/22; B62K 25/24; B62K 25/04; B62K 25/08
    USPC ................................. 280/276, 277; D12/118
    See application file for complete search history.

(56) References Cited

U.S. PATENT DOCUMENTS

| | | | | | |
|---|---|---|---|---|---|
| 4,186,936 | A | * | 2/1980 | Offenstadt | ............. B62K 25/16 280/277 |
| 4,212,481 | A | * | 7/1980 | Ribi | ........................ B64C 25/10 280/277 |
| 4,531,755 | A | * | 7/1985 | Isono | ..................... B62K 21/02 280/277 |
| 4,533,153 | A | * | 8/1985 | Tsunoda | .................... B62L 1/00 280/277 |
| 4,570,963 | A | * | 2/1986 | Isono | ..................... B62K 25/24 280/277 |
| 5,299,820 | A | * | 4/1994 | Lawwill | .................. B62K 25/24 280/277 |
| 5,749,590 | A | * | 5/1998 | Roerig | ................... B62K 25/24 280/276 |
| 5,931,487 | A | * | 8/1999 | Koppelberg | ........... B62K 25/24 280/124.105 |
| 6,036,211 | A | * | 3/2000 | Nohr | ...................... B62K 25/24 280/277 |
| 6,783,140 | B1 | * | 8/2004 | Huang | ................... B62K 25/24 280/276 |
| 6,896,276 | B1 | * | 5/2005 | Sparrow | ................ B62K 25/08 280/283 |
| 7,210,695 | B2 | * | 5/2007 | Griffiths | ................. B62K 25/18 280/283 |
| 11,654,998 | B2 | * | 5/2023 | Dunlap, III | ............ B62K 25/18 280/276 |

(Continued)

FOREIGN PATENT DOCUMENTS

WO          WO-9935028 A1 * 7/1999 ........... B62K 21/005

*Primary Examiner* — Anne Marie M Boehler

(74) *Attorney, Agent, or Firm* — STETINA GARRED BRUCKER & NEWBOLES

(57)          ABSTRACT

A front suspension system, which may be advantageously used in a bicycle, has a forked design comprising a plural-linkage configuration to achieve a compact suspension for the front wheel. The linkage includes rigid link arms and flexible link arms.

19 Claims, 34 Drawing Sheets

(56) References Cited

U.S. PATENT DOCUMENTS

| | | | |
|---|---|---|---|
| 2015/0137476 A1 * | 5/2015 | Nesbitt, III | B62K 21/02 |
| | | | 280/276 |
| 2024/0270343 A1 * | 8/2024 | Weagle | B62K 25/24 |
| 2024/0326950 A1 * | 10/2024 | Alcoverro | B62K 25/286 |

* cited by examiner

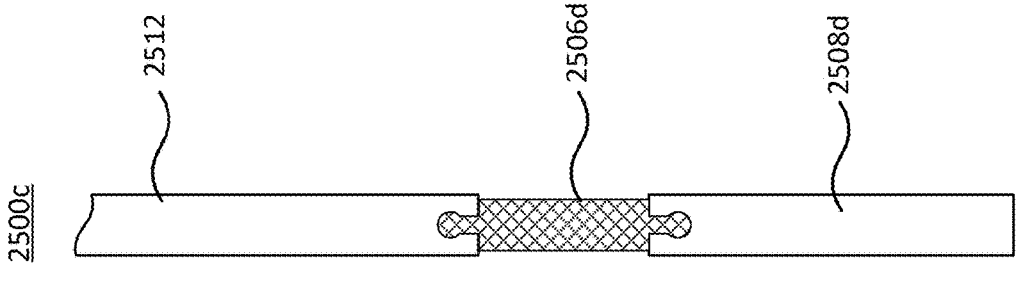
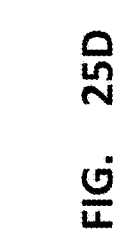
FIG. 25D
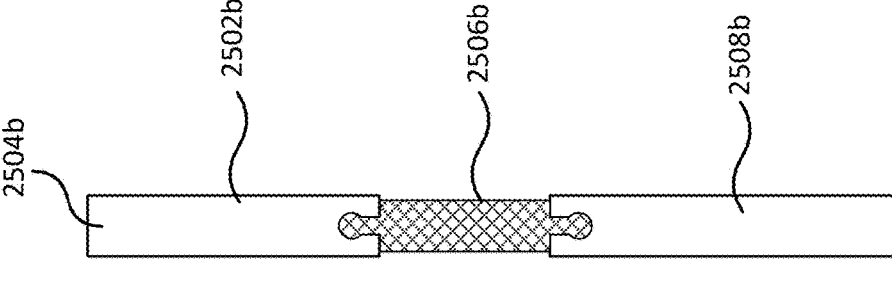
FIG. 25C
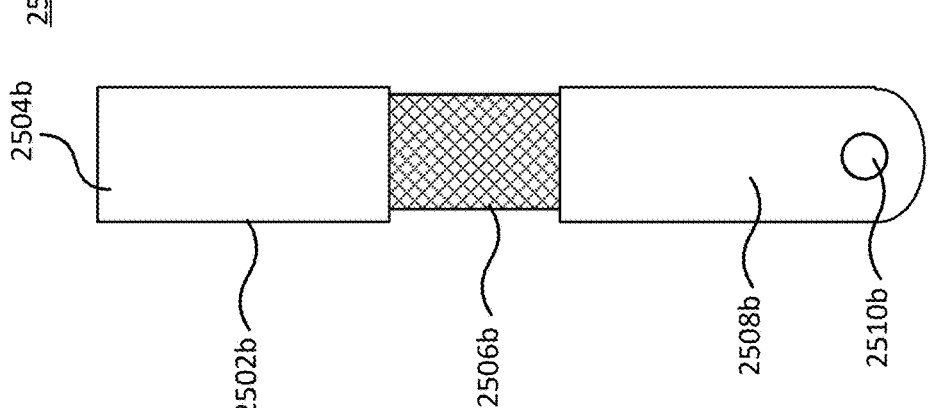
FIG. 25B
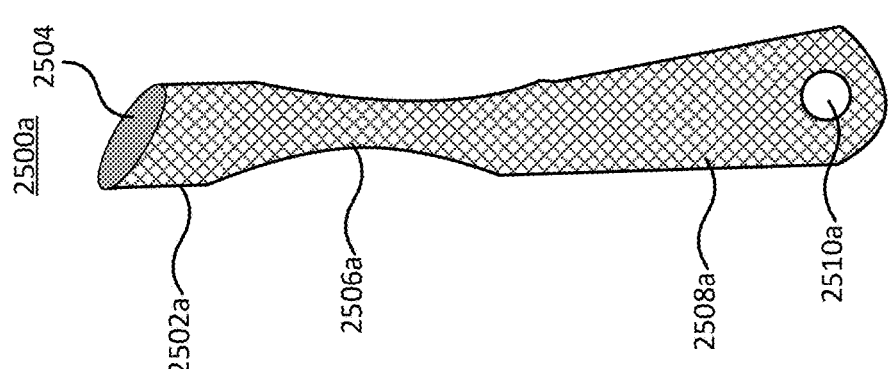
FIG. 25A

2700

2800

1102

1102

2908

1102

2908

3000

3006

3008

3014

3012

3010

3022

3016

3100

3200

3206

3208    3214

3212

3210

3222

3216

3402

3404

FRONT SUSPENSION SYSTEM

RELATED APPLICATIONS

The current application claims priority to US Provisional Application 63/609,120, titled "Front Suspension System," filed Dec. 12, 2023, the entire contents of which are incorporated herein by reference in their entirety for all purposes.

TECHNICAL FIELD

The present disclosure relates to suspension systems, and in particular to a front suspension system for a bicycle.

BACKGROUND

Traditional front suspension systems for bicycles use a telescopic shaft and piston design to achieve vertical motion, referred to as travel that is modulated by a coil/air spring and viscous damper. A traditional telescopic suspension incorporates a fork, or inverted "Y" shaped structure, with a single vertical steering tube and two lower legs connected with a lateral bridge. The telescopic shafts are part of the lower legs and acts as a load-bearing member for attaching the front wheel to the main frame and as well as permitting linear motion for absorbing shocks. The telescopic forks are typically arranged in-line with the steering axis, which is usually at about 62-67 degrees from horizontal, although a wide range of angles are possible.

During a ride, the fork is subject not only to vertical loads, but also lateral, longitudinal, and torsional, about the steering axis, loads. With a telescopic element, the bushings are subject to irregular loading, which adds friction. Ideally, the bushings should be experiencing no load during axial displacement. Instead, the traditional fork designs are subject to unwanted static and sliding friction. A consequence of the static friction, including friction from air spring seals, is that there is a threshold of force below which the fork is not activated, and a consequence of the dynamic sliding friction is that there is a bump frequency threshold above which the fork is insensitive, or unreactive. These consequences mean that large, low-frequency bumps, such as for example a speedbump, rock, or drop, will be absorbed, however small, high-frequency bumps like cobblestone that cause "chatter" will not be absorbed and the vibration will transfer to the rider's hands resulting in discomfort, pain, and a reduction in control/confidence, as well as reduced tire grip in the terrain.

Alternative designs for front suspensions have been devised using various arrangements of shocks and arms that attempt to overcome one or more of the downsides of traditional front suspensions. However these designs often have a radically different appearance compared to traditional fork suspensions, or have had other shortcomings resulting in user reluctance to purchase. Additionally, the wheel travel path of these different systems can differ from the in-line linear motion of the traditional fork suspension. Such differences in the wheel travel can be challenging for riders used to the more typical front suspension travel.

Accordingly, an additional, alternative, and/or improved front suspension system for a bike remains highly desirable.

SUMMARY

In accordance with the present disclosure there is provided a front suspension for a bike capable of moving between an extended position and a compressed position, comprising: a first main fork support for rotatably coupling the front suspension to a steering tube of the bike, the first main fork support having a longitudinal axis; a first linkage connected to the first main fork support comprising: a wheel arm comprising a support opening for supporting a wheel of the bike; an upper link arm having a first end portion pivotally coupled to the first main fork support at a upper link connection point and a second end portion pivotally coupled to the wheel arm at a connection point arranged at an end of the wheel arm opposite the support opening, an upper link axis defined between the first end portion and the second end portion arranged at an angle within 30° of the longitudinal axis of the first main fork support when the front suspension is in the extended position; and a lower link arm having a first end portion pivotally coupled to the first main fork support at a lower link connection point below the upper link connection point and a second end portion pivotally coupled to the wheel arm between the support opening and the connection point of the upper link arm, wherein; and a shock absorber configured to dampen vertical movement of the support opening.

In a further embodiment of the front suspension system, the upper link axis is arranged at an angle within 15° of the longitudinal axis of the first main fork support when the front suspension is in the extended position.

In a further embodiment of the front suspension system, the upper link axis is arranged at an angle within 5° of the longitudinal axis of the first main fork support when the front suspension is in the extended position.

In a further embodiment of the front suspension system, the lower link arm has a distance between pivot connections of less than ¾ a distance between pivot connections of the upper link arm.

In a further embodiment of the front suspension system, the lower link arm has a distance between pivot connections of less than ½ a distance between pivot connections of the upper link arm.

In a further embodiment of the front suspension system, the support opening is offset in front of a center longitudinal axis of the steering tube by between 0 cm and 10 cm.

In a further embodiment of the front suspension system, the support opening is offset in front of a center longitudinal axis of the steering tube by between 1 cm and 5 cm.

In a further embodiment of the front suspension system, the first main fork support, upper link arm and lower link arm are arranged to be approximately co-linear when viewed from a side to provide a low-profile appearance.

In a further embodiment of the front suspension system, the upper link arm, lower link arm and wheel arm are arranged to provide movement of the support opening of the wheel arm that is approximately parallel to the longitudinal axis of the first main support fork when the front suspension system moves between the extended position and the compressed position.

In a further embodiment of the front suspension system, the upper link arm, lower link arm and wheel arm are arranged to provide an arced movement of the support opening of the wheel arm that is non-parallel to the longitudinal axis of the first main support fork when the front suspension system moves between the extended position and the compressed position.

In a further embodiment of the front suspension system, the non-parallel movement has an arc shape.

In a further embodiment of the front suspension system, the shock absorber further provides a returning spring force.

In a further embodiment of the front suspension system, the shock absorber is at least partially housed within the first main fork support.

In a further embodiment of the front suspension system, the shock absorber comprises: a first end coupled to first main fork support or the upper link arm; and a second end coupled to wheel arm or the lower link arm.

In a further embodiment of the front suspension system, the shock absorber is connected to the first main fork support at the pivotal connection to the upper link arm and is connected to the wheel arm at a location between the pivotal connections of the upper link arm and lower link arm.

In a further embodiment of the front suspension system, the front suspension system further comprises: a second main fork support; and a second linkage connected to the second main fork support comprising: a second wheel arm comprising a support opening; a second upper link arm having a first end portion pivotally coupled to the second main fork support at an upper link connection point and a second end portion pivotally coupled to the second wheel arm at a connection point arranged at an end of the second wheel arm opposite the support opening; and a second lower link arm having a first end portion pivotally coupled to the second main fork support at a lower link connection point below the upper link connection point and a second end portion pivotally coupled to the second wheel arm between the support opening and the connection point of the second upper link arm.

In a further embodiment of the front suspension system, the shock absorber further comprises: a first portion at least partially housed within the first main fork support to dampen the vertical movement of the support opening; a second portion at least partially housed within the second main fork support to provide a returning spring force.

In a further embodiment of the front suspension system, each of the pivotal connections comprise one or more bushings and ball bearings.

In a further embodiment of the front suspension system, the first main fork support is coupled to the steering tube of the bike by a steerer tube attached to the first main fork.

In a further embodiment of the front suspension system, the second main fork support is attached to the steerer tube.

In a further embodiment of the front suspension system, a location of the pivotal connection between the wheel arm and the lower link arm is adjustable.

In a further embodiment of the front suspension system, the pivotal connection between the wheel arm and the lower link arm comprises a bushing arranged in one of the wheel arm and the lower link arm, the bushing having an offset hole such that flipping the bushing adjusts the location of the pivotal connection.

In a further embodiment of the front suspension system, a location of the support opening of the wheel arm is adjustable to vary a distance between the support opening and a centerline of the first main support fork.

In a further embodiment of the front suspension system, the front suspension system further comprises: a brake arm supporting a brake caliper pivotally connected to the wheel arm; and a brake rod coupled to the brake arm and the upper linkage arm.

In a further embodiment of the front suspension system, a length of the brake rod is adjustable to change a braking location of the brake caliper in order to provide anti-dive functionality.

In a further embodiment of the front suspension system, the length of the brake rod is dynamically adjustable using one or more of: a servo; an actuator; a damper and spring; and a shock absorber In a further embodiment of the front suspension system, a location of the connection of the brake rod to the brake arm is adjustable.

In a further embodiment of the front suspension system, the connection of the brake rod to the brake arm comprises a bushing arranged in one of the brake rod and the brake arm, the bushing having an offset hole such that flipping the bushing adjusts the location of the connection.

In accordance with the present disclosure there is further provided a kit for a front suspension of a bike, the front suspension to be used with a shock absorber, the kit comprising: a first main fork support for rotatably coupling the front suspension to a steering tube of the bike, the first main fork support having a longitudinal axis and comprising: an upper connection point; and a lower connection point; a wheel arm comprising: a support opening for supporting a wheel of the bike; an upper connection point arranged at an end of the wheel arm opposite the support opening; and a lower connection point arranged between the support opening and the upper connection point; an upper link arm comprising: an upper connection point for pivotally connecting to the upper connection point of the first main fork; a lower connection point for pivotally connecting to the upper connection point of the wheel arm, wherein an upper link axis defined between the upper connection point and the lower connection point is arranged at an angle within 30° of the longitudinal axis of the first main fork support when the front suspension is in the extended position; and a lower link arm comprising: an upper connection point for pivotally connecting to the lower connection point of the first main fork; and a lower connection point for pivotally connecting the lower link arm to the lower connection point of the wheel arm.

In a further embodiment of the kit, the kit further comprises: a brake arm supporting a brake caliper, the brake arm comprising a connection point for pivotally connecting to the wheel arm; and a brake rod for connecting to the brake arm and the upper linkage arm.

In a further embodiment of the front suspension system, a length of the brake rod is adjustable to change a braking location of the brake caliper in order to provide anti-dive functionality.

In accordance with the present disclosure there is further provided a bike comprising a front suspension system of any of the embodiments described above.

In accordance with the present disclosure there is further provided a suspension system comprising: a main support; a linkage connected to the main support comprising: a support arm comprising a mounting point for connecting to an element being controlled by the suspension system; an upper link arm having a first end portion pivotally coupled to the main support at a upper link connection point and a second end portion pivotally coupled to the support arm at the mounting point of the support arm arranged at an end of the support arm opposite the mounting point to the support arm; and a lower link arm having a first end portion pivotally coupled to the main support at a lower link connection point below the upper link connection point and a second end portion pivotally coupled to the support arm between the mounting point and the connection point of the upper link arm; and a shock absorber configured to dampen movement of the mounting point, the shock absorber arranged at least partially within the main support and the upper link arm when the suspension system is extended, wherein the front suspension is arranged to provide movement of the mounting point of the support arm in a direction approximately parallel to the main support.

In accordance with the present disclosure there is further provided a front suspension for a bike capable of moving between an extended position and a compressed position, comprising: a first main fork support for rotatably coupling the front suspension to a steering tube of the bike, the first main fork support having a longitudinal axis; a first linkage connected to the first main fork support comprising: a wheel arm comprising a support opening for supporting a wheel of the bike; an flexible link comprising a flexible member, the flexible link coupled to the first main fork support at a flexible link connection location, the flexible link further comprising a connection to the wheel arm, the flexible link arranged with a longitudinal axis of the flexible link at an angle within 30° to the longitudinal axis of the first main fork support when the front suspension is in the extended position; and a lower link arm comprising a first end portion coupled to the first main fork support at a lower link connection point of the first main fork support and a second end portion coupled to the wheel arm between the support opening and the pivotal connection to the flexible link; and a shock absorber configured to dampen vertical movement of the support opening.

In a further embodiment of the front suspension, the flexible member provides an arcuate motion to the connection of the wheel arm.

In a further embodiment of the front suspension, the arcuate motion is described by a circle centered on a virtual pivot point of the flexible link.

In a further embodiment of the front suspension, the virtual pivot point is arranged above the connection of the lower link arm to the first main fork support.

In a further embodiment of the front suspension, the longitudinal axis of the flexible link is defined between the virtual pivot point and the connection between the wheel arm and the flexible link.

In a further embodiment of the front suspension, the lower link arm has a distance between connections of less than ¾ a distance between the virtual pivot point and the connection between the wheel arm and the flexible link.

In a further embodiment of the front suspension, the lower link arm has a distance between connections of less than ½ a distance between the virtual pivot point and the connection between the wheel arm and the flexible link.

In a further embodiment of the front suspension, the flexible link is connected to the first main fork support my one or more of: a friction fit; an adhesive; a cooperating mechanical interface; and a bolt.

In a further embodiment of the front suspension, the flexible member is formed from substantially the same material as a rest of the flexible arm.

In a further embodiment of the front suspension, the flexible link comprises an upper portion and lower portion joined together by the flexible member, wherein the flexible member is formed from a different material from the upper portion and the lower portion of the flexible link.

In a further embodiment of the front suspension, the flexible link is formed from substantially the same material as the first main fork support.

In a further embodiment of the front suspension, the flexible link and the first main fork support are formed as a single component.

In a further embodiment of the front suspension, the flexible member comprises one or more of: a flat sheet; a sheet having a rectangular, circular or oval cross-section; a portion of the flexible link having a different cross-sectional shape; and a portion of the flexible link formed with one or more features allowing the flex of the flexible link.

In a further embodiment of the front suspension, the flexible member is formed from one or more of: carbon fiber; carbon fiber composite; a resilient polymer; and titanium.

In a further embodiment of the front suspension, the longitudinal axis of the flexible link is arranged at an angle within 15° of the longitudinal axis of the first main fork support when the front suspension is in the extended position.

In a further embodiment of the front suspension, longitudinal axis of the flexible link is arranged at an angle within 5° of the longitudinal axis of the first main fork support when the front suspension is in the extended position.

In a further embodiment of the front suspension, the support opening is offset in front of a center longitudinal axis of the steering tube by between 0 cm and 10 cm.

In a further embodiment of the front suspension, the support opening is offset in front of a center longitudinal axis of the steering tube by between 1 cm and 5 cm.

In a further embodiment of the front suspension, the first main fork support, flexible link and lower link arm are arranged to be approximately co-linear when viewed from a side to provide a low-profile appearance.

In a further embodiment of the front suspension, the flexible link, lower link arm and wheel arm are arranged to provide movement of the support opening of the wheel arm that is approximately parallel to the longitudinal axis of the first main support fork when the front suspension system moves between the extended position and the compressed position.

In a further embodiment of the front suspension, the flexible link, lower link arm and wheel arm are arranged to provide an arced movement of the support opening of the wheel arm that is non-parallel to the longitudinal axis of the first main support fork when the front suspension system moves between the extended position and the compressed position.

In a further embodiment of the front suspension, one or more of the connection between the flexible link and the wheel arm, the connection between the first end of the lower link arm and the first main fork support, and the connection between the second of the lower link arm and the wheel arm are pivotal connections.

In a further embodiment of the front suspension, each of the pivotal connections comprise one or more bushings and ball bearings.

In a further embodiment of the front suspension, the connection between the flexible link and the wheel arm is a pivotal connection; the connection between the first end of the lower link arm and the first main fork support is a flexible connection; and the connection between the second of the lower link arm and the wheel arm is a pivotal connection.

In a further embodiment of the front suspension, the connection between the flexible link and the wheel arm is a flexible connection; the connection between the first end of the lower link arm and the first main fork support is a flexible connection; and the connection between the second of the lower link arm and the wheel arm is a pivotal connection.

In a further embodiment of the front suspension, the connection between the flexible link and the wheel arm is a flexible connection; the connection between the first end of the lower link arm and the first main fork support is a flexible connection; and the connection between the second of the lower link arm and the wheel arm is a flexible connection.

In a further embodiment of the front suspension, the first main fork, the flexible link, the lower link arm, the wheel arm and the flexible connections are formed as a single component.

In a further embodiment of the front suspension, the front suspension further comprises: a second main fork support; and a second linkage connected to the second main fork support comprising: a second wheel arm comprising a second support opening; a second flexible link comprising a second flexible member, the second flexible link coupled to the second main fork support at a second flexible link connection location, the second flexible link further comprising a second pivotal connection to the second wheel arm; and a second lower link arm having a first end portion coupled to the second main fork support at a second lower link connection point of the first main fork support and a second end portion pivotally coupled to the second wheel arm between the support opening and the pivotal connection to the second flexible link.

In accordance with the present disclosure there is further provided a front suspension for a bike capable of moving between an extended position and a compressed position, comprising: a first main fork support for rotatably coupling the front suspension to a steering tube of the bike, the first main fork support having a longitudinal axis; a first linkage connected to the first main fork support comprising: a wheel arm comprising a support opening for supporting a wheel of the bike; an upper link arm having a first end portion movably coupled to the first main fork support and a second end portion pivotally coupled to the wheel arm at a connection point arranged at an end of the wheel arm opposite the support opening, an upper link axis defined between the first end portion and the second end portion arranged at an angle within 30° of the longitudinal axis of the first main fork support when the front suspension is in the extended position; and a lower link arm having a first end portion pivotally coupled to the first main fork support at a lower link connection point below the upper link connection point and a second end portion pivotally coupled to the wheel arm between the support opening and the connection point of the upper link arm, wherein; and a shock absorber configured to dampen vertical movement of the support opening.

In a further embodiment of the front suspension system, the upper link arm is pivotally coupled to the first main fork support at an upper link connection point.

In a further embodiment of the front suspension system, the upper link arm comprises a flexible link comprising a flexible member, the flexible link coupled to the first main fork support.

In a further embodiment of the front suspension system, the upper link axis is arranged at an angle within 15° of the longitudinal axis of the first main fork support when the front suspension is in the extended position.

In a further embodiment of the front suspension system, the upper link axis is arranged at an angle within 5° of the longitudinal axis of the first main fork support when the front suspension is in the extended position.

In a further embodiment of the front suspension system, the lower link arm has a distance between pivot connections of less than ¾ a distance between pivot connections of the upper link arm.

In a further embodiment of the front suspension system, the lower link arm has a distance between pivot connections of less than ½ a distance between pivot connections of the upper link arm.

In a further embodiment of the front suspension system, the support opening is offset in front of a center longitudinal axis of the steering tube by between 0 cm and 10 cm.

In a further embodiment of the front suspension system, the support opening is offset in front of a center longitudinal axis of the steering tube by between 1 cm and 5 cm.

In a further embodiment of the front suspension system, the first main fork support, upper link arm and lower link arm are arranged to be approximately co-linear when viewed from a side to provide a low-profile appearance.

In a further embodiment of the front suspension system, the upper link arm, lower link arm and wheel arm are arranged to provide movement of the support opening of the wheel arm that is approximately parallel to the longitudinal axis of the first main support fork when the front suspension system moves between the extended position and the compressed position.

In a further embodiment of the front suspension system, the upper link arm, lower link arm and wheel arm are arranged to provide an arced movement of the support opening of the wheel arm that is non-parallel to the longitudinal axis of the first main support fork when the front suspension system moves between the extended position and the compressed position.

In a further embodiment of the front suspension system, the shock absorber is at least partially housed within the first main fork support.

In a further embodiment of the front suspension system, the shock absorber is connected to the first main fork support at the pivotal connection to the upper link arm and is connected to the wheel arm at a location between the pivotal connections of the upper link arm and lower link arm.

In a further embodiment of the front suspension system, the front suspension system further comprises: a second main fork support; and a second linkage connected to the second main fork support comprising: a second wheel arm comprising a support opening; a second upper link arm having a first end portion pivotally coupled to the second main fork support at an upper link connection point and a second end portion pivotally coupled to the second wheel arm at a connection point arranged at an end of the second wheel arm opposite the support opening; and a second lower link arm having a first end portion pivotally coupled to the second main fork support at a lower link connection point below the upper link connection point and a second end portion pivotally coupled to the second wheel arm between the support opening and the connection point of the second upper link arm.

In a further embodiment of the front suspension system, the shock absorber comprises: a first portion at least partially housed within the first main fork support to dampen the vertical movement of the support opening; a second portion at least partially housed within the second main fork support to provide a returning spring force.

In a further embodiment of the front suspension system, a location of the pivotal connection between the wheel arm and the lower link arm is adjustable.

In a further embodiment of the front suspension system, the pivotal connection between the wheel arm and the lower link arm comprises a bushing arranged in one of the wheel arm and the lower link arm, the bushing having an offset hole such that flipping the bushing adjusts the location of the pivotal connection.

In a further embodiment of the front suspension system, a location of the support opening of the wheel arm is adjustable to vary a distance between the support opening and a centerline of the first main support fork.

In accordance with the present disclosure there is further provided a bike comprising a front suspension system as described above.

BRIEF DESCRIPTION OF THE DRAWINGS

Further features and advantages of the present disclosure will become apparent from the following detailed description, taken in combination with the appended drawings, in which:

FIGS. 25A-25D depict flexible links in accordance with the present disclosure;

DETAILED DESCRIPTION

Figure 1:
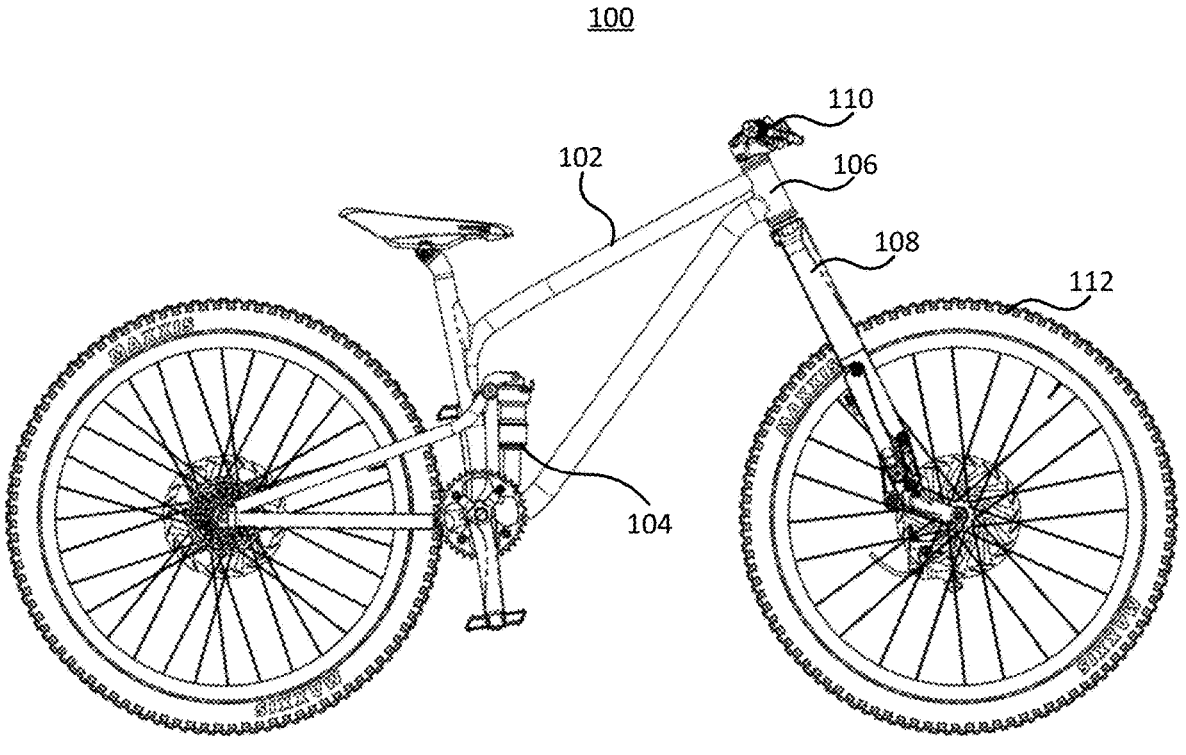
FIG. 1 shows a right side view of a mountain bike having a front suspension system in accordance with the present disclosure.

The present disclosure provides a front suspension system using linkages to provide vertical motion instead of a telescopic/sliding element. Although the front suspension described herein uses linkages, these linkages are arranged to provide a suspension that has an appearance similar to traditional suspension fork designs. Beneficially, in contrast to traditional suspension forks in which telescoping forks provides both the shock absorption and the structural member, the current design relies upon the linkages to provide the structural load-bearing elements while a separate absorber can be provided to absorb the shocks in the movement. While the front suspension system comprises a shock or damper, the shock/damper is not a load-bearing element of the design, apart from its own functional axial travel. With the linkage configuration, rotational bearings or bushings can be used instead of linear sliding element bushings, which reduces friction in the front suspension system. Bushings of the shock/damper of the current design do not bind, or are at least less likely to bind, because they are not load-bearing as in the traditional fork design.

Further, the current front suspension can provide a motion-amplification-ratio, whereby the shock/damper is actuated by a lever arm, with the wheel traveling at a greater than 1:1 ratio relative to the shock. This reduces the effect of air spring seal friction as well, which is present in air-spring based telescopic front suspension, and can be difficult to reduce. By using a linkage configuration that reduces the effects of sliding friction, the front suspension system of the present disclosure transfers significantly less vibration including high frequency "chatter", and in turn, forces and accelerations to the rider's body, thus improving tire grip, rider comfort, and riding enjoyment.

Moreover, the design of the linkages of the front suspension assembly provides a low-profile arrangement that resembles a straight line and looks similar to a traditional fork. Accordingly, the look of the front suspension assembly arranged on a bike will appear similar to traditional fork designs, thus providing familiarity to users while achieving advantageous performance. This low-profile arrangement has a further advantage of reducing weight, compared to other attempts at linkage forks, which allows for the use of cheaper materials, such as 6000 and/or 7000 series alloy, instead of Carbon, and manufacturing methods such as forging, instead of hollow casting or carbon layup, while maintaining competitive weight Further, the linkage design provides for a near-linear wheel path for the suspension travel parallel axis to the steering axis. This movement is similar to the path of a traditional fork and as such can provide a feel similar to traditional fork suspensions that riders are often accustomed to. The wheel path is the line, or possibly shallow arc, that the wheel moves through, in side view, as it goes through the travel of the suspension system. In addition, the linkage positions can be adjusted to provide a different wheel path and even a user customizable wheel path by changing an instant center location of the suspension. The instant center is a virtual pivot of the linkage system, which dictates the center point of the wheel path arc.

In one broad aspect, a front suspension for a bike in accordance with the present disclosure comprises at least one fork for supporting a wheel of the bike, and each of the at least one fork comprises a moveable suspension linkage assembly that is capable of moving the wheel in a generally linear motion while maintaining a "linear" appearance at the rest, or zero travel position.

The front suspension system as disclosed herein may be a stand-alone unit that is interchangeable with a traditional fork design for installation on existing bikes. The front suspension system may also be an original component sold with or sold on a complete bike.

While the present disclosure particularly contemplates the front suspension system for use on bicycles, and more particularly mountain bikes, it will be appreciated that a similar suspension system can be used in various applications including but not limited to motorcycles, snowmobiles, electric scooters, etc.

Embodiments are described below, by way of example only, with reference to FIGS. 1-17.

FIG. 1 shows a right side view of a mountain bike assembly 100 having a front suspension system in accordance with the present disclosure. The mountain bike 100 has a frame 102 and is depicted as a dual suspension bike. The frame 102 includes a mounting point for a shock absorber 104 for the rear suspension. The frame 102 includes a head tube 106 through which a steerer tube of the front suspension system 108 passes. The steerer tube of the front suspension passes through the head tube and is attached to the handle bars 110 of the bike. A front wheel is attached to the front suspension system and can move in a generally linear path approximately parallel to the steering angle, that is the angle of the steerer tube and head tube.

As seen in FIG. 1, and further described below, the front suspension system 108 supports the front wheel 112 of the mountain bike using a forked configuration with each leg of the fork extending on either side of the front wheel 112.

As can be seen in FIG. 1 the front suspension system 108 has a low-profile aesthetic design, particularly when viewed from the side as depicted in FIG. 1, that is similar to the look of a traditional front fork suspension. The design can provide a straight line appearance of the linkage components that is substantially in-line with the fork in a closed resting, or full extension, position shown in FIG. 1. It is in the closed resting position of the front suspension system that bikes are commonly displayed, photographed, and sold. The front suspension system 108 disclosed herein thus not only achieves desirable wheel path and rider handling dynamics, but also provides an aesthetic that is similar to a traditional fork design and thus maintains a design that is familiar to, and possibly preferable, riders. While maintaining sufficient familiarity, the aesthetic is also clearly distinguishable from a traditional fork design.

Figure 2:
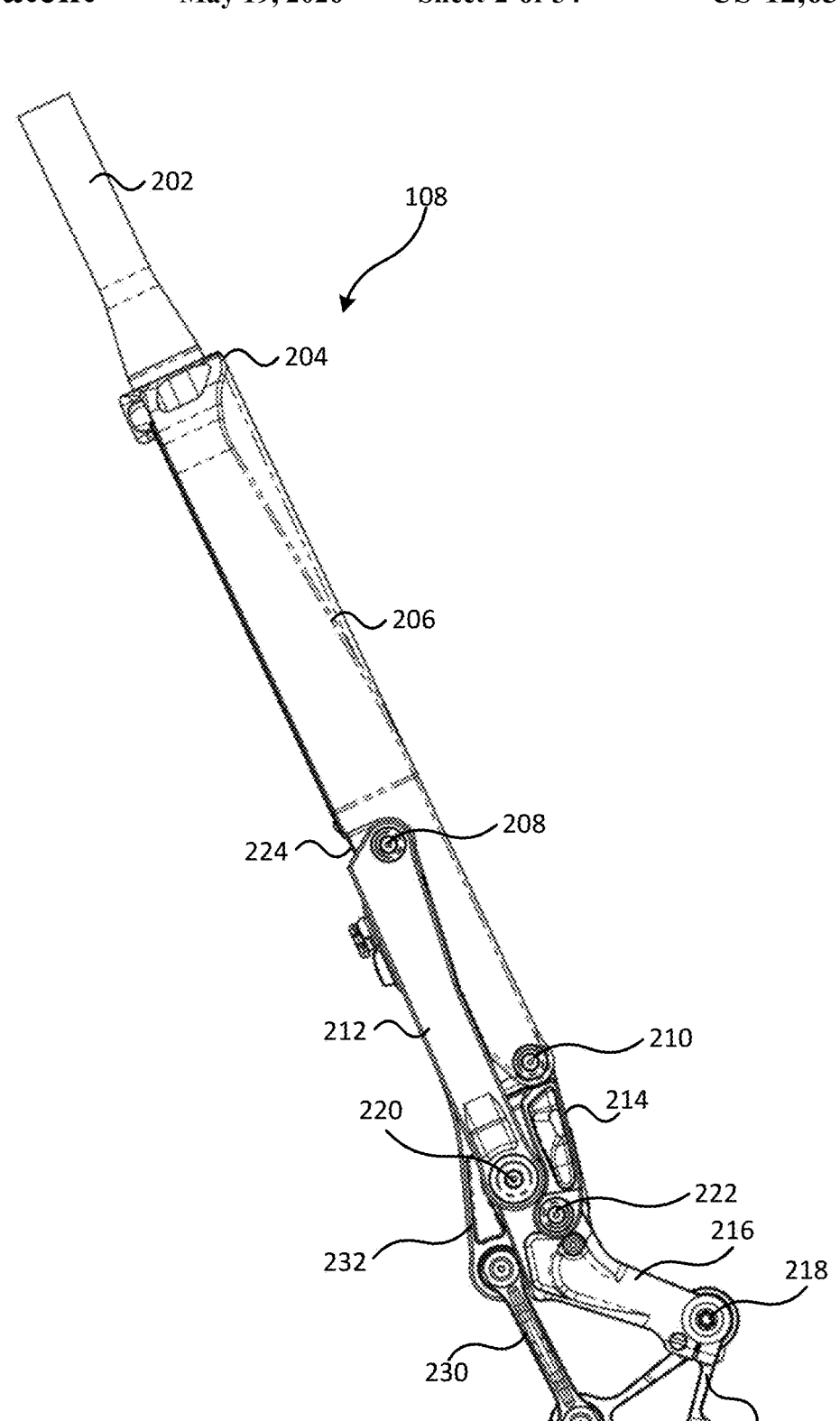
FIG. 2 shows a right side view of the front suspension system at full extension of the suspension travel.
Figure 3:
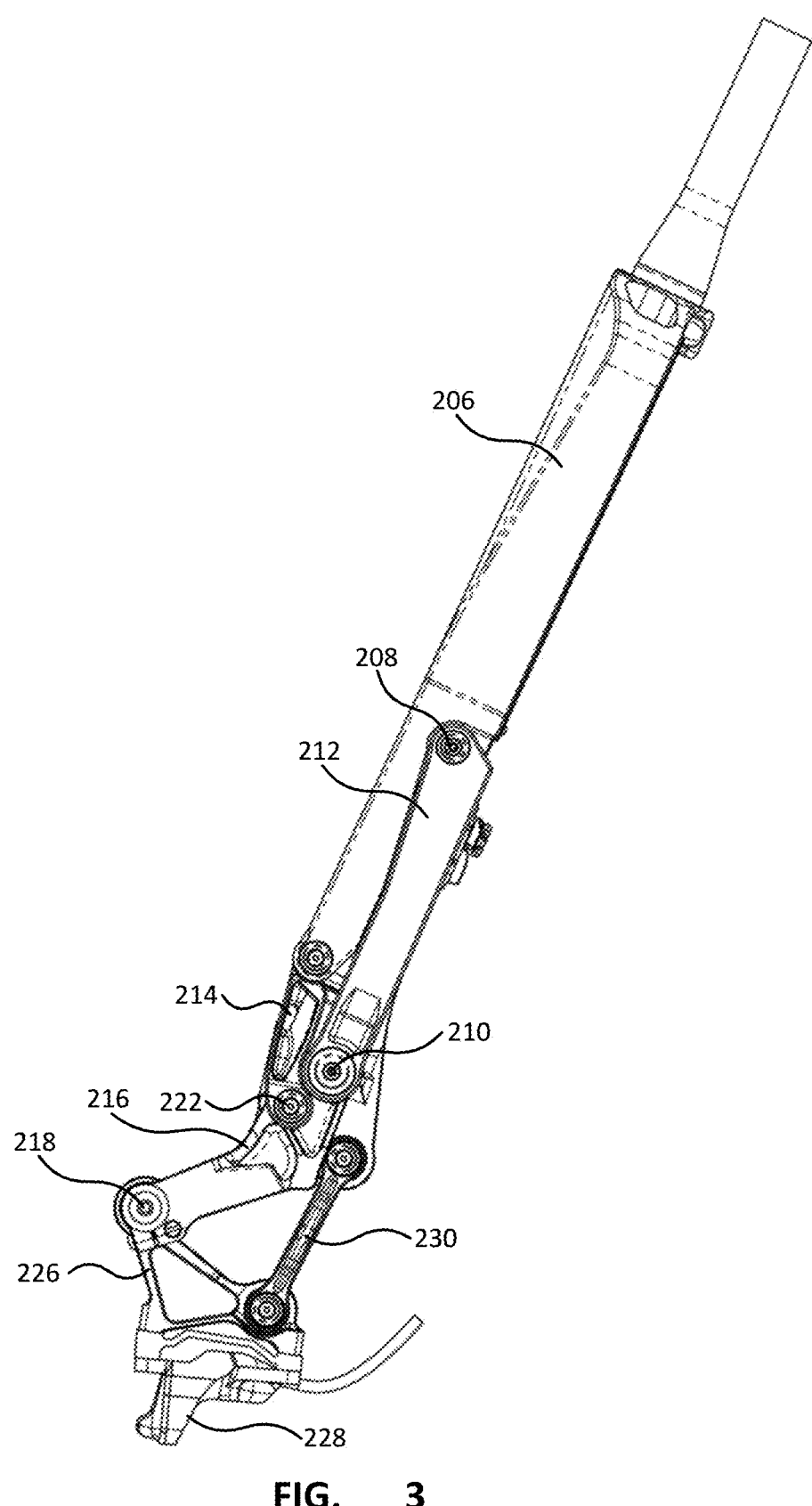
FIG. 3 shows a left side view of the front suspension system at full extension of the suspension travel.
Figure 4:
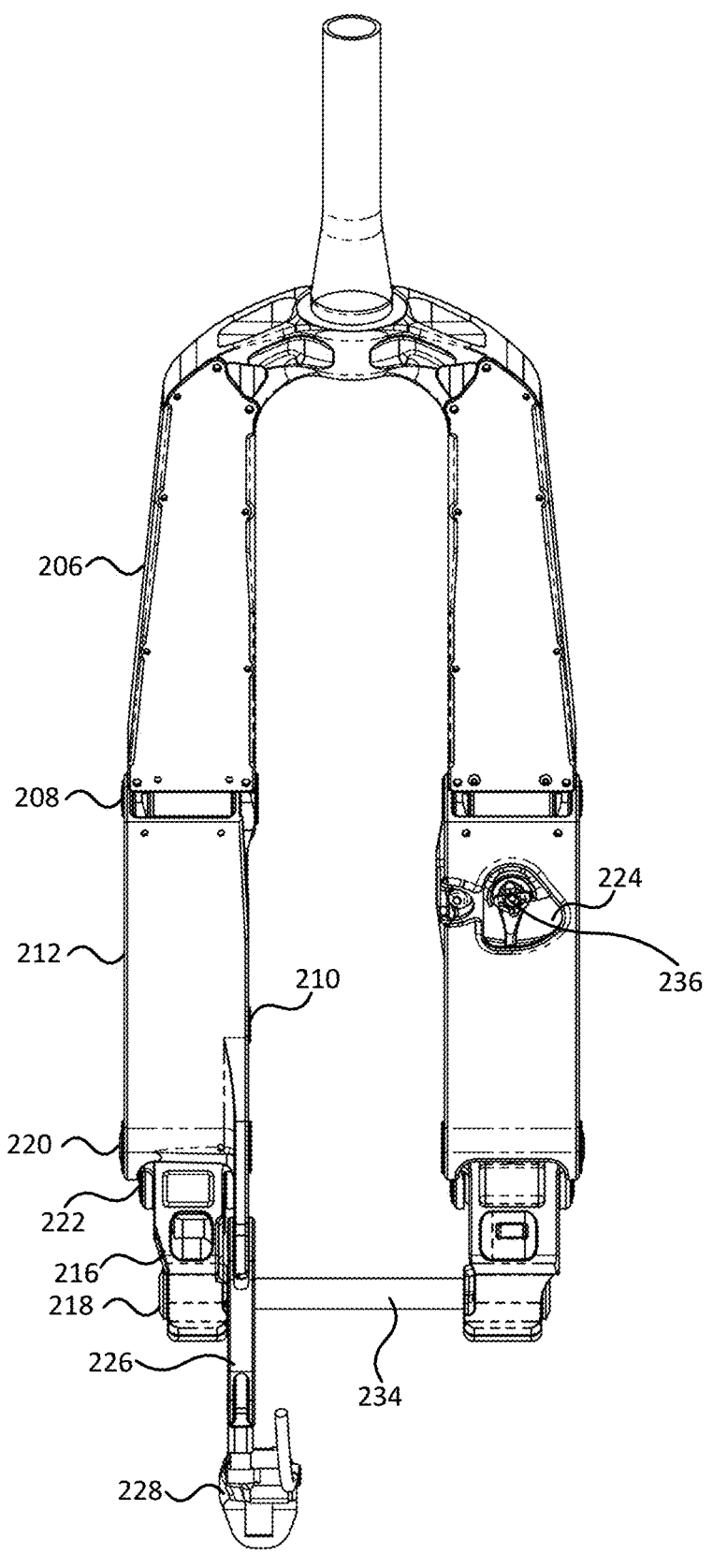
FIG. 4 shows a rear view of the front suspension system at full extension of the suspension travel.
Figure 5:
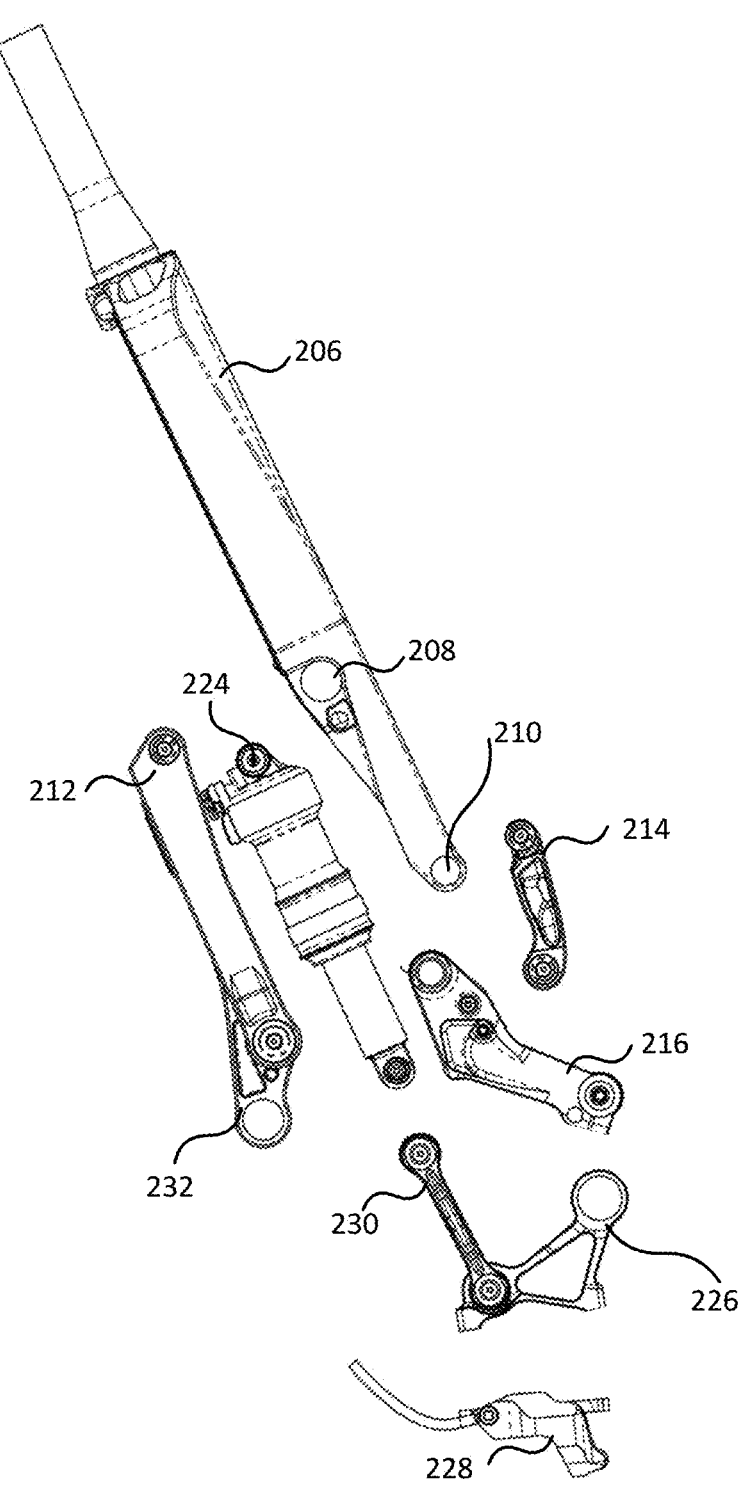
FIG. 5 shows an exploded view of components of the front suspension system.
Figure 6:
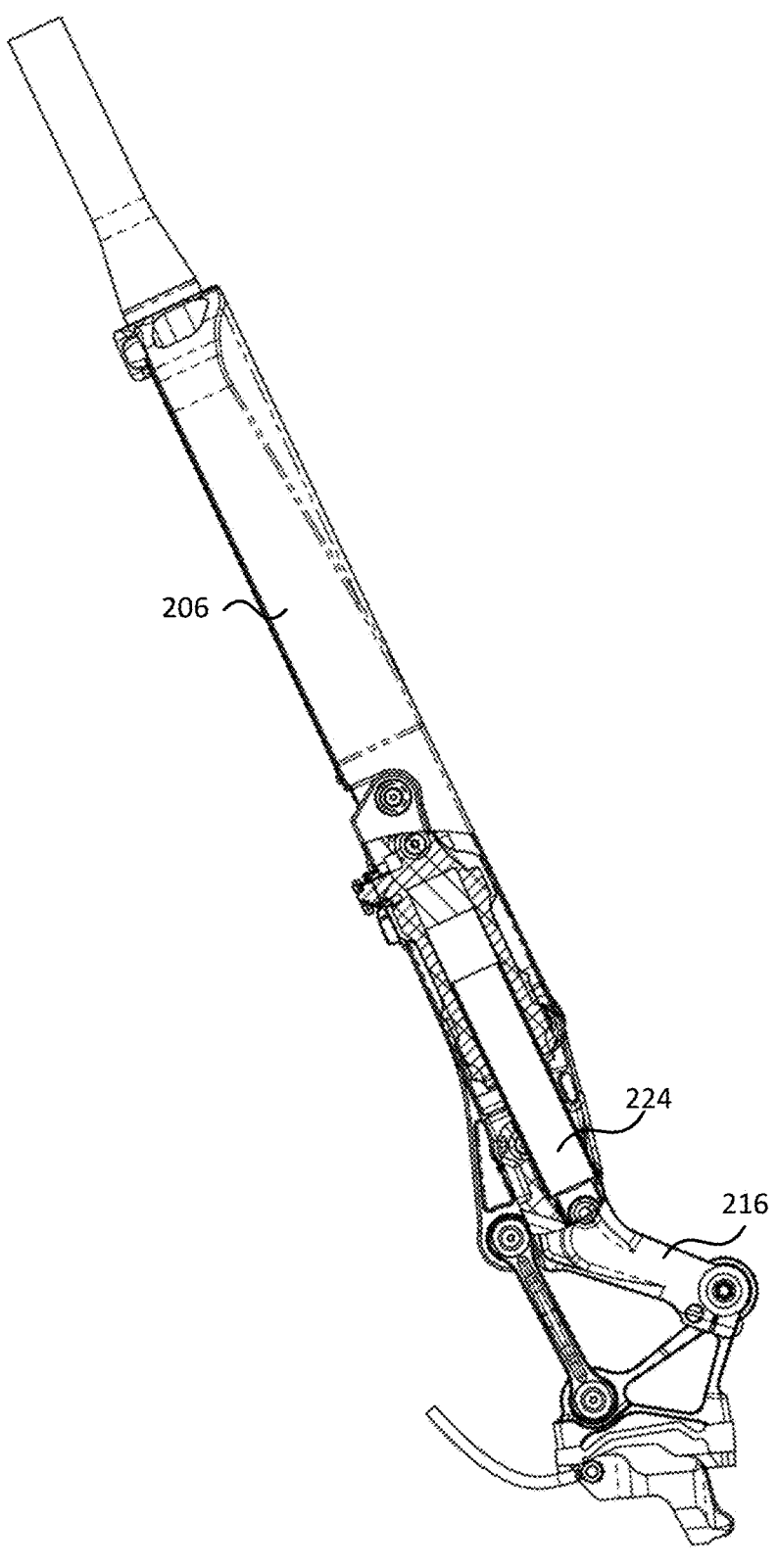
FIG. 6 shows a cut away side view of the front suspension system.

FIG. 2 shows a right side view of a front suspension system 108 at full extension of the suspension travel. FIG. 3 shows a left side view of the front suspension system at full extension of the suspension travel. FIG. 4 shows a left side view of the front suspension system at full extension of the suspension travel. FIG. 4 shows a rear view of the front suspension system at full extension of the suspension travel. FIG. 5 shows an exploded view of components of the front suspension system. FIG. 6 shows a cut away side view of the front suspension system.

The front suspension system 108 comprises a steerer tube 202, which may be provided as part of the front suspension 108 or may be an OEM or third party supplied part. The steerer tube 202 shown is a 1.5 inch to 1⅛ inch tapered steerer tube, with the 1.5 inch diameter at the lower attachment. The steerer tube 202 attaches to the mountain bike frame, via a head tube and headset. The steerer tube 202 may be attached to a crown 204 with a press-fit as depicted, although it may be connected using clamping screws, and/or high strength adhesive, etc. Additionally or alternatively, the crown and steerer tube may be manufactured as a single component. The crown 204 serves the function of a bracket, and supports the fork components while transferring steering inputs. The crown 204 attaches the steerer tube 202 to the main fork elements 206. In this case, the crown 204 and the main fork elements 206 are depicted as a unified single part, but they may be separate. It will be appreciated that the mechanical representation shown in FIGS. 2-6 is just one embodiment, and that other configurations of the crown 204 are possible.

The main fork elements 206 are parallel to the steering axis, though they can also be on a slight angle. The main fork elements 206 comprise an upper connection point 208 and a lower connection point 210, as most clearly seen in FIG. 5. The lower connection point 210 may be arranged at a lower end of the main fork element 206 that is at the opposite end of the main fork element from the crown. The upper connection point 208 is arranged between the lower connection point 210 and the crown 204. The upper and lower connection points are used to connect upper and lower linkage arms to the main fork elements. It will be appreciated that the fork elements are described with reference to a single side of the fork, however substantially similar components are arranged on the opposite side of the fork.

The suspension system includes a linkage comprising an upper linkage arm 212, a lower linkage arm 214 and a wheel arm 216. Each of the linkage components comprise at least two pivoting connections. Each of the connections may comprise pins, rods, bolts or other similar components that pass through respective openings, which may include ball bearings in order to reduce friction. The upper linkage arm 212 is pivotally connected to the main fork element 206 at the upper connection point 208 and the lower linkage arm 214 is pivotally connected to the main fork element 206 at the lower linkage arm 214. The bottom ends of the upper linkage arm 212 and the lower linkage arm 214 are both pivotally attached to the wheel arm 216. The wheel arm 216 supports the wheel at a cut out, drop out or other opening 218, which may be supplemented by additional clamping "pinch" bolts for stiffer and more precise supporting of the wheel axle. The upper linkage arm 212 is connected to the wheel arm at an end 220 opposite from the wheel support 218. The lower linkage arm 214 is connected to the wheel arm at a position 222 between the upper linkage arm connection 220 and the wheel support 218.

A shock absorber 224 is at least partially housed within the main fork element 206. The shock absorber 224 may also be partially housed within the upper linkage arm 212. The shock absorber 224 is most clearly seen in the exploded component view of FIG. 5. The shock absorber 224 may be a piston style absorber and may be mounted at one end to the main fork element 206 and/or the upper linkage arm 212. The shock absorber may be connected to the main fork element and the upper linkage at the same pivotal connection 208 used to connect the upper linkage arm to the main fork element 206. The opposite end of the shock absorber may be connected to the lower linkage arm 214 and/or the wheel arm 216. The lower end of the shock absorber 224 maybe connected to both the lower linkage arm 214 and the wheel arm 216 at the pivotal connection point 222 between the lower linkage arm 214 and the wheel arm 216.

As depicted in the rear view of FIG. 4, the fork element may provide access to one or more adjustment controls 236 of the shock absorber 224. The adjustment controls may be accessible through one or more openings that allow a user to adjust the one or more controls of the shock absorber to adjust characteristics of the shock absorber such as rebound and/or compression characteristics of the shock. The shock absorber 224 may also be at least partially accessible to perform certain maintenance tasks on the shock absorber without disassembling the front suspension system.

As can be seen from FIGS. 2 and 3, the right side fork element and the left side fork element comprise the same linkage elements. However, the suspension system may comprise a single shock absorber, which is depicted as being located in the right side fork element. It will be appreciated that the shock absorber could be located in the opposite side of the fork, or shock absorbers could be located in both sides of the fork.

A shock absorber/damper is generally a unit composed of a fluid damper and a spring. The fluid damper generally comprises a shaft and a piston, with small slits or shims that flex to allow fluid to pass, being activated to varying degrees at different fluid velocities, also depending on external user adjustable tuning presets. The spring is generally either compressed air, which may be atmospheric air or pure nitrogen, or coil. In some cases, an air spring may have a "negative" chamber, with the purpose of canceling out the initial force required to compress ("preload"). This negative chamber may be self-balancing, or user pressure adjustable. The shock absorber may be a standard OEM or 3rd party shock absorber may include an air spring and damper, but other versions are possible including for example coils, also called "coilover", or a separate damper and spring unit. The damper may make use of an OEM "cartridge" damper/spring of a standard telescopic fork, with appropriate end eyelet pivot attachments added. The damper may also be rotary, alongside a rotary or torsion coil spring or a rotary air spring. The spring may also be a leaf shape, made of a spring steel, titanium, or carbon.

The upper pivot of the shock absorber can be moved in all directions without affecting function, subject to given length of the shock. The upper pivot can attach to the main fork element, or to the upper linkage arm, possibly at a position near the upper link pivot, with negligible functional difference. The lower pivot point of the shock absorber affects the leverage ratio, or "motion ratio" of the shock, and so can be moved depending on the characteristics of the chosen shock. The lower pivot point connection may be user-adjustable. The pivot connection with the shock absorber can also be shared with the pivotal connection between the lower linkage arm and the wheel arm, which may save weight and cost and reduce fastener counts.

The upper linkage arm is mostly in-line with the main tubes during full extension. During the initial portion of compression, the upper linkage arm rotates clockwise around its upper pivot. Similarly, the lower linkage arm is mostly in-line with the main fork elements, that is, the lower linkage fits within the envelope of the main fork element while the suspension is fully extended. The lower link 122 rotates clockwise around its upper pivot during compression of the front suspension.

The upper pivot point 208 of the upper linkage arm 212 can be moved up or down, lengthening or shortening the link, with negligible functional difference. The shock pivot, which may be shared with the upper pivot of the upper linkage arm, can be repositioned to be in different locations (above, below, etc.) with negligible functional difference. The shock pivot can also be attached to the upper linkage arm, rather than to the main fork elements 216, with no or little difference in function. The lower pivot point 220 of the upper linkage arm 212 may be sensitive to relocation, with a few mm movement having a relative large effect on the wheel path and shock actuation ratio.

The location of the pivot connection between the lower linkage arm and the main fork element can be moved in any directions with minimal functional impact. Changes in the location of the pivot connection may result in a minor change of the wheel path and instant-center location. The location pivot connection between the lower linkage arm and the wheel arm may be more sensitive to positioning, with a few mm of relocation having relatively large effects on the wheel path. If both the upper pivot point and lower pivot points of the lower linkage arm are moved together, for example, moving the entire lower linkage arm in the forwards direction while maintaining its orientation, the wheel path can be largely maintained, but the aesthetic changes.

The wheel arm 216 provides the wheel travel (i.e. length of the path of motion of the suspension), primarily by way of counter-clockwise rotation, but also translation-upwards and rearwards, relative to the forward direction of bike motion. Since the wheel pivot is below and slightly ahead of the two linkage arms that constrain the wheel arm's motion, it can be viewed as a "swing arm" or "leading arm", where the swinging (rotation) is the primary function (as opposed to translation)—but where the fixed pivot of the swing-arm changes location as the swing travels. This combined translation and rotation forms the instant-center of rotation of the wheel arm, as a virtual point in space, forming the instantaneous center point of the wheel path arc. This means that the wheel path can be substantially independent of the length of the upper link and lower link. This also means that various travel and wheel path configurations can be done with very minor changes to the overall linkage, in some instances using the same components with adjustable pivot locations, or a travel limiting spacer in the damper unit.

As described earlier, the shock absorber lower pivot can be moved, affecting the wheel travel, or the ratio of wheel travel to shock absorber travel The axle pivot can be moved, or made user-adjustable, to change both the wheel path and the "rake". Here, "rake" is used to denote the offset of the axle from the steering axis or the centerline longitudinal axis of the fork, in side view. For example, the axle being 44-52 mm forwards offset from the steering axis is fairly standard for a traditional bike front suspension. On the linkage fork, moving the axle point forwards makes the wheel path curve slightly towards horizontal, rather than being nearly linear and parallel to the steering axis. Moving the axle upwards has the same effect as above. Moving it downwards, or rearwards, makes the wheel path slightly more vertical.

The front suspension system depicted above has a shock absorber 224 in one side of the fork. The shock absorber may be an off-the-shelf shock, or may be custom-tuned and/or custom-designed for this linkage fork. The shock absorber provides both dampening to the movement as well as a returning spring force. The shock absorber may be provided as a single unit that provides both the dampening and spring or may the dampening and spring may be provided as separate components. The shock absorber unit depicted is "hidden" inside the main fork element 206. This is possible due to both the side view arrangement of linkages, which allow room for the shock to not be obstructed—for example by pivot bearings and bolts, as well as ranges of motion. In some embodiments, the clearance for the shock would only be possible for a narrow range of motion.

An additional consideration in shock mounting location is "leverage ratio". Leverage ratio is equal to wheel travel divided by shock absorber travel, and is usually in the 2-3.5:1 range for a rear suspension, and 1:1 for a telescopic fork. Each shock absorber unit has a specified range of forces, for example, given in terms of rider weight and velocities to operate within. These are highly dependent on the leverage ratio, as a high ratio can mean too high loads, but too low speeds. In the current arrangement, the leverage ratio falls within typical OEM recommendations for rear suspension OEM shock absorbers, allowing them to be utilized in the current embodiment with no modifications, and only minor tuning possibly by a bicycle mechanic or by the rider. This can reduce R&D overhead that may be necessary for configuring the suspension to have desired characteristics. If desired, a different ratio can be used with minor modifications to the shock mounting points, allowing for a custom unit to be used according to desired size and shaft velocities.

In this arrangement, the leverage ratio is not constant throughout the travel of the shock—it starts high, then decreases slightly and stays stable to the end. This is done specifically to prevent a so-called "harsh bottom out", where during a large bump, the fork reaches the bottom out condition abruptly, rather than gradually. This could occur if the leverage ratio rose through the travel instead of decreasing, meaning the suspension becomes easier to compress as it travels closer to bottom out. Another reason is to maintain the balance of the bike, so that the front suspension is not sitting too low in the travel relative to the rear suspension, causing the rider to be tilted forwards. The linkage arrangement may be easily adjusted to provide different leverage ratios gradients, to increase or decrease the bottom out resistance as well as overall ride feel.

The front suspension system described herein allows for the use of an OEM or existing 3rd party shock absorber easily. The design is flexible enough to accommodate different length shocks without major revisions, for example, simply moving the upper pivot of the upper link or moving the lower pivot of the shock absorber. It can also adapt to different shock strokes, for example, 45, 50 or 57 mm, by moving the lower shock pivot point fore/aft or up/down. A different linkage arrangement may not actuate an OEM shock at a suitable leverage ratio, for example, below 2, or above 3.5, and thus be outside of the shock's recommended range. An extension adapter for one shock eyelet may be added, to fit a shorter shock to a longer overall length. This may allow the use of the same shock unit in several versions of the fork (for example, a 135 mm travel and 160 mm travel version)

The front suspension has a "compact" aesthetic, with the shock being hidden by, or partially housed within, a portion of the front fork. Being hidden means it is also fairly well protected from dirt and direct hits, as well as general handling during transport or storage. A small rubber dust/dirt shield may be used for additional protection, wherever there is danger of gravel or dirt contacting the shock shaft and scratching it. In dry riding, the linkage fork, which may include a dust shield for the shock, protects the shock shaft from dirt and dust much better than a telescopic fork, reducing seal deterioration which may increase friction.

The primary trailside adjustment levers of the shock absorber are easy to reach from the rear of the fork, where there is also access to the air-valve that adjusts the stiffness of the air spring, if one is used. If a lockout, or partial lockout, similar to a "pedaling platform" on rear suspension, lever is used, it may be routed via cable to the handlebar, alongside the brake cable. This lockout lever can be a standard OEM lever that is used for rear suspension lock-outs. In some embodiments, the front and rear lockouts may be combined into a single synchronized lever. The cable routing may be external, or may be internal/hidden inside special holes in the fork structure, for improved aesthetics and ease of cleaning.

Compared to a telescopic fork, where the leverage ratio is 1-1, in the present front suspension assembly it is adjustable, and is thus able to be tuned to rider preferences and shock constraints. For example, OEM air-spring shocks are non linear in their stiffness throughout the travel. This shortcoming can be accommodated by the leverage ratio of the suspension assembly, where in a telescopic fork it cannot be adjusted. This can also be adjusted internally in the shock, with the use of "volume reducing spacers", also called "tokens".

The shock absorber can be an OEM "coilover" (comprising a coil sprint, and a fluid damper) instead of the current embodiment of air-spring and damper unit. Another option is a leaf spring, and a separate fluid damper. Another option is a rotary damper, with a separate or integrated rotary (torsion) spring. Finally, it is also possible to separate the air-spring unit and the fluid-damper into 2 custom piston-cylinder units, and have one in the right main fork element and the other in the left main fork element. This can balance the forces better, and result in a stiffer chassis. If further balancing is required, an arrangement with 2 matched air springs (one in each fork element) as well as one damper in a single leg, may be used. The spring will be responsible for the majority of the forces, with the damper contributing less.

Figures 7A, 7B, 7C, 7D:
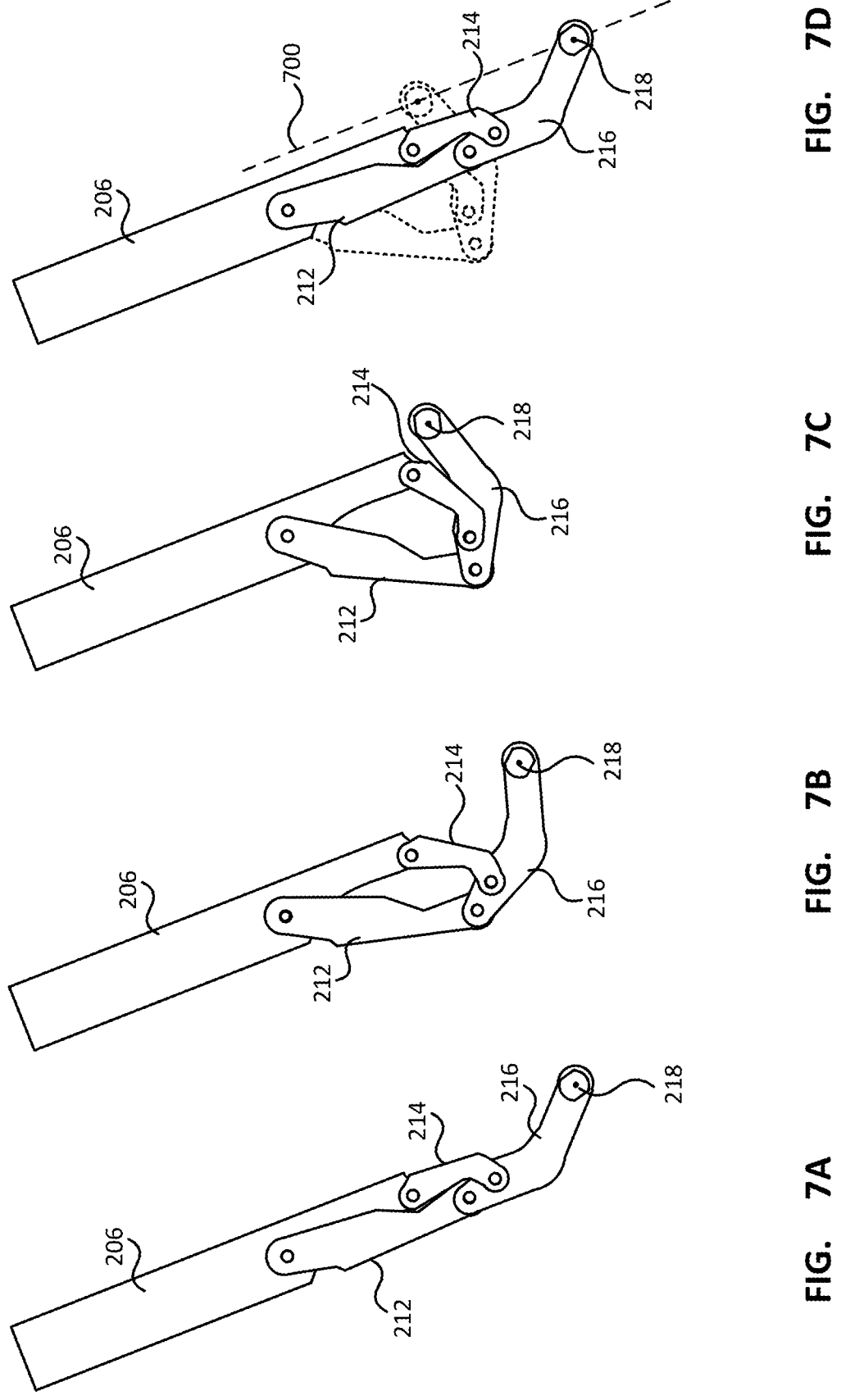
FIGS. 7A-7D depict a side view representation of the operation of the suspension system.

FIGS. 7A-7C shows a side view of the front suspension system 110 at three travel states: full extension (FIG. 7A), mid-travel (FIG. 7B), and fully compressed or bottom out (FIG. 7C). FIG. 7D shows these positions with the wheel path during the travel shown. It is noted that only the fork and linkage components are depicted in FIGS. 7A-7D for clarity of the figures.

Full extension of the suspension corresponds to a resting state of the bike, with no rider, when the shock absorber is not compressed. Once a rider is on the bike, the static load of the rider's weight (depending on preferred stiffness of the fork shock absorber unit) will bring it to the "mid travel" state, or near it (for example, 20-30% of total wheel travel). The mid-travel state occurs when the shock absorber is at approximately 50% compression. Large bumps or jump landings encountered would bring the fork to the "bottom out" state, corresponding to full compression of the shock absorber, which is governed by the shock absorber built-in travel stopper.

Through the travel, the upper and lower linkages 212, 214 rotate clockwise, while the wheel arm 216 rotates counter-clockwise.

The "smooth ride" offered by the fork exists primarily due to the reduction (both in quantity and in effect) of sliding-element bushings—and thus, reducing sliding friction (static and dynamic) in the system. This reduction in friction lowers the force threshold to activate the fork, and as such increases sensitivity to absorbing small, high-frequency bumps—that may be fatiguing and damaging to the rider's hands (measured in a study to exceed ISO maximum safe vibration frequency) over time as well as compromising tire grip at high speeds, with significant danger of crashing. Improved absorption means that the high frequency bumps/vibrations do not reach the rider's hands, and that the tire remains in more consistent contact with the bumpy terrain.

A traditional fork often has two sliding surfaces, each with at least two heavy duty bushings-designed for low-friction axial motion, as well as high radial load capacity, for example, from hitting a root during riding, which will not be axial-only forces on the sliding element. In some forks, this can be 1-5 kg of friction, or possibly much more once the fork has ridden several hours past its yearly servicing. The present front suspension assembly improves on this by the following: having one sliding surface instead of two of the traditional fork, in the form of the small shock absorber unit. The shock absorber unit is decoupled from the irregular multi-directional loading (such as rearwards force in traversing a root, or lateral force in cornering) that the fork experiences, and so the bushings of the shock absorber unit do not experience any radial load in comparison to a traditional fork bushing. As such, stiction is reduced, and the bushings do not need to be heavy duty. Therefore, sliding friction is reduced. The shock absorber may be actuated at a leverage ratio in the 2-3.5:1 range, relative to wheel travel. Any friction in the shock absorber bushings and air spring seals is divided by a factor of 2-3.5. When considering this, as well as the reduction from 2 to 1 sliding surface, total system friction is reduced by at least 5:1 relative to a traditional fork.

The present front suspension assembly uses rotational bearings instead of bushings, and so friction inherent to the system (excluding the shock absorber) is negligible. This is helped by relatively small pivot angular travel-only the lower link travels approximately-90 degrees, while the upper link travels approximately-20 degrees. The use of rotational bushings is also acceptable, as their small size and rotary, as opposed to linear, motion contribute negligibly more friction than the bearings to overall system friction. In some applications, they may be preferable due to reduced cost, size, and weight, at the expense of increased wear, free-play, and friction.

An additional factor in the smooth ride is the reduced un-sprung mass. Un-sprung mass refers to mass that is below the suspension system-such as the wheels, axle, brake caliper. In a traditional fork, the entire lower legs of the fork moves together with the wheel. This may mean an additional 1 kg of mass reacting to the bumps together with the wheel ("un-sprung mass"). In the present front suspension assembly, the only element moving together with the wheel is the axle and brake caliper—the rest of the links contribute only partially (since they rotate as well as translate)—and so, the total un-sprung mass in the current suspension system is <0.5 kg. This has a positive influence on the dynamic response of the suspension, especially for high-frequency bumps.

The near-linear wheel path, parallel to the steerer tube axis can be approximately seen in FIG. 7D. This is achieved by a particular arrangement of a 4-bar mechanism—where the upper and lower linkages are of substantially different lengths, causing the wheel arm to tend to counter-rotate (relative to the links rotation) as it travels. This rotation of the wheel arm around the instant-center formed at the intersection point of the lines drawn by the upper and lower linkages balances with rearwards motion of the instant-center, to generate near-linear travel for the desired travel range.

The specific distances between pivots can be fine tuned to move the wheel path-more vertical, more angled rearwards, more curved vs more linear, or even somewhat S-shaped. However, this particular kinematic arrangement is special in its ability to balance out the wheel path into a near linear curve. To achieve a similar wheel path (at the desired wheel travel of 100+mm) with a different 4 bar arrangement would require 2 fairly long parallel links, at near-perpendicular to the steering axis. This would not be an aesthetically compact arrangement. Shortening the above mentioned parallel links would cause the wheel path to be arc-shaped (vs linear), or to not be able to surpass the 80-100 mm of wheel travel desired for a mountain bike fork.

In the current suspension system, by having the wheel pivot below the two links, and having one link be approximately ½ to ¾ the length of the other, the counter-rotating motion of the wheel arm is able to function correctly—providing a near-linear wheel path alongside a "compact" linkage. If the wheel pivot were above, or located within the two links, the wheel path would not be linear, nor be in the desired general upwards direction—while maintaining a compact aesthetic.

A design consideration of this layout is that it benefits from a floater brake linkage to maintain desirable brake behavior, such as 0%-40% anti-dive in the present embodiment. While it can result in additional weight and complexity, a benefit is that it allows an additional parameter for tuning-changing the anti-dive percentage to suit different riders as well as maintaining the "compact" aesthetic of the fork. Previous linkage fork designs did not use a floater brake linkage, and may have had compromised their design elsewhere to accommodate acceptable braking characteristics, while also not allowing user adjustment. The desired anti-dive characteristics of a fork may be rider dependent and some riders do not like the ride feel of near-100% anti-dive that is present in some other linkage forks. The anti-dive characteristics of the current fork can be readily adjusted, and may include functionality for providing user-adjustability to the anti-dive characteristics.

The suspension fork may further include a brake assembly. The brake assembly may be located on an opposite side of the fork as the shock absorber, or on the same side as the shock absorber. The brake assembly may comprise floater brake linkage having a brake mount 226 for a brake caliper 228. The brake mount may be a floater brake linkage comprising the brake mount 226 that is pivotally connected, possibly at the wheel axle point or another connection point on the wheel arm. Although depicted as separate components, the brake mount 226 and the caliper 228 may be provided as single component. Additionally or alternatively, one or more adapter plates may be provided between the brake mount 226 and the caliper in order to mount different calipers or rotor diameters. The brake mount 226 is also pivotally connected to a brake rod 230. The opposite end of the brake rod is pivotally connected to a brake pivot 232 that is either part of the upper linkage arm, or is rigidly attached to the upper linkage arm 212.

The floater brake pivot 226 can be moved by changing the connection points of the brake linkages. The movement can change the location that the brake caliper clamps on the disc, which may or may not affect the anti-dive characteristics of the fork, depending on specific parameters changed. Anti-dive counteracts the force that tends to cause the front suspension to compress ('dive') under braking, felt as a "pitching forward" of the rider and bike. 0% anti-dive is a state where applying the brakes will not influence the fork diving behaviour under braking, meaning that the bike will dive under braking, in a similar manner to a standard mountain bike with a telescopic fork. 100% anti-dive means that applying the brakes causes a moment counteracting the deceleration-induced moment, resulting in the fork not diving under braking. Generally speaking, 0% (or near it, for example 10-20%) anti-dive is beneficial for responsiveness of the front suspension to the terrain. However, the anti-dive characteristics of the brake mounting of the current fork design can be adjusted to provide between 0% and 100% anti-dive characteristics, or to vary the anti-dive at different positions in the wheel travel. The anti-dive characteristics may be user adjustable as described further with reference to FIGS. 9 and 10. Moving the floater brake pivot may require moving of other pivot locations in the floater brake linkage, to achieve a desired anti-dive percentage. The floater brake pivot can also be attached to the main fork elements, or to the lower linkage arms, with appropriate changes to the other pivots in the floater brake linkage.

The brake rod 230 is a link attaching to the upper linkage arm 206 through the floater brake pivot 232, and the brake arm 226, which holds the brake caliper 228. Similar to the floater brake pivot 232, the brake rod 230 can be relocated substantially, and there are several linkage combinations that will achieve desired "anti-dive", generally selected to be 0%-40% in the current embodiment.

The brake arm 226 is a bracket that attaches to various elements, namely the brake rod 230 at a pivot; the wheel arm 216, at a pivot that may be shared with the wheel axle 234; and the brake caliper 228. The attachment to the wheel arm 124 may be at the axle 234 to allow the brake arm 226 to swivel concentrically to the wheel and brake rotor, allowing relative rotation but not translation. The brake caliper 228 may be an OEM or 3rd party brake caliper with standard mounting screws. The brake rotor may also a standard OEM or 3rd party unit that is part of the wheel assembly of the bike. Various rotor sizes, generally between 160 mm to 220 mm, can be accommodated with the use of standard OEM brake mount adapters, as is the case for telescopic forks. It is expected that 180-200 mm will be the most common rotor size.

The pivot attachment of the brake arm 226 to the brake rod 230 can be moved substantially, as mentioned above. The brake caliper 228 mounts can be moved, as discussed further herein, as well as shifted radially to accommodate a large diameter brake rotor, although, alternatively, an OEM brake mount adapter can be used. The pivot at the axle should preferably not be moved, to ensure the brake rotates about the center of the wheel and so the brake rotor. If necessary it may be moved slightly, while not affecting the anti-dive significantly. The mechanical arrangement can change, for example, having a separate mechanical "shoulder" concentric to the axle on the wheel arm that serves at the pivot, instead of the axle 234 itself.

The brake caliper 22 8 may be an OEM or 3rd party part, shown in basic form in the drawing, with a portion of the hydraulic brake line shown. The brake caliper 228 attaches to the brake arm 226 with, for example, two screws. The brake caliper 228 can be located at any point around the circumference of the brake rotor, limited only by practical considerations such as component clearances, and rotor size.

Figures 8A, 8B, 8C:
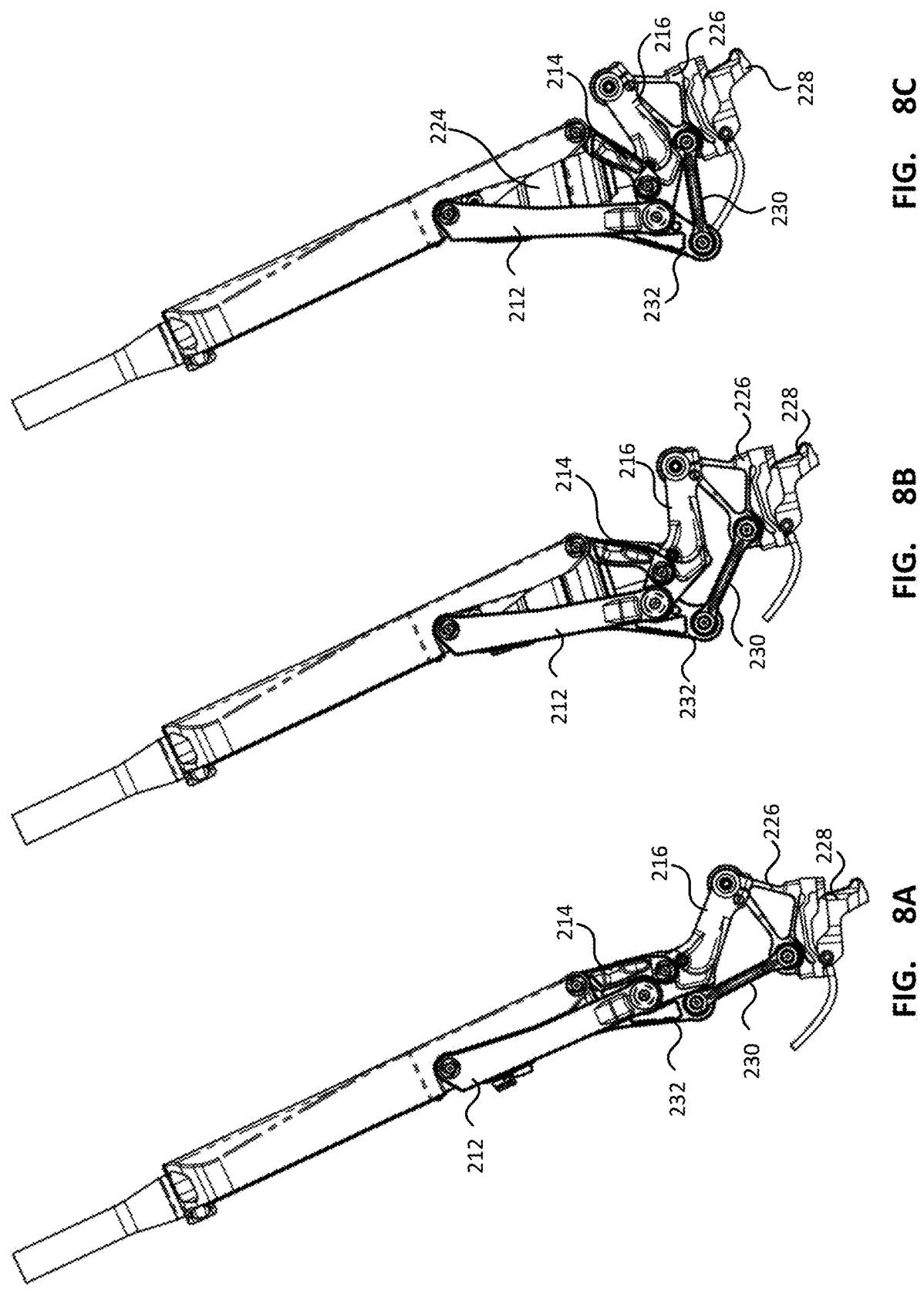
FIGS. 8A-8C depict side views of a brake mount on the front suspension system.

FIGS. 8A-8C shows a side view of an isolated floater brake linkage at the three travel states shown in FIG. 6. As seen in the FIG. 7, as the fork moves from "full extension" state, to "mid travel" state, to "bottom out" (full compression) state, the brake caliper 228 maintains (nearly) it's angle relative to the ground, even while the wheel arm (as seen in FIG. 6) changes angle dramatically. This means that applying the front brake will not influence the fork behavior, due to near 0% anti-dive. Note that the anti-dive is traditionally calculated in reference to rider height and weight (rider center of gravity on the bike), and in the current embodiment anti-dive percentage is approximate for an average rider height and weight. Different riders may be accommodated, with slight adjustments suited to riders of, for example, 5 broad categories of height and weight, or for different bike geometries with varying centers of gravity.

The front suspension assembly in the present embodiment provides very minimal anti-dive behavior, such as about 10-40% anti-dive which is negligible to most riders. This is because it was not a design objective to provide anti-dive. This is done to provide a riding characteristic that is similar to traditional fork designs and familiar to riders, and to maximize sensitivity of the suspension to the ground. However, small changes in the brake linkage can allow for fine-tuning of the anti-dive behavior for riders (for examples riders of different height and weight), independently of other parameters (such as wheel path). This can be in the form of a rider adjustable knob to move the pivot positions—for example, to make the brake rod longer or shorter. It can also be in the form of a replacement part.

Figures 9A, 9B:
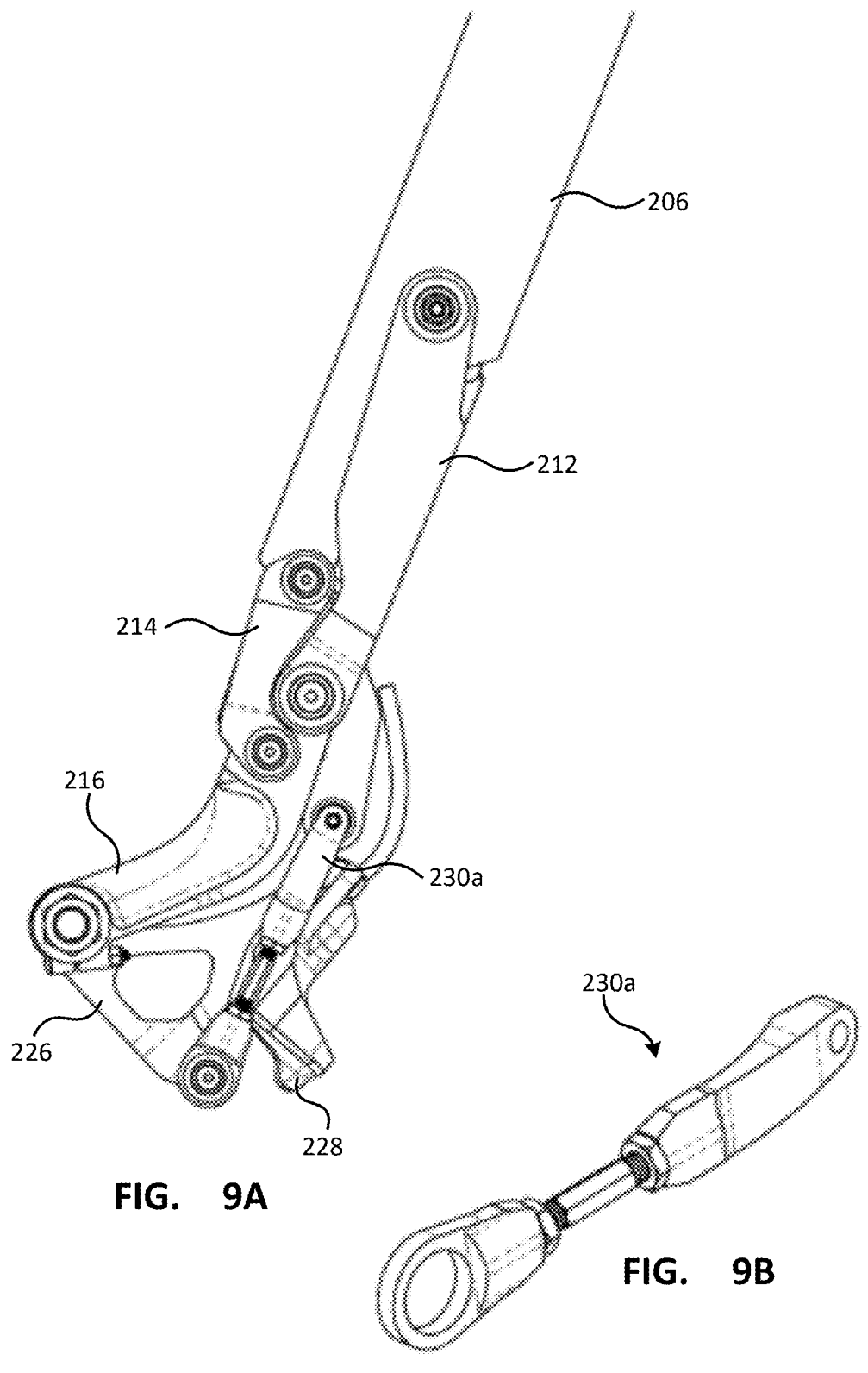
FIGS. 9A and 9B depict a brake mount with an adjustable rod.
Figures 10A, 10B, 10C:
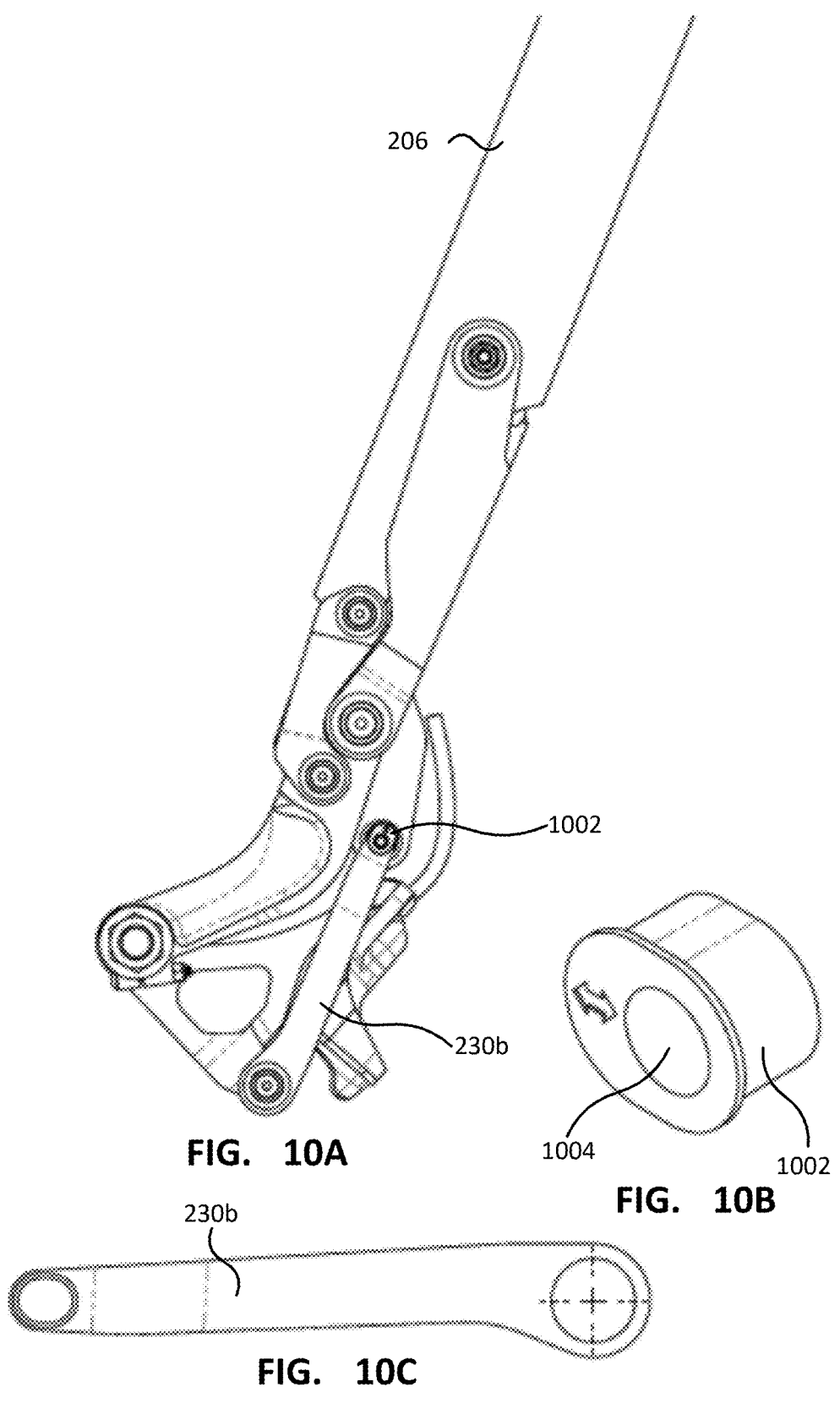
FIGS. 10A-10C depict a brake mount with an adjustable mounting point.

FIGS. 9A and 9B as well as FIGS. 10A-10C show adjustable brake linkages that can be used to adjust the brake anti-dive behaviour. The brake rod 230a of FIGS. 9A and 9B may replace the brake rod 230 described above. The brake rod 230a has a turnbuckle mechanism provided by a rod with a LH thread on one end, and RH thread on the other end, with a hex shape in the middle for a wrench to grip. In this way, loosening the locking nuts (at each end) and rotating the turnbuckle changes the effective length of the brake rod 230a, therefore adjusting the anti-dive percentage. This adjustment would affect both the average anti-dive percentage, as well as the shape of the anti-dive graph anti-dive % plotted against wheel travel—anti-dive does not always remain constant through the wheel travel.

The adjustment is shown to be manual, but can be servo-actuated-providing a particularly advantageous feature for a mountain bike fork-automatic ("active") adjustment of anti-dive. For example, there could be different anti-dive percentages depending on gyroscope input-riding on flat ground vs riding down a hill, riding at different speeds, and even real time responsiveness to bumps (possibly aided by a spring and damper element as mentioned above). In this way, the main shortcoming of near-100% anti-dive can be mitigated-maintaining high-frequency bump responsiveness while reducing dive (which is considered low-frequency, in terms of telescopic fork damping adjustments). This could allow the fork to be tuned independently for bump absorption from braking behavior. This may be coupled with current existing electronically adjustable OEM suspensions, which already include the required gyroscopes and other sensors, for real-time automatic tuning of the suspension based on the terrain. This system can include the brake anti-dive adjustment, as an optional feature.

FIGS. 10A-10C shows a second adjustable brake linkage for adjusting brake anti-dive behaviour. The brake linkage depicted in FIGS. 10A-10C adjusts the linkage positions. The brake rod upper pivot (also called the brake floater pivot, which is part of the upper linkage arm 230b is reconfigured to have a removable insert 1002, which is commonly referred to as a "flip chip" with an offset hole 1004. This provides two positions that are user selectable, by simply loosening the mounting screw and rotating the "chip" 180 degrees. Note that other forms of adjustment are also possible, by moving any of the pivot points of the floater brake linkage—for example, the pivot attaching to the brake arm or the brake floater pivot.

The length of the brake rod may be adjusted as described above. Additionally or alternatively, the length may be adjusted using a servo or other actuator, possibly by a controller that can adjust the length based on inputs such as braking force, front and/or rear wheel speed, suspension travel, user preferences, as well as other parameters. The use of an actuator may provide dynamic adjustment to the brake rod length. Additionally or alternatively, the length of the brake rod may be dynamically adjusted using an axially compliant brake rod. The axially compliant brake rod has a spring and damper element, possibly provided as a small shock unit, or a servo. This may allow not only adjustable anti-dive as described above, but also anti-lock behavior, or dampening of sudden brake application and sudden changes in terrain grip, which may otherwise result in loss of control. For inexperienced riders, improving front brake control may boost confidence significantly. The brake rod may also easily be replaced by and/or integrated with a force measuring sensor, where telescopic fork implementations require a complex and expensive strain gauges mounted on a custom adapter.

Figure 11B:
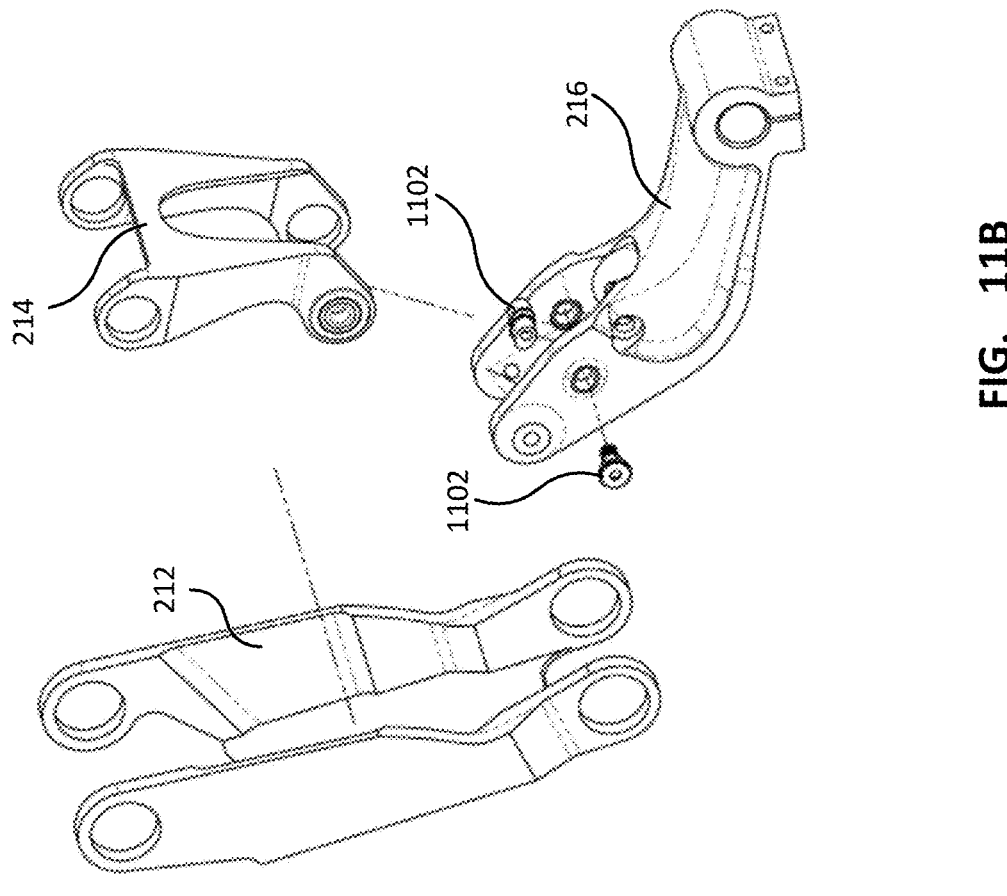
FIGS. 11A and 11B depict portions of the front suspension system with an adjustable linkage mounting point.
Figure 11A:
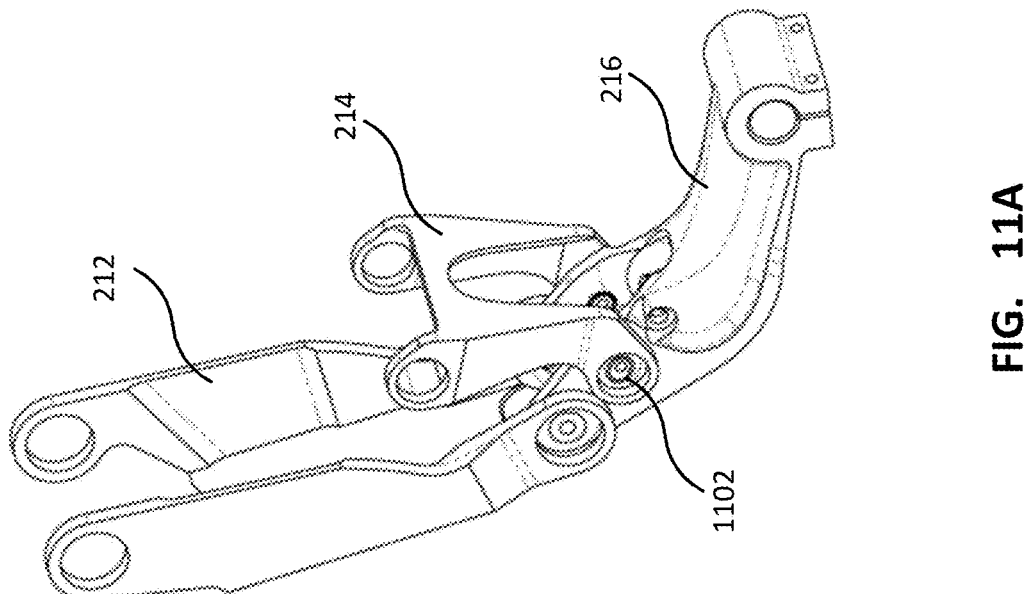

FIGS. 11A and 11B show a sample "flip chip" removable pivot insert assembly that may be used to change the wheel path. FIG. 11A shows an isometric view of a wheel arm flip chip assembly for adjusting a wheel path. FIG. 11B shows an exploded view of the wheel arm flip chip assembly. By detaching and rotating the insert 1102, the mounting point location is changed. In this case, the flip-chip is modifying the lower linkage 214 lower pivot mounting position of the wheel arm 216 in the fore-aft direction. In the exploded view shown in FIG. 11B, the "flip chips" are shown removed. They would then be rotated and reattached in the reverse offset position. In this embodiment, the offset is 3 mm, which is enough for a significant wheel path change.

Figure 12:
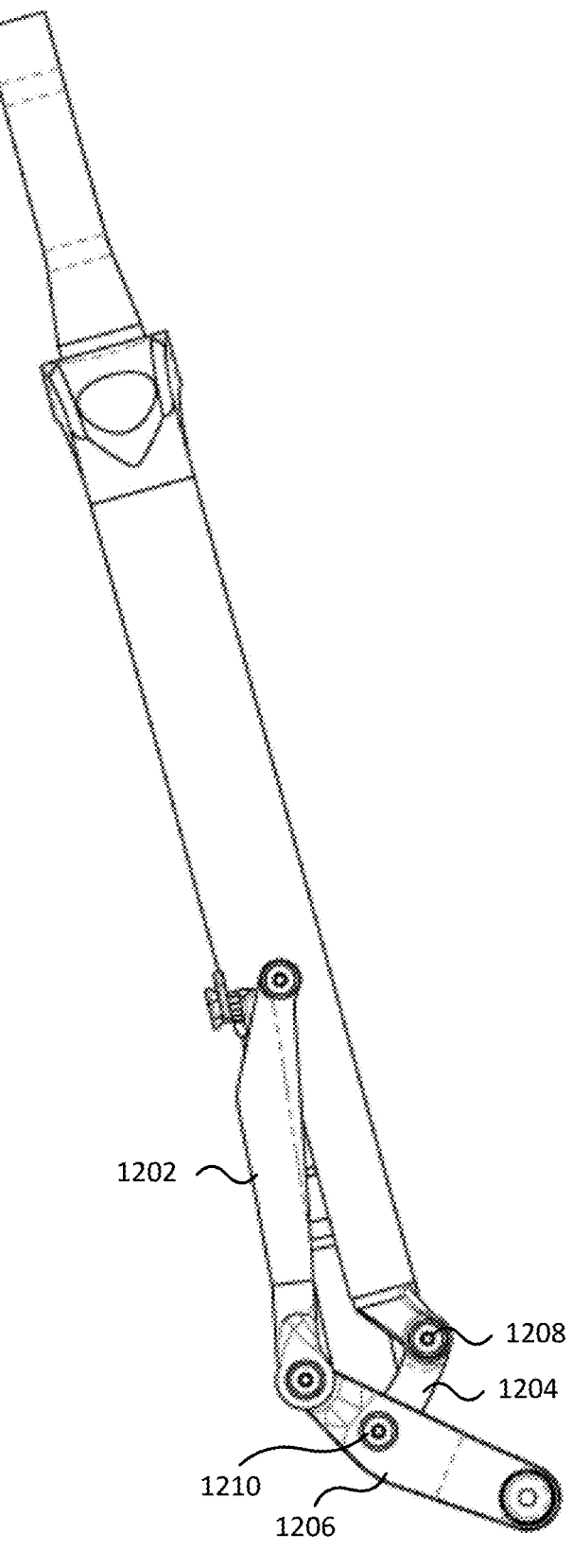
FIG. 12 depicts a right side view of an alternative front suspension system.
Figure 13:
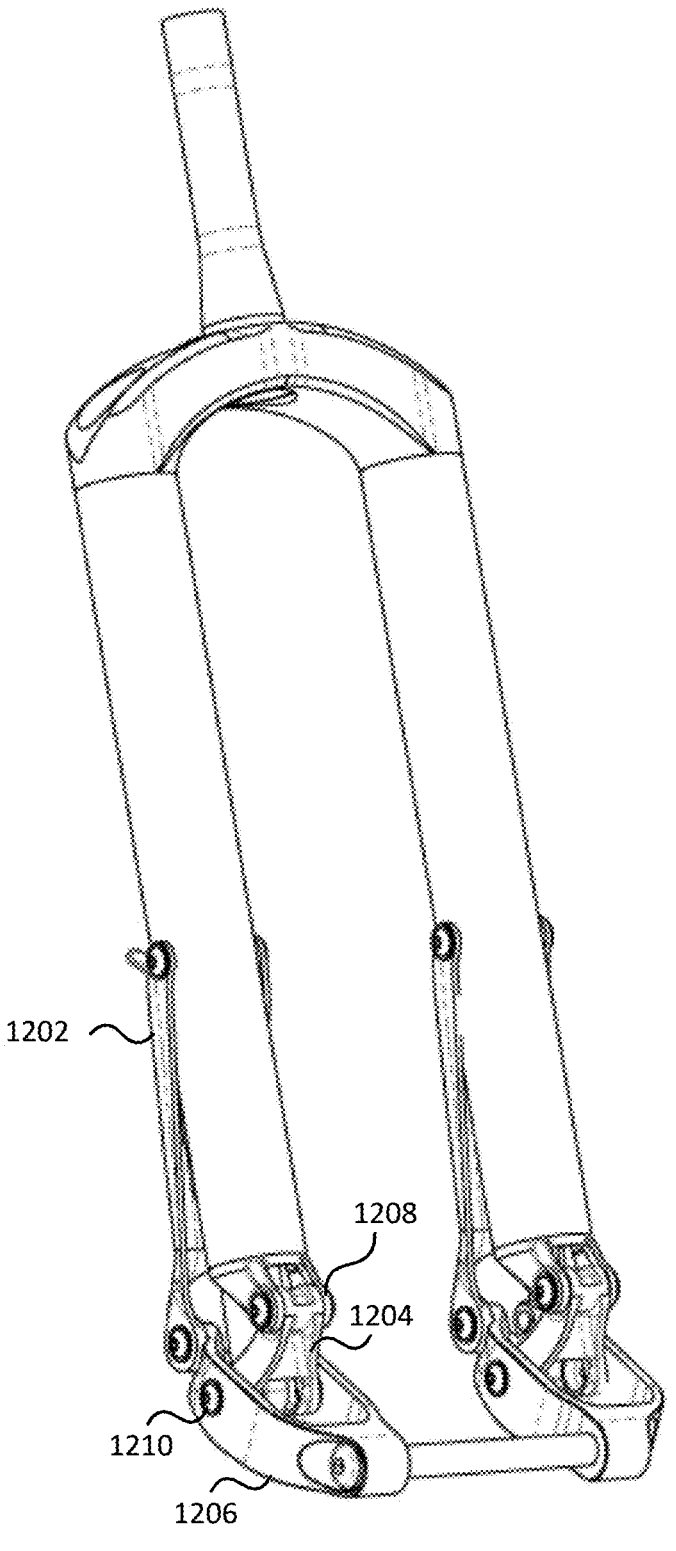
FIG. 13 depicts a front right perspective view of the alternative front suspension system.
Figure 14C:
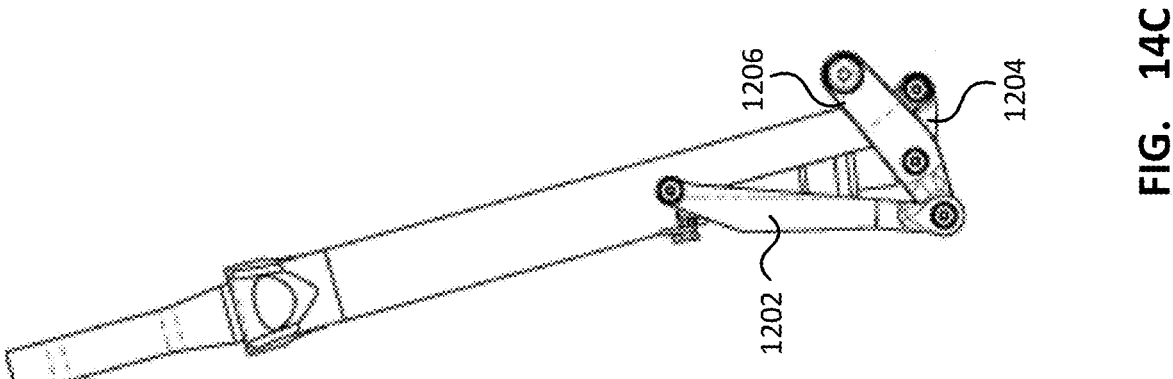
FIGS. 14A-14C depict the operation of the alternative suspension system.
Figure 14B:
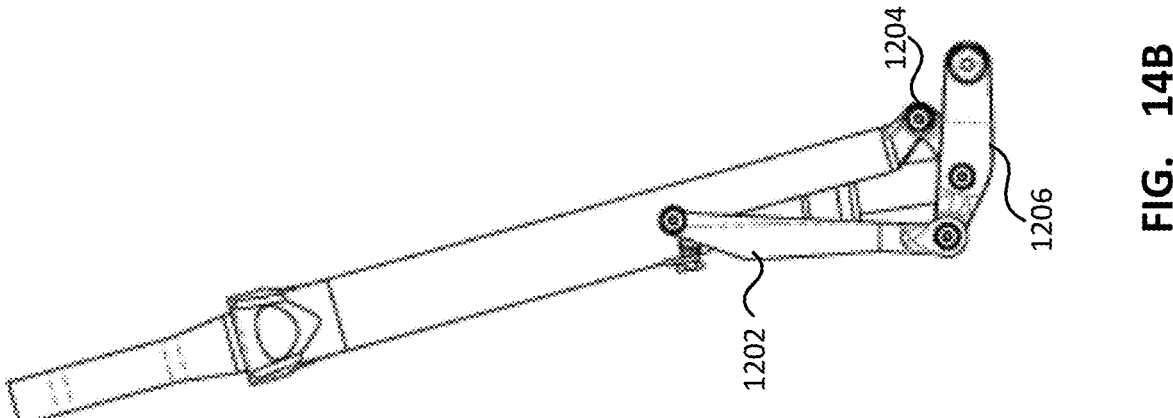
Figure 14A:
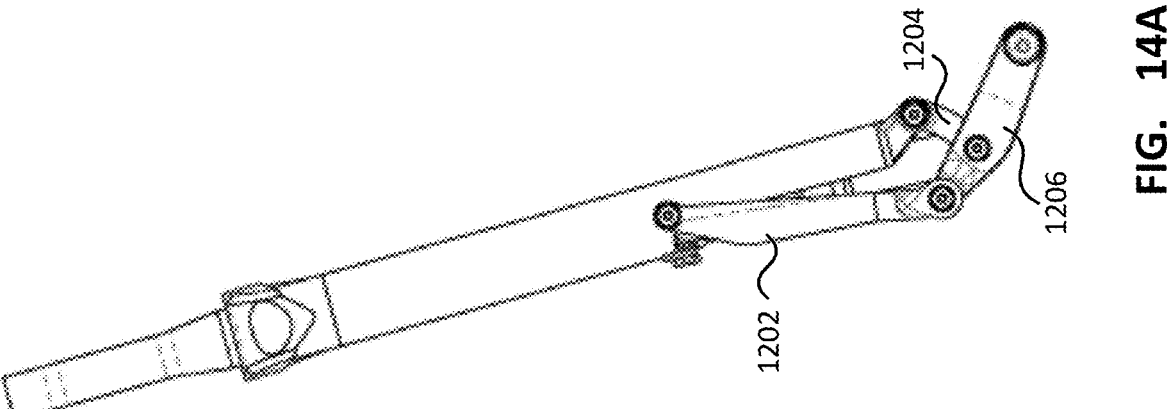

FIG. 12 shows a side view of an alternate front suspension system 1200 in accordance with the present disclosure. FIG. 13 shows a front isometric view of the alternate front suspension system. FIGS. 14A-14C depict the travel of the front suspension system 1200. There are three main differences between the alternate front suspension system 1200 and the front suspension system described above:

The front suspension 1200 has slightly different arrangement of linkages in side view. The upper linkage 1202 and lower linkage 1204 are angled further rearwards. The lower linkage 1204 is shorter, and attaches at a lower position to the wheel arm 1206. The upper mounting point 1208 of the lower linkage 1204 is further forwards relative to the main fork elements, clearing the shock absorber completely. The wheel arm 1206 is closer to horizontal, and is shorter. While the suspension 1200 is less compact aesthetically compared to the suspension described above, as the links protrude from the linear envelope of the main fork elements, the front suspension 1200 still has a compact aesthetic that is similar to more traditional fork suspensions.

The suspension 1200 has a different lower shock absorber pivot attachment. In this embodiment, it is shared with the lower link bottom pivot 1210, in contrast to the original embodiment where the shock mounting position is separate.

The suspension 1200 has a different mechanical configuration in front view. For example, the wheel arm is "O" shaped, being hollow if viewed from the top. This allows the lower linkage to pass through it, and for it to pass around the main fork elements. The lower linkage is mechanically different as well—the upper pivot allows for a single bolt, while in the original embodiment a "clevis" connection is required to pass around the shock absorber shaft.

The main advantage of the second alternate front suspension system 310 is that it is lighter weight since the linkages are shorter, as well as one less pivot, since the shock lower pivot is now shared with the lower linkage. There may also be a stiffness benefit due to the lower linkage being more robust. The linkage may be wider in order to clear the wheel spokes, and as such the crown may also be wider.

FIGS. 14A-14C show a side view of the alternate front suspension system 1200 at three travel states: full extension, mid-travel, and bottom out. In terms of wheel path, the second alternate front suspension system 1200 is very similar to the front suspension systems described above. However, the alternate front suspension system 1200 is more limited in total feasible wheel travel. For example, with this embodiment 138 mm of wheel travel is near the mechanical feasibility limit, while the other designs allow for up to 200 mm with no component clearance issues. As described previously, the upper and lower mounting points of the shock absorber in the front suspension system can be moved to different locations.

The above has described designs of a fork suspension, with particular consideration to a front suspension for a bicycle. The design provides numerous benefits including in the appearance of the fork, the performance characteristics, the adjustability and the manufacturability. The fork provides flexibility in the bike design and can be readily adapted to match a design language of a bicycle manufacturer such as by modifying the appearance of the upper tubes, or support forks. Additionally, the linkage design can allow the routing of brake hoses, cables, electrical wires to be internally mounted, which can be desirable not only for aesthetics but also for providing protection to the components. Although the overall part count may be higher compared to a more traditional telescoping fork design, the design can use fewer high precision parts, allowing for improved manufacturing costs and a simplified assembly process. Additionally, components such as the supports and linkages arms can be manufactured using forged aluminum and/or welded and/or hydro formed parts. Additionally, the design allows the shock to be at least partially housed within a portion of the fork providing improved protection from dirt and debris which can result in less maintenance and reduce or eliminate the need for expensive "dust wiper" seals used with telescoping fork designs. This may result in a competitive or substantially superior bill of materials (BOM) and final assembled product cost, vs current telescopic forks, when mass manufacturing methods and vertically integrated manufacturing business practices are used by companies that do not possess engineering and manufacturing capabilities that are required to make telescopic forks.

Figure 15:
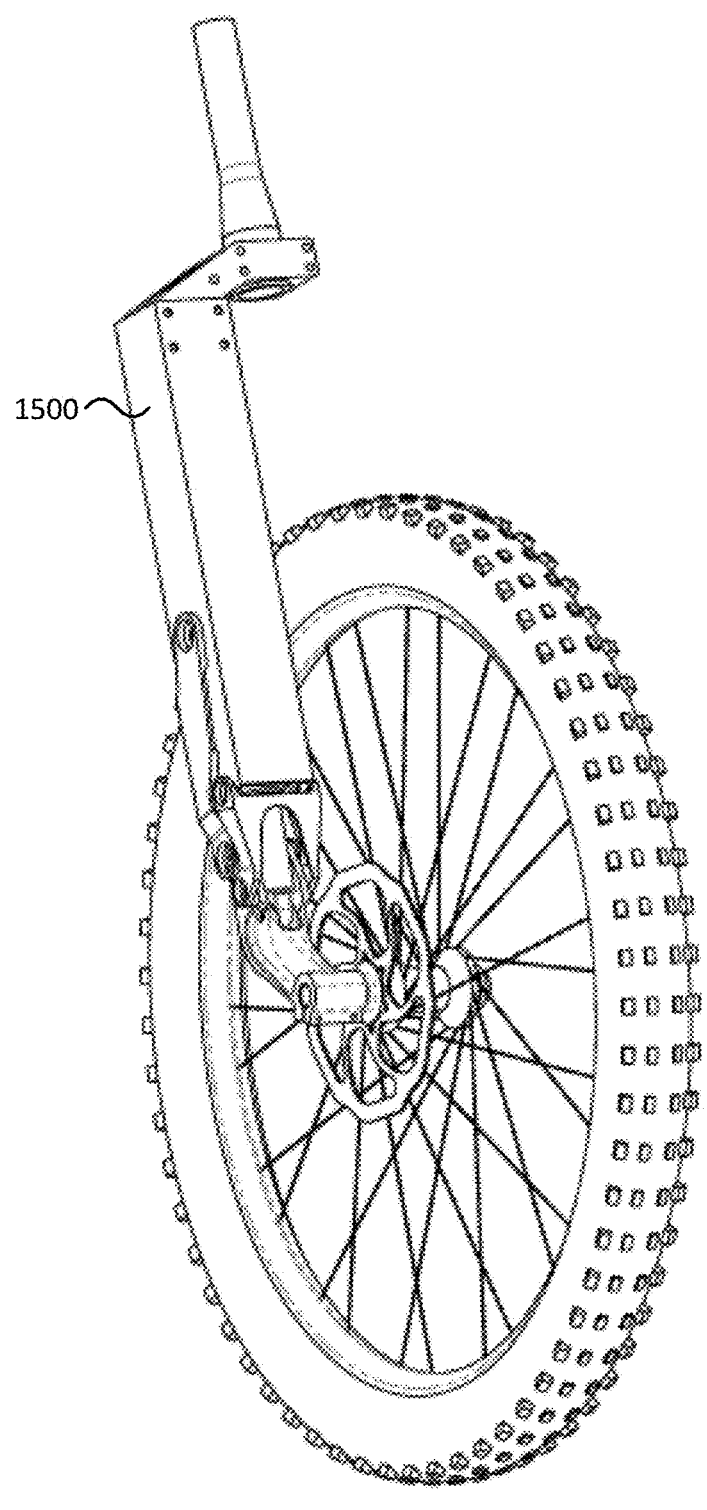
FIG. 15 shows a front suspension system having a single-sided fork design.

FIG. 15 shows a front suspension system having a single-sided fork design. In this embodiment, a "single sided" version of the fork is shown. 1500 This can have the benefit of reduced weight and bill of material cost, for a lighter duty version of the fork. For the design to accommodate the single sided version, the floater brake linkage (which is omitted from FIG. 15) is modified to fit within the more constrained space of the single main tube-which also houses the shock absorber. The modification may be for component clearances only. A special axle and wheel hub may be used to withstand the increased loading.

Figure 16B:
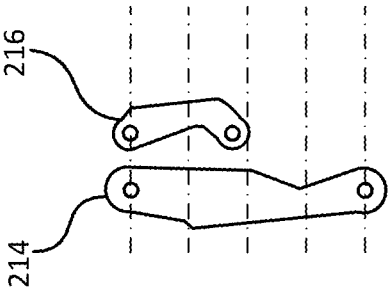
FIGS. 16A and 16B depict the relative arrangement and size of components of a suspension system.
Figure 16A:
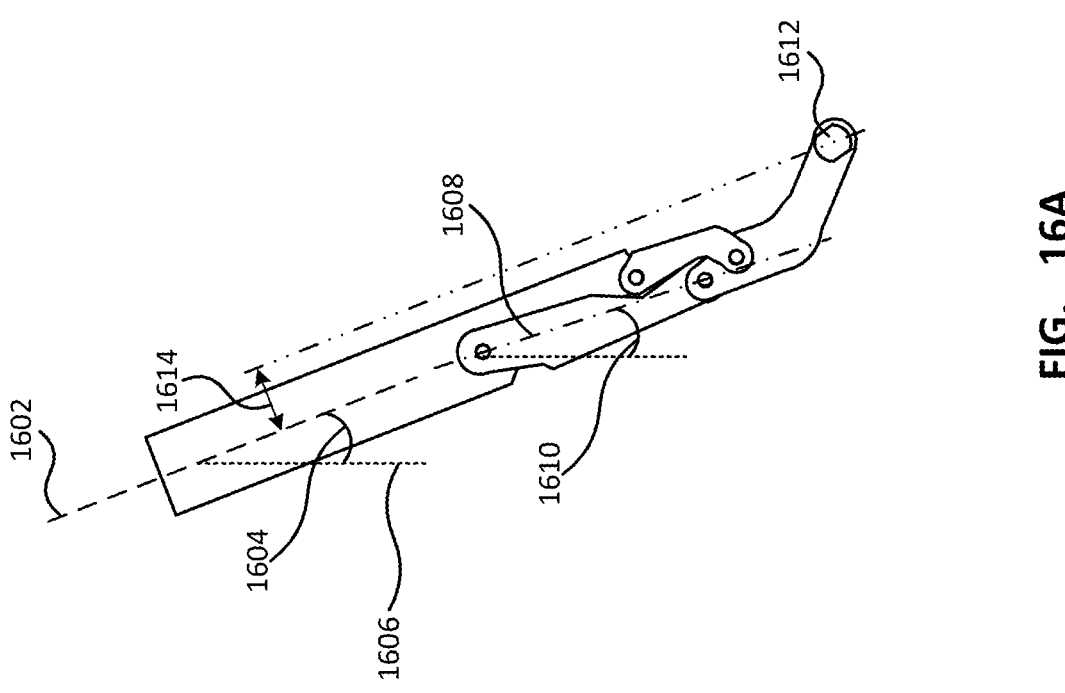

FIG. 16A depicts certain angles and distances of the fork suspension. The fork suspension described above provides a compact linkage that allows the upper and lower linkage arms to be substantially in line with the main fork support in the extended position. It will be appreciated that the linkages do not need to be precisely in line to provide the compact aesthetic. For example, the main fork tube may have a longitudinal axis 1602 which may be parallel to the steering axis. The longitudinal axis 1602 may be at some angle 1604 relative to the vertical 1606. For example, the angle 1604 may be approximately 25°. An axis of the upper linkage arm 1608, which may be defined between the two pivot points, can be arranged at an angle 1610 relative to vertical that is approximately the same as the angle 1604 of the longitudinal axis of the main fork support. For example, the angle 1610 may be within 30° of the angle 1604 of the longitudinal axis, more particularly the angles may be within 15° of each other, or more particularly within 5° of each other. It will be appreciated that the closer the angles are to each other, the more compact the fork design may appear. A location 1612 of the support opening of the wheel arm may be adjusted to vary an offset distance 1614 between the support opening location and the main fork support, or the centerline longitudinal axis 1602 of the main fork support.

FIG. 16B depicts relative sizes of the linkage arms. While the upper and lower linkage arms may have varying dimensions depending upon the particular application, the lower linkage arm 216 is smaller than the upper linkage arm 214, or more particularly a distance between the pivot point connections of the lower linkage arm is less than a distance between pivot point connections of the upper linkage arm. The lower linkage arm may be approximately ¾ the size of the upper linkage arm, or more particularly the lower arm may be less than ½ the size of the upper linkage arm.

The angles and sizes of the components described above with reference to FIGS. 16A and 16B provide for a compact linkage suspension.

Figure 17:
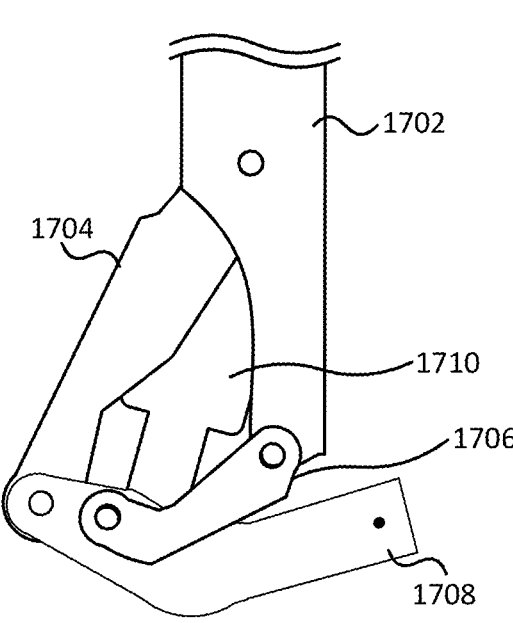
FIG. 17 depicts a side view of a suspension system.

It will be appreciated that other factors may contribute to the compact appearance of the fork, including for example the size of the linkage arms, and coloring/decals/engravings The above has described a front suspension for a bike. It will be appreciated that the fork can be applied to similar devices such as motorcycles, unicycles, scooters, snowmobiles, e-moto, etc. In addition to providing a suspension fork for a vehicle, the suspension mechanics can be used for other applications in which a suspension or remote actuation for an element is provided. A suspension is depicted in FIG. 17. The suspension 1700 could be used to provide shock absorption in various applications, such as a seat suspension, prosthetics, mounts, etc. The suspension has a main member 1702 with one end that can be mounted or fixed to an object. The suspension comprises a linkage similar to that described above comprising an upper linkage arm 1704, a lower linkage arm 1706 and a support arm 1708 instead of the wheel arm described above. A shock 1710 is mounted between the upper linkage and the lower linkage in order to dampen movement (or serve as an actuator) of an element mounted to a mounting point on the support arm. The linkage allows the approximate vertical movement of the element mounted to the mounting point, where for example there is no room to have a linear rail element, or where a leverage ratio is required between the shock/linear actuator and the wheel arm.

It is contemplated that any part of any aspect or embodiment discussed in this specification can be implemented or combined with any part of any other aspect or embodiment discussed in this specification.

It will be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The linkages described above use rigid links connected by pivot connections to provide the movement. The pivoting motion of the linkages may be provided in other ways. For example, the linkages may include one or more flexible linkages as described further below with reference to FIGS. 18-33 that together control the motion of the wheel. The linkages may include a rigid linkage that is connected by a pivotal connection as well as a flexible linkage that has a flexible member that allows the flexible linkage to bend. The flexible linkage and the rigid linkage are both coupled to a main fork arm or element as well as to a wheel support arm. The linkages control the movement of the wheel and a shock absorber or damper may be used to dampen movements of the wheel.

The flexible link may be formed from a material that can provide some dampening of vibrations or movements from the wheel, in addition to the dampening provided by the larger movement of the front suspension. Although not fully rigid, the flexible linkage is still robust enough to act as a load bearing member for the suspension. Further, rather than relying on bearings or bushings in the pivotal connections of the linkage arms, the flexible linkage is instead designed to facilitate the same motion by virtue of its structural properties. The flexible linkage may undergo, for example, rotation or deformation, during the operations of the suspension system to accommodate the movement of the linkages.

The rigid links of the front suspension may use rotational bearings or bushings instead of linear sliding element bushings. This helps reduce friction in the front suspension system, which in turn can improve the shock absorbing characteristics of the suspension. Further, the bushings of the shock/damper of the current design do not bind, or are at least less likely to bind, because they are not load-bearing as in the traditional fork design.

The use of the flexible linkage can further reduce the friction in the front suspension system by eliminating the friction resulting from and at bearing connections during the movement of the linkage arms which can help provide a smoother movement in the travel of the flexible linkage. The flexibility additionally can provide the flexible linkage with greater freedom and degree of motion whereas only single direction motion (i.e. clockwise or counterclockwise rotation) is provided by rotational bearings. This added flexibility can reduce the wear and tear of the front suspension system when the linkages are subjected to uneven forces where forces not in the direction of movement are typically absorbed by the front suspension system, particularly the rotational bearings. Further, the flexibility of the linkage may also provide additional shock and vibration absorption benefits similar to that of a smaller shock damper or absorber. Additionally, the flexible linkages may eliminate one or more moving parts from the suspension such as bearings, bushings, bolts/axles, etc. which can reduce the weight and possibly the cost.

Although the front suspension described herein uses linkages, these linkages are arranged to provide a suspension that has an appearance similar to traditional suspension fork designs, in which each fork of the suspension has a generally linear or tubular shape. Beneficially, in contrast to traditional suspension forks in which telescoping forks provides both the shock absorption and the structural member, the current design relies upon the linkages to provide the structural load-bearing elements while a separate absorber can be provided to absorb the shocks in the movement. While the front suspension system may comprise a shock or damper, the shock/damper is not a load-bearing element of the design, apart from its own functional axial travel.

Effects of various types of friction and vibration can be more effectively suppressed by the current suspension system, as such, the front suspension system of the present disclosure may transfer less vibration including high frequency "chatter", and in turn, forces and accelerations to the rider's body, thus improving tire grip, rider comfort, and riding enjoyment.

Moreover, the design of the linkages of the front suspension assembly provides a low-profile arrangement that resembles a straight line and looks similar to a traditional fork. Accordingly, the look of the front suspension assembly arranged on a bike will appear similar to traditional fork designs, thus providing familiarity to users while achieving advantageous performance.

Further, the linkage design can provide for a near-linear wheel path for the suspension travel parallel axis to the steering axis. This movement is similar to the path of a traditional fork and as such can provide a feel similar to traditional fork suspensions that riders are often accustomed to. The wheel path is the line, or possibly shallow arc that the wheel moves through, in side view, as it goes through the travel of the suspension system. In addition, the linkage positions can be adjusted to provide a different wheel path and even a user customizable wheel path by changing an instant center location of the suspension. The instant center is a virtual pivot of the linkage system, which dictates the center point of the wheel path arc.

Figure 18:
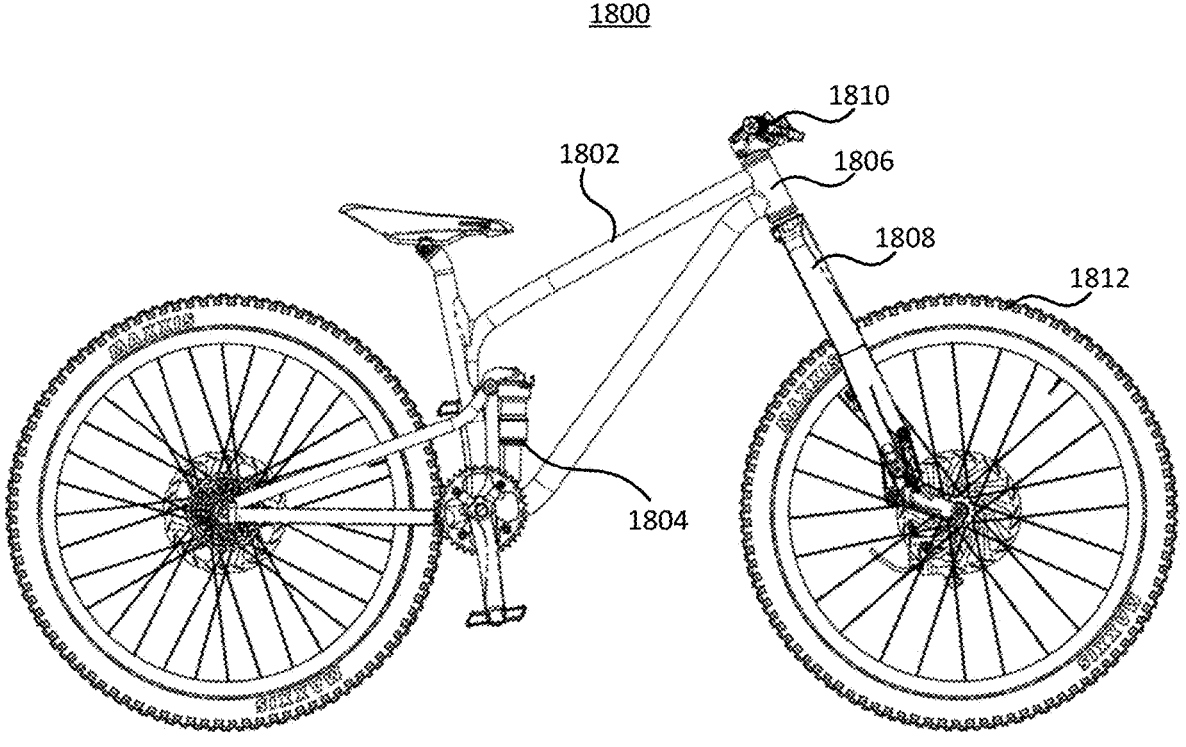
FIG. 18 shows a right side view of a mountain bike having a front suspension system in accordance with the present disclosure.

FIG. 18 shows a right side view of a mountain bike assembly 1800 having a front suspension system in accordance with the present disclosure. The mountain bike 1800 has a frame 1802 and is depicted as a dual suspension bike. The frame 1802 includes a mounting point for a shock absorber 1804 for the rear suspension. The frame 1802 includes a head tube 1806 through which a steerer tube of the front suspension system 1808 passes. The steerer tube of the front suspension passes through the head tube and is attached to the handle bars 1810 of the bike. A front wheel is attached to the front suspension system and can move in a generally linear path approximately parallel to the steering angle, that is the angle of the steerer tube and head tube relative to a vertical plane.

As seen in FIG. 1, and further described below, the front suspension system 1808 supports the front wheel 1812 of the mountain bike using a forked configuration with each leg of the fork extending on either side of the front wheel 1812. As can be seen in FIG. 18 the front suspension system 1808 has a low-profile aesthetic design, particularly when viewed from the side as depicted in FIG. 18, that is similar to the look of a traditional front fork suspension. The design can provide a straight line appearance of the linkage components that is substantially in-line with the fork in a resting, or fully extended position shown in FIG. 18. It is in the resting position of the front suspension system that bikes are commonly displayed, photographed, and sold. The front suspension system 1808 disclosed herein thus not only achieves desirable wheel path and rider handling dynamics, but also provides an aesthetic that is similar to a traditional fork design and thus maintains a design that is familiar to, and possibly preferable, riders. While maintaining sufficient familiarity, the aesthetic is also clearly distinguishable from a traditional fork design.

Figure 19:
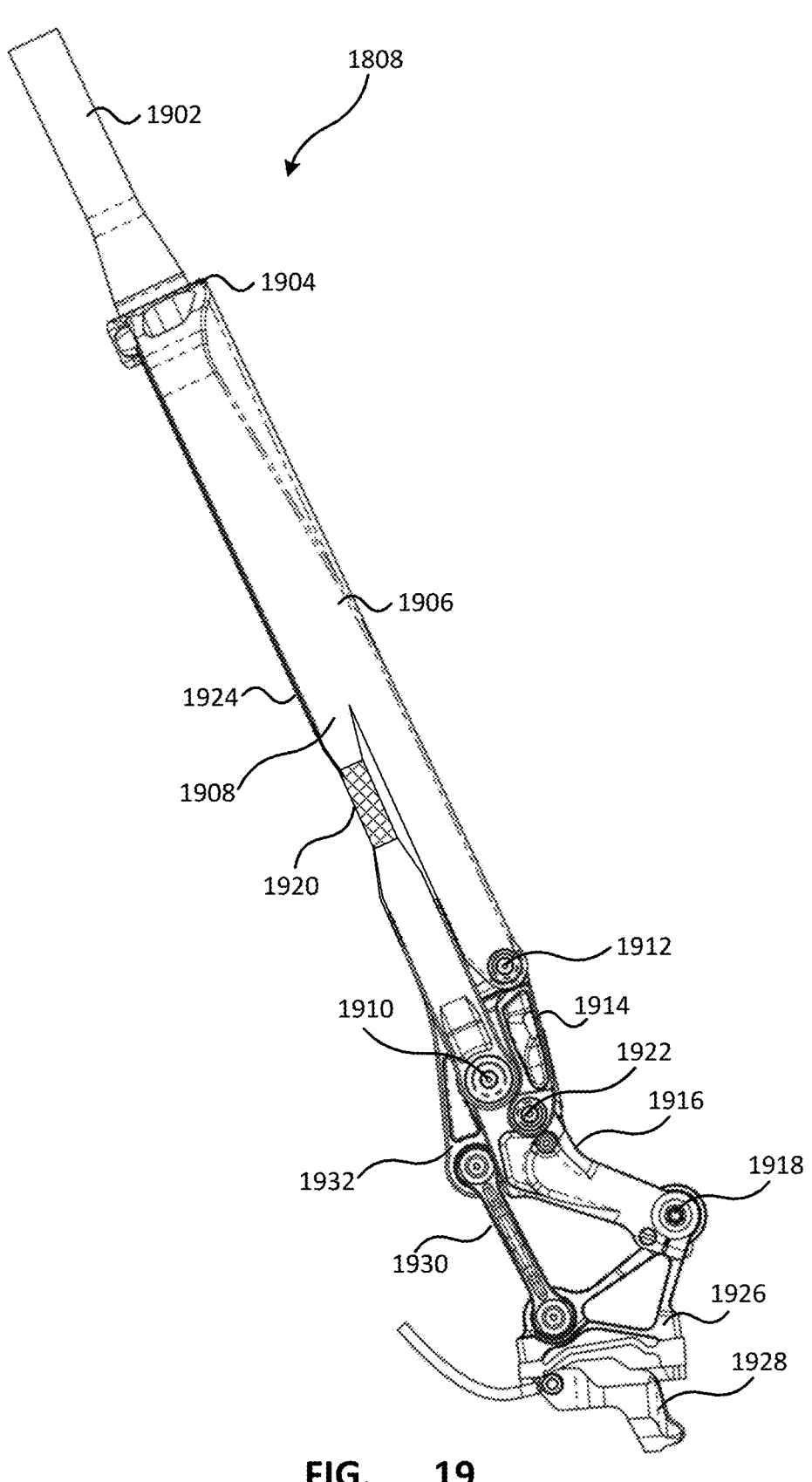
FIG. 19 shows a right side view of the front suspension system at full extension of the suspension travel.

FIG. 19 shows a right side view of a front suspension system 1808 at full extension of the suspension travel. FIG.

Figure 21:
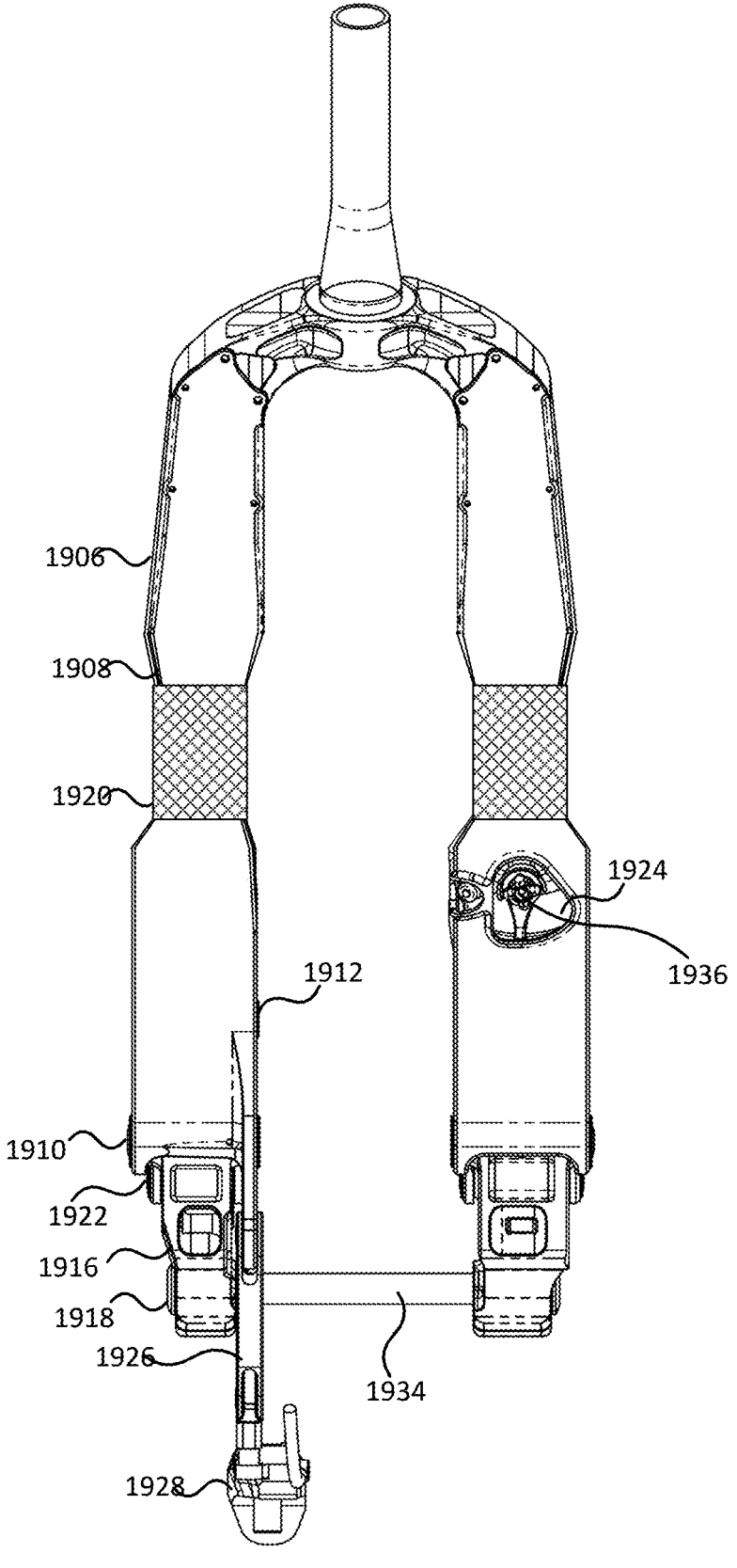
FIG. 21 shows a rear view of the front suspension system at full extension of the suspension travel.
Figure 22:
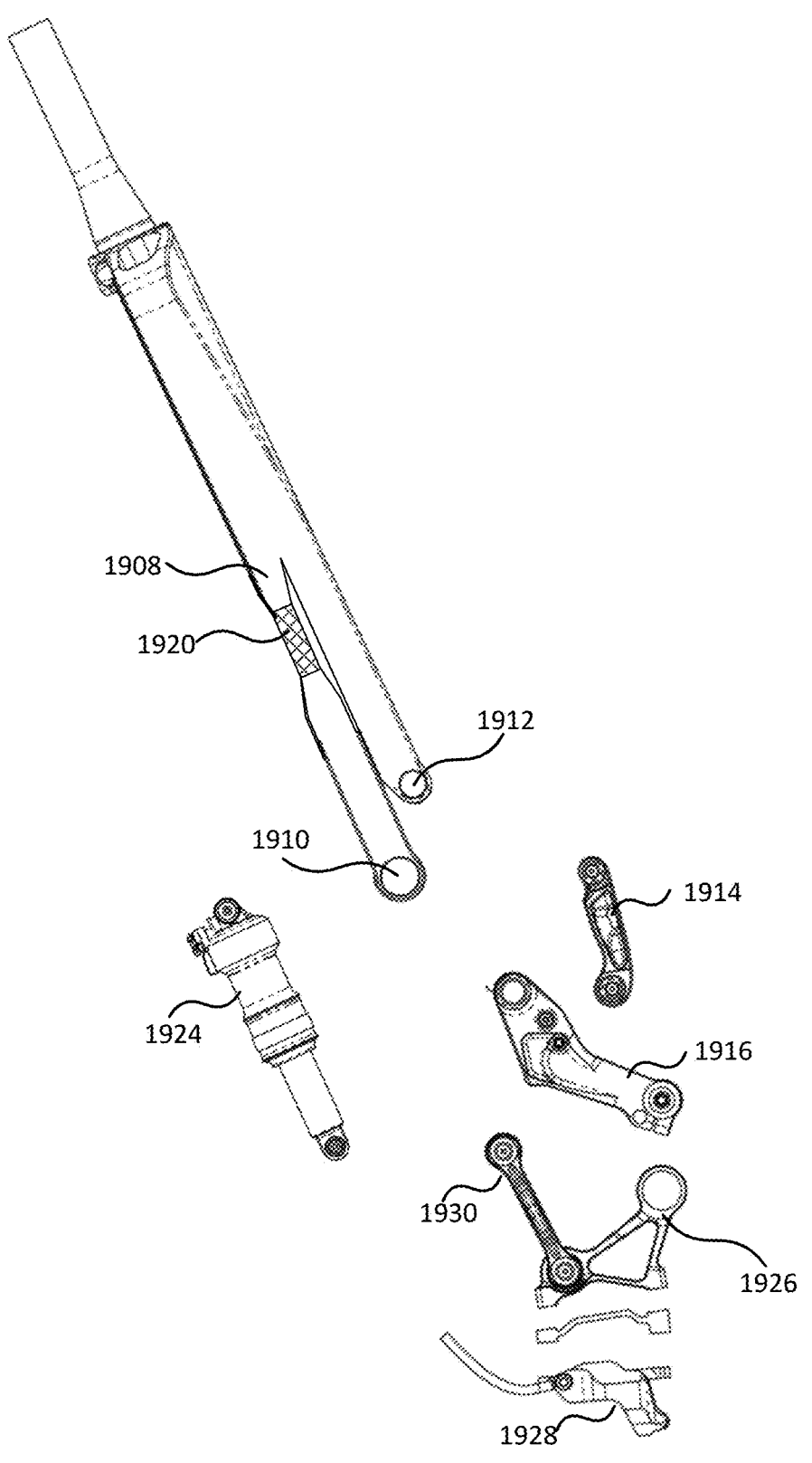
FIG. 22 shows an exploded view of components of the front suspension system.
Figure 23:
FIG. 23 shows a cut away side view of the front suspension system.

20 shows a left side view of the front suspension system at full extension of the suspension travel. FIG. 21 shows a left side view of the front suspension system at full extension of the suspension travel. FIG. 21 shows a rear view of the front suspension system at full extension of the suspension travel. FIG. 22 shows an exploded view of components of the front suspension system. FIG. 23 shows a cut away side view of the front suspension system.

The front suspension system 1808 comprises a steerer tube 1902 which may be provided as part of the front suspension 1808 or may be an OEM or third party supplied part. The steerer tube 1902 shown is a 1.5 inch to 1⅛ inch tapered steerer tube, with the 1.5 inch diameter at the lower attachment although a wide range of alternative dimensions are possible. The steerer tube 1902 attaches to the mountain bike frame, via a head tube and headset. The steerer tube 1902 may be attached to a crown 1904 with a press-fit as depicted, although it may be connected using clamping screws, and/or high strength adhesive, etc. Additionally or alternatively, the crown and steerer tube may be manufactured as a single component. The crown 1904 serves the function of a bracket, and supports the fork components while transferring steering inputs. The crown 1904 attaches the steerer tube 1902 to the main fork elements 1906 In this case, the crown 1904 and the main fork elements 1906 are depicted as a unified single part, but they may be separate. It will be appreciated that the mechanical representation shown in FIGS. 19-23 is just one embodiment, and that other configurations of the crown 1904 are possible.

The main fork element 1906 is generally parallel to the steering axis, though it can also be on a slight angle. The main fork element 1906 may comprise an upper portion that includes the end where the crown 1904 is arranged and a lower portion that includes the end opposite from the crown 1904. As depicted most clearly in FIG. 22, the main fork element 1906 may comprise a lower link connection point 1912 at the lower portion of the main fork elements 1906. The lower connection link point 1912 is used to connect a lower linkage arm 1914 to the main fork element. The main fork element 1906 may additionally comprise a connection to a flexible link 1908. The connection to the flexible link 1908 may be located between the lower connection link point 1912 and the crown 1904. In some embodiments, the flexible link 1908 may be formed as part of the main fork elements 1906. In such an embodiment, the lower portion of the main fork elements 1906 may be split into two individual branches originating approximately at the connection to the flexible link 1908. The front branch element comprises the end that includes the lower link connection point 1912 while the back branch element comprises the flexible link 1908. While the back branch element may have a greater length than the front branch element, the lengths of the two elements may be adjusted with respect to one another based on the dimensions of other linkages and locations of connection points.

It will be appreciated that the fork elements are described with reference to a single side of the fork, however substantially similar components are arranged on the opposite side of the fork, although a shock/damper may only be included in one side of the fork.

The suspension system includes a linkage comprising a flexible link 1908, a lower linkage arm 1914 and a wheel arm 1916. The flexible link 1908 comprises a flexible member 1920, which may be formed as part of the flexible link 1908 or main fork element or the flexible member may be attached to the flexible link or main fork element. A connection to the wheel support arm 1916 is arranged at one end of the flexible link 1908. The connection may be a pivotal connection 1910 as depicted or other type of connection that allows relative movement between the flexible link 1908 and the wheel support arm similar to the pivoting motion. The wheel arm 1916 is further connected to a lower linkage arm 1914 at a connection, depicted as a pivot connection 1912. The lower linkage arm 1914 and wheel arm 1916 each comprises at least two connections, which are each depicted as pivot connections. Each of the pivoting connections depicted in FIGS. 19-23, may comprise pins, rods, bolts or other similar components that pass through respective openings, which may include ball bearings or other bearings in order to reduce friction. The lower linkage arm 1914 is connected to the main fork element 1906 at the lower link connection point, which is depicted as a pivot connection 1912, while the flexible link is connected to the main fork element at a connection location that may be located between the lower link connection point 1912 and the crown 1904. The flexible link 1908 may be formed as part of the main fork element or may be attached to the fork element using various techniques such as adhesives, mechanical fasteners, etc.

The bottom ends of the flexible link 1908 and the lower linkage arm 1914 are both depicted as being pivotally attached to the wheel arm 1916. The wheel arm 1916 supports the wheel at a cut out, drop out or other opening 1918, which may be supplemented by additional clamping "pinch" bolts for stiffer and more precise supporting of the wheel axle. The bottom end of the flexible link 1908 may be pivotally connected to the wheel arm at a connection point 1910 opposite from the wheel support 1918, with the lower linkage arm 1914 connected to the wheel arm at a position 1922 between the connection point 1910 and the wheel support 1918.

A shock absorber 1924 is at least partially housed within the main fork element 1906. The shock absorber 1924 may also be partially housed within a portion of the flexible link 1908. The shock absorber 1924 is most clearly seen in the exploded component view of FIG. 22. The shock absorber 1924 may be a piston style absorber and may be mounted at one end to the main fork element 1906 and/or the upper linkage arm 1912. The shock absorber 1924 may be the same or similar to the shock absorber 1804 depicted in the rear suspension of FIG. 18. The shock absorber 1924 and the may be connected to the main fork element using a pivoting connection or other connection that allows the shock absorber to move as required. The opposite end of the shock absorber may be connected to the lower linkage arm 1914 and/or the wheel arm 1916. The lower end of the shock absorber 1924 maybe connected to both the lower linkage arm 1914 and the wheel arm 1916 at the pivotal connection point 1922 between the lower linkage arm 1914 and the wheel arm 1916.

As depicted in the rear view of FIG. 21, the fork element may provide access to one or more adjustment controls 1936 of the shock absorber 1924. The adjustment controls may be accessible through one or more openings that allow a user to adjust the one or more controls of the shock absorber to adjust characteristics of the shock absorber such as rebound and/or compression characteristics of the shock. The shock absorber 1924 may also be at least partially accessible to perform certain maintenance tasks on the shock absorber without disassembling the front suspension system.

Figure 20:
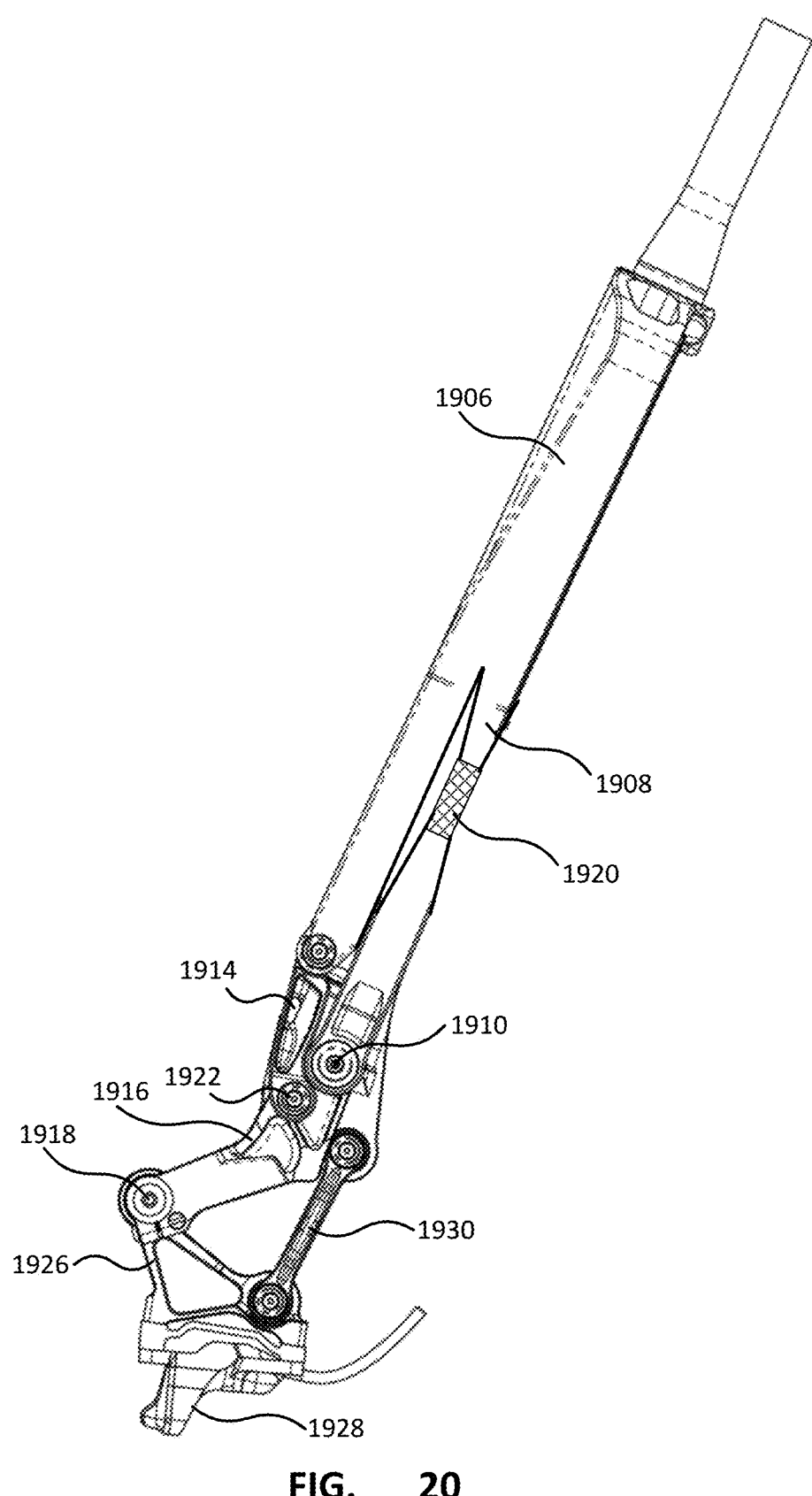
FIG. 20 shows a left side view of the front suspension system at full extension of the suspension travel.

As can be seen from FIGS. 19 and 20, the right side fork element and the left side fork element comprise the same linkage elements. However, the suspension system may comprise a single shock absorber, which is depicted as being located in the right side fork element. It will be appreciated that the shock absorber could be located in the opposite side of the fork, or shock absorbers could be located in both sides of the fork.

A shock absorber/damper is generally a unit composed of a fluid damper and a spring. The fluid damper generally comprises a shaft and a piston, with small slits or shims that flex to allow fluid to pass, being activated to varying degrees at different fluid velocities, also depending on external user adjustable tuning presets. The spring is generally either compressed air, which may be atmospheric air or pure nitrogen, or a coil. In some cases, an air spring may have a "negative" chamber, with the purpose of canceling out the initial force required to compress or preload the shock. This negative chamber may be self-balancing, or user pressure adjustable. The shock absorber may be a standard OEM or 3rd party shock absorber may include an air spring and damper, but other versions are possible including for example coils, also called "coil over", or a separate damper and spring unit. The damper may make use of an OEM "cartridge" damper/spring of a standard telescopic fork, with appropriate end eyelet pivot attachments added. The damper may also be rotary, alongside a rotary or torsion coil spring or a rotary air spring. The spring may also be a leaf shape, made of a spring steel, titanium, or carbon.

The upper pivot of the shock absorber can be moved in all directions without affecting function, subject to given length of the shock. The upper pivot can attach to the main fork element, or to the upper linkage arm, possibly at a position near the upper link pivot, with negligible functional difference. The lower pivot point of the shock absorber affects the leverage ratio, or "motion ratio" of the shock, and so can be moved depending on the characteristics of the chosen shock. The lower pivot point connection may be user-adjustable. The pivot connection with the shock absorber can also be shared with the pivotal connection between the lower linkage arm and the wheel arm, which may save weight and cost and reduce fastener counts.

The flexible link 1908 is mostly in-line with the main tubes during full extension. During the initial portion of compression, the upper linkage arm rotates clockwise around an imaginary pivot point located at the point of connection to the main fork elements 1906. Similarly, the lower linkage arm is mostly in-line with the main fork elements, that is, the lower linkage fits within the envelope of the main fork element while the suspension is fully extended. The lower link 1822 rotates clockwise around its upper pivot during compression of the front suspension.

The connection location of the flexible link 1908 to the main fork elements 1906 may be moved up or down, lengthening or shortening the link, with negligible functional difference. The location of the shock pivot, which may be shared with the connection location of the flexible link 1908, can be repositioned to be in different locations (above, below, etc.) with negligible functional difference. The shock pivot may also be attached to the flexible link 1908, rather than to the main fork elements 1916, with no or little difference in function. The pivot location 1910 of the flexible link 1908 may be sensitive to relocation, with a few mm movement having a relative large effect on the wheel path and shock actuation ratio.

The location of the pivot connection between the lower linkage arm and the main fork element can be moved in any directions with minimal functional impact. Changes in the location of the pivot connection may result in a minor change of the wheel path and instant-center location. The location pivot connection between the lower linkage arm and the wheel arm may be more sensitive to positioning, with a few mm of relocation having relatively large effects on the wheel path. If both the upper pivot point and lower pivot points of the lower linkage arm are moved together, for example, moving the entire lower linkage arm in the forwards direction while maintaining its orientation, the wheel path can be largely maintained, but the aesthetic changes.

The wheel arm 1916 provides the wheel travel, in the path of motion of the suspension, primarily by way of counterclockwise rotation, but also translation upwards and rearwards, relative to the forward direction of bike motion. Since the wheel pivot is below and slightly ahead of the flexible link and the lower linkage arm, which constrain the wheel arm's motion, it can be viewed as a "swing arm" or "leading arm", where the swinging rotation is the primary function, as opposed to translation, but where the fixed pivot of the swing-arm changes location as the swing travels. This combined translation and rotation forms the instant-center of rotation of the wheel arm, as a virtual point in space, forming the instantaneous center point of the wheel path arc. This means that the wheel path can be substantially independent of the length of the flexible link and lower linkage arm. This also means that various travel and wheel path configurations can be achieved with very minor changes to the overall linkage, in some instances using the same components with adjustable pivot locations, or a travel limiting spacer in the damper unit.

As described earlier, the shock absorber lower pivot can be moved, affecting the wheel travel, or the ratio of wheel travel to shock absorber travel The axle pivot can be moved, or made user-adjustable, to change both the wheel path and the "rake". Here, "rake" is used to denote the offset of the axle from the steering axis or the centerline longitudinal axis of the fork, in side view. For example, the axle being 44-52 mm forwards offset from the steering axis is fairly standard for a traditional bike front suspension. On the linkage fork, moving the axle point forwards makes the wheel path curve slightly towards horizontal, rather than being nearly linear and parallel to the steering axis. Moving the axle upwards has the same effect as above. Moving it downwards, or rearwards, makes the wheel path slightly more vertical.

The front suspension system depicted above has a shock absorber 1924 in one side of the fork. The shock absorber may be an off-the-shelf shock, or may be custom-tuned and/or custom-designed for this linkage fork. The shock absorber provides both dampening to the movement as well as a returning spring force. The shock absorber may be provided as a single unit that provides both the dampening and spring or [may] the dampening and spring may be provided as separate components. The shock absorber unit depicted is "hidden" inside the main fork element 1906. This is possible due to both the side view arrangement of linkages, which allow room for the shock to not be obstructed—for example by pivot bearings and bolts, as well as ranges of motion. In some embodiments, the clearance for the shock would only be possible for a narrow range of motion.

An additional consideration in shock mounting location is "leverage ratio". Leverage ratio is equal to wheel travel divided by shock absorber travel, and is usually in the 2-3.5:1 range for a rear suspension, and 1:1 for a telescopic fork. Each shock absorber unit has a specified range of forces, for example, given in terms of rider weight and velocities to operate within. These are highly dependent on the leverage ratio, as a high ratio can mean too high loads, but too low speeds. In the current arrangement, the leverage ratio falls within typical OEM recommendations for rear suspension OEM shock absorbers, allowing them to be utilized in the current embodiment with no modifications, and only minor tuning possibly by a bicycle mechanic or by the rider. This can reduce R&D overhead that may be necessary for configuring the suspension to have desired characteristics. If desired, a different ratio can be used with minor modifications to the shock mounting points, allowing for a custom unit to be used according to desired size and shaft velocities.

In arrangement depicted, the leverage ratio is not constant throughout the travel of the shock. The ratio starts high, then decreases slightly and stays stable to the end of the shock travel. This is done specifically to prevent a so-called "harsh bottom out", where during a large bump, the fork reaches the bottom out condition abruptly, rather than gradually. This could occur if the leverage ratio rose through the travel instead of decreasing, meaning the suspension becomes easier to compress as it travels closer to bottom out. Another reason is to maintain the balance of the bike, so that the front suspension is not sitting too low in the travel relative to the rear suspension, causing the rider to be tilted forwards. The linkage arrangement may be easily adjusted to provide different leverage ratios gradients, to increase or decrease the bottom out resistance as well as overall ride feel.

The front suspension system described herein allows for the use of an OEM or existing 3rd party shock absorber easily. The design is flexible enough to accommodate different length shocks without major revisions, for example, simply moving the upper pivot of the upper link or moving the lower pivot of the shock absorber. It can also adapt to different shock strokes, for example, 45, 50 or 57 mm, by moving the lower shock pivot point fore/aft or up/down. A different linkage arrangement may not actuate an OEM shock at a suitable leverage ratio, for example, below 2, or above 3.5, and thus be outside of the shock's recommended range. An extension adapter for one shock eyelet may be added, to fit a shorter shock to a longer overall length. This may allow the use of the same shock unit in several versions of the fork (for example, a 135 mm travel and 160 mm travel version)

The front suspension described herein has a compact aesthetic, with the shock being hidden by, or partially housed within, a portion of the front fork. Being hidden means it is also fairly well protected from dirt and direct hits, as well as general handling during transport or storage. A small rubber dust/dirt shield may be used for additional protection, wherever there is danger of gravel or dirt contacting the shock shaft and scratching it. In dry riding, the linkage fork, which may include a dust shield for the shock, protects the shock shaft from dirt and dust much better than a telescopic fork, reducing seal deterioration which may increase friction.

The primary trailside adjustment levers of the shock absorber are easy to reach from the rear of the fork, where there is also access to the air-valve that adjusts the stiffness of the air spring, if one is used. If a lockout, or partial lockout, similar to a "pedaling platform" on rear suspension, lever is used, it may be routed via cable to the handlebar, alongside the brake cable. This lockout lever can be a standard OEM lever that is used for rear suspension lockouts. In some embodiments, the front and rear lockouts may be combined into a single synchronized lever. The cable routing may be external, or may be internal/hidden inside special holes in the fork structure, for improved aesthetics and ease of cleaning.

Compared to a telescopic fork, where the leverage ratio is 1:1, in the present front suspension assembly it is adjustable, and is thus able to be tuned to rider preferences and shock constraints. For example, OEM air-spring shocks are non-linear in their spring rate throughout the travel. This shortcoming can be accommodated by the leverage ratio of the suspension assembly, where in a telescopic fork it cannot be adjusted. This can also be adjusted internally in the shock, with the use of volume reducing spacers, also called "tokens".

Figure 34:
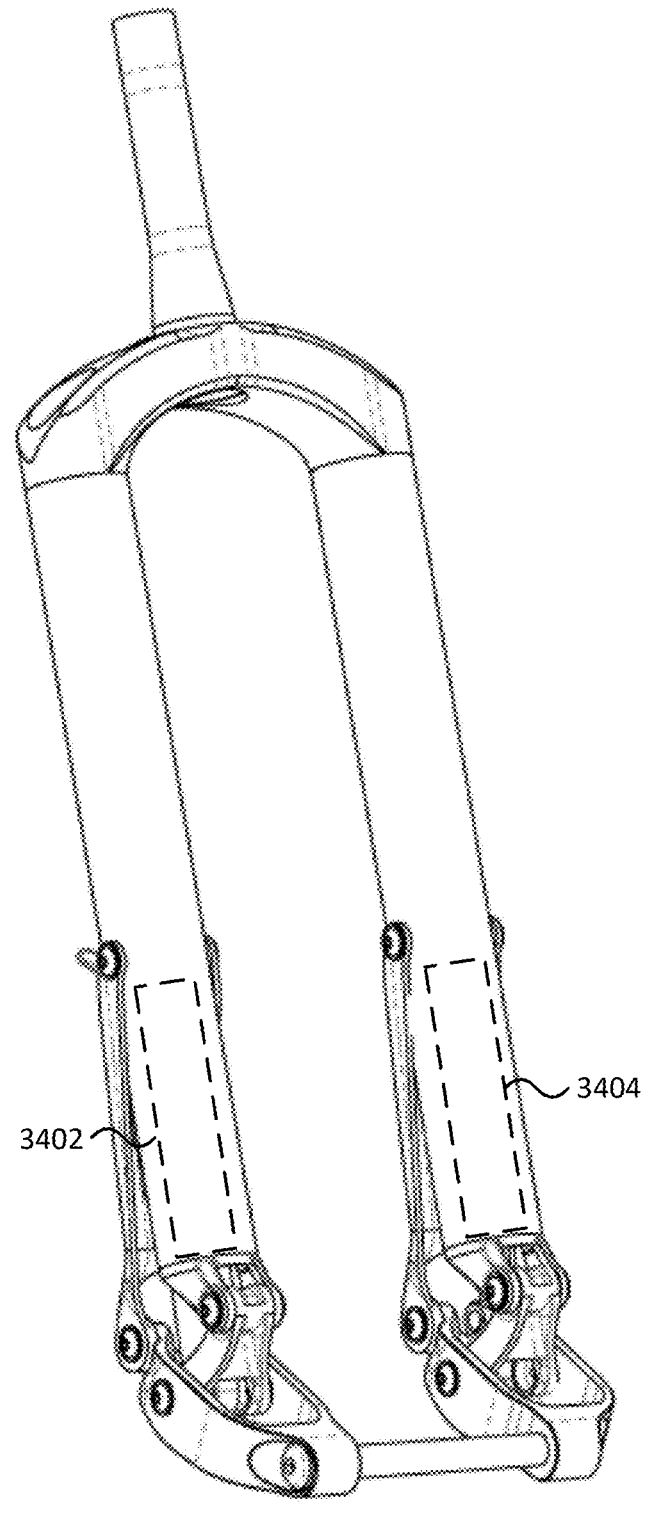
FIG. 34 depicts a front right perspective view of the alternative front suspension system.

The shock absorber can be an OEM coil over type shock comprising a coil spring, and a fluid damper, instead of the current embodiment of air-spring and damper unit. Another option is a leaf spring, and a separate fluid damper. Another option is a rotary damper, with a separate or integrated rotary or torsion spring. Finally, as depicted in FIG. 34 it is also possible to separate the air-spring unit and the fluid-damper into 2 custom piston-cylinder units, and have one 3402 in the right main fork element and the other 3404 in the left main fork element. This can balance the forces better, and result in a stiffer chassis. If further balancing is required, an arrangement with 2 matched air springs, with one in each fork element, as well as one damper in a single leg, may be used. The spring will be responsible for the majority of the forces, with the damper contributing less.

Figures 24A, 24B, 24C, 24D:
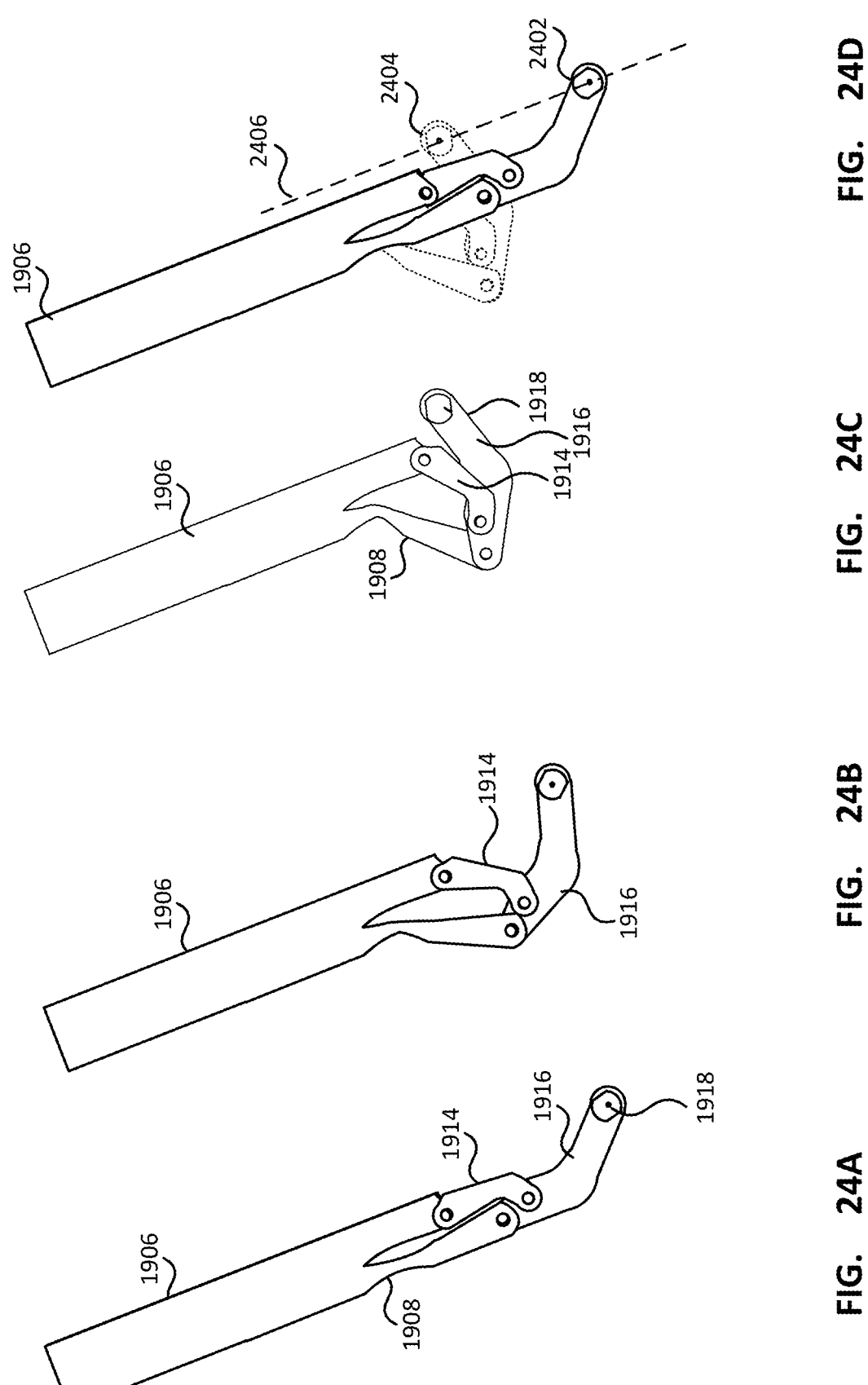
FIGS. 24A-24D depict a side view representation of the operation of the suspension system.

FIGS. 24A-24C shows a side view of the front suspension system 1810 at three travel states: full extension (FIG. 24A), mid-travel (FIG. 24B), and fully compressed or bottom out (FIG. 24C). FIG. 24D shows these positions with the wheel path during the travel shown. It is noted that only the fork and linkage components are depicted in FIGS. 24A-24D for clarity of the figures.

Full extension of the suspension corresponds to a resting state of the bike, with no rider, when the shock absorber is not compressed. Once a rider is on the bike, the static load of the rider's weight, depending on preferred stiffness of the fork shock absorber unit, will bring it to a "mid travel" state, or near it, which may be for example, 20-30% of total wheel travel. The mid-travel state occurs when the shock absorber is at approximately 50% compression. Large bumps or jump landings encountered would bring the fork to a "bottom out" state, corresponding to full compression of the shock absorber, which is governed by the shock absorber built-in travel stopper.

Through the travel, the flexible link 1908 and lower linkage arm 1914 rotate clockwise, while the wheel arm 1916 rotates counter-clockwise. It would be appreciated that while the rotational movements of the lower linkage arm 1914 and wheel arm 1916 are facilitated by the pivot connections, the flexible member 1920 of the flexible link 1908 may be able to facilitate the same motion in the flexible link by virtue of its intrinsic properties/flexibility. Alternatively or additionally, the flexible link may be configured to bend or deform at the location of the flexible member as to mimic the rotational movement or otherwise allow the flexible link to perform the movements required by the front suspension system. It should be noted that the movement of the flexible arm may be similar to the rotational movement performed by a linkage arm comprising an additional pivot connection at the connection to the main fork elements 1906 instead of a flexible member as the linkage arm rotates clockwise around the pivot connection.

The smooth ride offered by the fork exists primarily due to the reduction, both in quantity and in effect, of sliding-element bushings, and thus, reducing sliding friction which may be both static and dynamic in the system. This reduction in friction lowers the force threshold to activate the fork, and as such increases sensitivity to absorbing small, high-frequency bumps that may be fatiguing and damaging to the rider's hands (measured in a study to exceed ISO maximum safe vibration frequency) over time as well as compromising tire grip at high speeds, with significant danger of crashing. Improved absorption means that the high frequency bumps/vibrations do not reach the rider's hands, and that the tire remains in more consistent contact with the bumpy terrain.

A traditional fork often has two sliding surfaces, each with at least two heavy duty bushings-designed for low-friction axial motion, as well as high radial load capacity, for example, from hitting a root during riding, which will not be axial-only forces on the sliding element. In some forks, this can be 1-5 kg of friction, or possibly much more once the fork has ridden several hours past its yearly servicing. The present front suspension assembly improves on this by having one sliding surface instead of two of the traditional fork, in the form of the small shock absorber unit. The shock absorber unit is decoupled from the irregular multi-directional loading (such as rearwards force in traversing a root, or lateral force in cornering) that the fork experiences, and so the bushings of the shock absorber unit do not experience any radial load in comparison to a traditional fork bushing. As such, stiction is reduced, and the bushings do not need to be heavy duty and sliding friction can be reduced. The shock absorber may be actuated at a leverage ratio in the 2-3.5:1 range, relative to wheel travel. Any friction in the shock absorber bushings and air spring seals is divided by a factor of 2-3.5. When considering this, as well as the reduction from 2 to 1 sliding surface, total system friction may be reduced by at least 5:1 relative to a traditional fork.

The present front suspension assembly may use rotational bearings instead of bushings, and so friction inherent to the system (excluding the shock absorber) is negligible. This is helped by relatively small pivot angular travel-only the lower link travels approximately –90 degrees, while the flexible link typically travels approximately-7.5 degrees and in some cases up to 10 degrees. It should be noted that the actual rotational movement or deformation of the flexible link may be localized at only a portion of the link or to the flexible member (or a portion thereof). The area of deformation may comprise a zone formed by a length of 20-30 mm along the length of the flexible link. The use of rotational bushings is also acceptable, as their small size and rotary, as opposed to linear, motion contribute negligibly more friction than the bearings to overall system friction. In some applications, they may be preferable due to reduced cost, size, and weight, at the expense of increased wear, free-play, and friction.

Further, the replacement of bushings and alternatively rotational connectors such as bearings and bushings with a flexible member in flexible link, which would otherwise be a rigid linkage arm with two pivot connections, can further reduce the friction in the system and enhance rider experience. In addition to being flexible such that the movement of the flexible link is possible, the flexible link or at least the flexible member may be formed from a material that can provide some dampening of vibrations or movements from the wheel. The use of the flexible link may further eliminate friction resulting from and at bearing connections during the movement of the linkage arms for smoother linkage movement. The flexibility may also provide the flexible link with greater freedom and degree of motion whereas only single direction motion (i.e. clockwise or counterclockwise rotation) is provided by rotational bearings. This added flexibility can reduce the wear and tear of the front suspension system when the linkages are subjected to uneven forces where forces not in the direction of movement are typically absorbed by the front suspension system, particularly the rotational bearings. Further, the flexibility of the flexible link may also provide additional shock and vibration absorption benefits similar to that of a smaller shock damper or absorber.

An additional factor in the smooth ride is the reduced un-sprung mass. Un-sprung mass refers to mass that is below the suspension system, such as the wheels, axle, brake caliper. In a traditional fork, the entire lower legs of the fork moves together with the wheel. This may mean an additional 1 kg of mass reacting to the bumps together with the wheel as un-sprung mass. In the present front suspension assembly, the only element moving together with the wheel is the axle and brake caliper—the rest of the links contribute only partially, since they rotate as well as translate and so, the total un-sprung mass in the current suspension system may be <0.5 kg. This has a positive influence on the dynamic response of the suspension, especially for high-frequency bumps.

The near-linear wheel path, parallel to the steerer tube axis can be approximately seen in FIG. 24D. This is achieved by a particular arrangement of a 4-bar mechanism where the flexible link and lower linkage arm are of substantially different lengths, causing the wheel arm to tend to counter-rotate relative to the links rotation as it travels. This rotation of the wheel arm around the instant-center formed at the intersection point of the lines drawn by the flexible link and lower linkage arm balances with rearwards motion of the instant-center, to generate near-linear travel for the desired travel range.

The specific distances between pivots can be fine-tuned to move the wheel path, including more vertical, more angled rearwards, more curved vs more linear, or even somewhat S-shaped. However, this particular kinematic arrangement is special in its ability to balance out the wheel path into a near linear curve. To achieve a similar wheel path, at a desirable wheel travel of approximately 100+mm, with a different 4 bar arrangement would require 2 fairly long parallel links, at near-perpendicular to the steering axis. This would not be an aesthetically compact arrangement. Shortening the above mentioned parallel links would cause the wheel path to be arc-shaped vs. linear, or to not be able to surpass the 80-100 mm of wheel travel desired for a mountain bike fork. Even at short travel distances of for example approximately 30-60 mm, it is difficult to achieve a non-arced wheel path with previous linkage arrangements without significant disruption of the "tubular" aesthetics of the current linkage arrangement.

In the current suspension system, by having the wheel pivot below the two links, and having one link be approximately ½ to ¾ the length of the other, the counter-rotating motion of the wheel arm is able to provide a near-linear wheel path while still providing a compact appearance to the fork. If the wheel pivot were above, or located within the two links, the wheel path would not be linear, nor be in the desired general upwards direction while maintaining a compact aesthetic.

The suspension described herein may incorporate a floater brake linkage to maintain desirable brake behavior, such as 0%-40% anti-dive. While such a brake linkage can result in additional weight and complexity, a benefit is that it allows an additional parameter for tuning by changing the anti-dive percentage to suit different riders while maintaining the compact aesthetic of the fork. Previous linkage fork designs did not use a floater brake linkage, and may have had compromised their design elsewhere to accommodate acceptable braking characteristics, while also not allowing user adjustment. The desired anti-dive characteristics of a fork may be rider dependent and some riders do not like the ride feel of near-100% anti-dive that is present in some other linkage forks. The anti-dive characteristics of the current fork can be readily adjusted, and may include functionality for providing user-adjustability to the anti-dive characteristics.

The suspension fork may further include a brake assembly. The brake assembly may be located on an opposite side of the fork as the shock absorber, or on the same side as the shock absorber. The brake assembly may comprise floater brake linkage having a brake mount 1926 for a brake caliper 1928. The brake mount may be a floater brake linkage comprising the brake mount 1926 that is pivotally connected, possibly at the wheel axle point or another connection point on the wheel arm. Although depicted as separate components, the brake mount 1926 and the caliper 1928 may be provided as single component. Additionally or alternatively, one or more adapter plates may be provided between the brake mount 1926 and the caliper in order to mount different calipers or rotor diameters. The brake mount 1926 is also pivotally connected to a brake rod 1930. The opposite end of the brake rod is pivotally connected to a brake pivot 1932 that is either part of the flexible link 1908, or is rigidly attached to the flexible link 1908.

The floater brake pivot 1926 can be moved by changing the connection points of the brake linkages. The movement can change the location that the brake caliper clamps on the disc, which may or may not affect the anti-dive characteristics of the fork, depending on specific parameters changed. Anti-dive counteracts the force that tends to cause the front suspension to compress or 'dive' under braking, felt as a "pitching forward" of the rider and bike. 0% anti-dive is a state where applying the brakes will not influence the fork diving behavior under braking, meaning that the bike will dive under braking, in a similar manner to a standard mountain bike with a telescopic fork. 100% anti-dive means that applying the brakes causes a moment counteracting the deceleration-induced moment, resulting in the fork not diving under braking. Generally speaking, 0% or near it, for example 10-20%, anti-dive is desirable for responsiveness of the front suspension to the terrain. However, the anti-dive characteristics of the brake mounting of the current fork design can be adjusted to provide between 0% and 100% anti-dive characteristics, or to vary the anti-dive at different positions in the wheel travel. Moving the floater brake pivot may require moving of other pivot locations in the floater brake linkage, to achieve a desired anti-dive percentage. The floater brake pivot can also be attached to the main fork elements, or to the lower linkage arms, with appropriate changes to the other pivots in the floater brake linkage.

The brake rod 1930 is a link attaching to the upper linkage arm 1906 through the floater brake pivot 1932, and the brake arm 1926, which holds the brake caliper 1928. Similar to the floater brake pivot 1932, the brake rod 1930 can be relocated substantially, and there are several linkage combinations that will achieve desired "anti-dive", generally selected to be 0%-40% in the current embodiment.

The brake arm 1926 is a bracket that attaches to various elements, namely the brake rod 1930 at a pivot; the wheel arm 1916, at a pivot that may be shared with the wheel axle 1934; and the brake caliper 1928. The attachment to the wheel arm 1824 may be at the axle 1934 to allow the brake arm 1926 to swivel concentrically to the wheel and brake rotor, allowing relative rotation but not translation. The brake caliper 1928 may be an OEM or 3rd party brake caliper with standard mounting screws. The brake rotor may also a standard OEM or 3rd party unit that is part of the wheel assembly of the bike. Various rotor sizes, generally between 160 mm to 220 mm, can be accommodated with the use of standard OEM brake mount adapters, as is the case for telescopic forks. It is expected that 180-200 mm will be the most common rotor size.

The pivot attachment of the brake arm 1926 to the brake rod 1930 can be moved substantially, as mentioned above. The brake caliper 1928 mounts can be moved, as discussed further herein, as well as shifted radially to accommodate a large diameter brake rotor, although, alternatively, an OEM brake mount adapter can be used. The pivot at the axle should preferably not be moved, to ensure the brake rotates about the center of the wheel and so the brake rotor. If necessary it may be moved slightly, while not affecting the anti-dive significantly. The mechanical arrangement can change, for example, having a separate mechanical "shoulder" concentric to the axle on the wheel arm that serves at the pivot, instead of the axle 1934 itself.

The brake caliper 1928 may be an OEM or 3rd party part, shown in basic form in the drawing, with a portion of the hydraulic brake line shown. The brake caliper 1928 attaches to the brake arm 1926 with, for example, two screws. The brake caliper 1928 can be located at any point around the circumference of the brake rotor, limited only by practical considerations such as component clearances, and rotor size.

Furthermore, applying the front brake will not influence the fork behavior, due to near 0% anti-dive. Note that the anti-dive is traditionally calculated in reference to rider height and weight (rider center of gravity on the bike), and in the current embodiment anti-dive percentage is approximate for an average rider height and weight. Different riders may be accommodated, with slight adjustments suited to riders of, for example, 5 broad categories of height and weight, or for different bike geometries with varying centers of gravity.

The front suspension assembly in the present embodiment provides very minimal anti-dive behavior, such as about 10-40% anti-dive which is negligible to most riders. This is because it was not a design objective to provide anti-dive. This is done to provide a riding characteristic that is similar to traditional fork designs and familiar to riders, and to maximize sensitivity of the suspension to the ground. However, small changes in the brake linkage can allow for fine-tuning of the anti-dive behavior for riders (for examples riders of different height and weight), independently of other parameters (such as wheel path). This can be in the form of a rider adjustable knob to move the pivot positions—for example, to make the brake rod longer or shorter. It can also be in the form of a replacement part.

FIG. 25A depicts the side view of a first possible embodiment 2500a of the flexible link in accordance with the present disclosure. The flexible link 2500a may be formed as a single component with roughly three sections. The upper portion 2502a of the flexible link 2500a comprises an upper end of the flexible link 2500a which provides connection 2504a for connecting the flexible link 2500a to the main fork element 2512 of the front suspension system. The connection 2504a is depicted as a recesses or opening that can be fitted to a corresponding end of the main fork element and secured in place, possibly using adhesives, mechanical fasteners, welding or other techniques. The lower portion 2508a of the flexible link 2500a comprises a lower end of the flexible link 2500a opposite the connection 2504a. The lower portion 2508a comprises a pivot connection 2510a for connecting the flexible link 2500a to the wheel arm. A flexible member 2506a of the flexible link 2500a is arranged between the upper portion 2502a and the lower portion 2508a.

As described previously, the pivot connection 2510a may be a pivoting connection, which may comprise pins, rods, bolts or other similar components that pass through respective openings, which may include ball bearings in order to reduce friction. Further, as previously described, although the location of the pivot connection 2510a can be moved within the lower portion 2508a, the characteristics of the front suspension system is sensitive to the relocation of connection location. The flexible link connection 2504a may connect the flexible link 2500a to the main fork element 2512 in various possible ways. Although depicted as a separate element from the main fork element, the flexible link may be formed as a part of the main fork element or formed as separate elements and connected together. For example, the flexible link connection 2504a may be a welding or adhesive connection where the flexible link 2500a is directly welded to the main fork element 2512 or attached to the main fork element with an adhesive such as liquid/epoxy adhesives or glue. Alternatively, the flexible link 2500a may be secured to the main fork element 2512 at the flexible link connection 2504a with one or more bolts. Further, the flexible link connection 2504a may comprise a friction fit connection or a cooperating mechanical interface connection to the main fork element 2512. For example, flexible link connection 2504a and the main fork element 2512 may comprise corresponding/matching structures that are configured to accept the structures of the opposing component and are secured against one another once the components are in place. In some embodiments, the flexible link connection 2504a may also be a pivoting connection similar to the pivoting connection 2510a. It would be appreciated that any one of the above described connection methods are possible with regard to the flexible link connection 2504a, alternative, the flexible link connection 2504a may comprise a combination of the above described connection methods thereof. As is the case with the pivoting connection 2510a, the location flexible link connection 2504a may be moved within the upper portion 2502a of the flexible link 2500a. The flexible link connection 2504a may be arranged at the very end of the flexible link 2500a, as depicted in FIG. 25A, or moved towards the opposite end of the flexible link 2500a. It should be noted that the location of the flexible link connection 2504a may affect the performance of the front suspension system with regard to the ride characteristics as well as the movement of the flexible link 2500a.

It would be appreciated that the flexible member 2506a may be formed from various different flexible materials. For example, the flexible member may comprise carbon fiber, carbon fiber composites, one or more types of polymers such as a resilient polymer or composite polymer, titanium, aluminum or a combination thereof. It should be noted that any material could be used as long as the functions of flexible link 2500a can be fulfilled with regard to the performing the required movement of the linkage system. Further, the entire body (upper portion 2502a, flexible member 2506a, and lower portion 2508a) of the flexible link 2500a may be made from substantially the same or similar material with certain characteristics of the material in the area of the flexible member providing the desired flexibility to the link. The flexible link, and possibly the main fork elements may be formed for example from carbon fiber, hydro formed metals such as aluminum, or machined metals. The materials may include various additional components at certain locations, such as Kevlar, reinforcing components etc. Each of the upper portion 2502a, flexible member 2506a, and lower portion 2508a may be formed from different materials or formed from the same material as another component. That is, the upper and lower portion 2502*a* 2508*a* can for formed of one material with the flexible member 2506*a* formed of a different material, the upper portion 2502*a* and flexible member 2506*a* can be formed of one material with the lower portion 2508*a* formed of a different material, or the lower portion 2508*a* and flexible member 2506*a* can be formed of one material with the upper portion 2502*a* formed of a different material. In embodiments where the flexible member 2506*a* is formed from a different material to the upper portion 2502*a* or lower portion 2508*a*, the connection between the components of different materials may be a welding, adhesive, friction, mechanical, or bolted connection. The connection may also be a combination thereof. Further, in embodiments where a connection to both the upper portion 2502*a* and the lower portion 2508*a* is required, each of the connections may be of the same or different types of connection.

Although the flexible link 2500*a* has been described to comprise the upper portion 2502*a*, flexible member 2506*a*, and lower portion 2508*a*, it would be appreciated that the relative size, position, and location of these components in the flexible link 2500*a* can be subject to variation. One component may be larger, smaller, or of the same size as one or more other components. Each of the components may have the same dimensions but may also have the same or different shapes as another component. Further, there is no strict restriction on the shape, including the cross-sectional shape or structure of each component or entire body of the flexible link 2500*a*. For example, a portion of the flexible link, such as the flexible member 2506*a*, may have a different cross-sectional shape from another component such as the upper portion 2502*a* and/or lower portion 2508*a*. Further, a portion of the flexible link 2500*a* may be formed with one or more features allowing the flex of the flexible link. An example of which is depicted in FIG. 25A, in which the flexible member 2506*a* is relatively thinner than the upper and lower portions 2502*a* 2508*a* and in the form of a pinched cylinder. Such a structure may facilitate the flexing motion of the flexible link 2500*a* and better accommodate the range of motions required to be performed by the linkages. As such, it should be apparent that the shape and size of the flexible member 2506*a* may affect the durability and movement range of the flexible link 2500*a*.

FIGS. 25B and 25C depict the rear and side views of another possible embodiment 2500*b* of the flexible link. According to this embodiment, the upper portion 2502*b* is attached to the main fork element 2512 and formed from the same material as the lower portion 2508*b* which comprises the pivot connection 2510*b* to the wheel arm. Although the upper portion 2502*b* and the lower portion 2508*b* are depicted as substantially rectangular blocks or blocks with rounded faces roughly equal in size, alternative shapes and sizes are also possible. The flexible member 2506*b* may be formed from a different material from the upper and lower portions 2502*b*, 2508*b*. The flexible member 2506*a* may comprise carbon fiber, a carbon fiber composite, one or more types of polymers such as a resilient polymer or composite polymer, titanium, aluminum, among other materials or a combination thereof. The flexible member may include additional strengthening elements such as Kevlar, or reinforcing members. The upper portion 2502*b* and the bottom portion 2508*b* may be joined together by the flexible member 2506*b*. In particular, as shown in FIGS. 25B and 25C, the upper portion 2502*b* and the lower portion 2508*b* may comprise a grooved channel, concave, or other structural features on the end that allows the flexible member to be attached between the upper and lower portions. The features are depicted as a groove in the upper and lower portions and corresponding profiled end on flexible member 2506*a*. The flexible member 2506*a* may be substantially a flat sheet such that it can be directly received by or inserted into the channel/grove of the upper portion 2502*b* and the lower portion 2508*b*. Further, the flexible member 2506*a* may be a sheet having a rectangular, circular or oval cross-section. The flexible member 2506*b* may also comprise structural features that corresponds to the receiving features of the upper portion 2502*b* and the lower portion 2508*b* at the ends for connecting to the other components, as shown in FIGS. 25B and 25C. Although not shown in the figure, the flexible member 2506*b* may be additionally or alternatively secured by one or more bolts and/or adhesives at one or both connections. Further, although the upper portion 2502*b* and the lower portion 2508*b* are depicted with concaving structural features for receiving the flexible member 2506*b*, the opposite connection where the flexible member 2506*b* comprises concaving features and the upper portion 2502*b* and the lower portion 2508*b* comprises protruding features are also possible. Further, although the above is described with relations to both the upper and lower connection, it would be appreciated each of the above methods may be applied independently of other methods and for either one or both connections.

The upper portion 2504*b* of may be secured to the main fork element using one or more techniques including for example, adhesives, welding, mechanical fasteners, cooperating physical features, etc.

FIG. 25D depicts a flexible link 2500*d* that is substantially similar to that depicted in FIGS. 25B and 25C. The flexible link 2500*d* includes a lower portion 2508*d* connected to a flexible member 2506*d*. However, in contrast to the flexible link 2500*b* in which the flexible member 2506*b* is attached to an upper portion 2502*b* that is formed separately from the main fork element, the flexibly link 2500*d* attached the flexible member 2506*d* directly to the main fork element 2512.

Figure 26B:
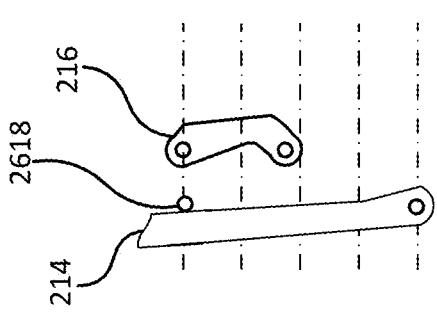
FIGS. 26A and 26B depict the relative arrangement and size of components of a suspension system.
Figure 26A:
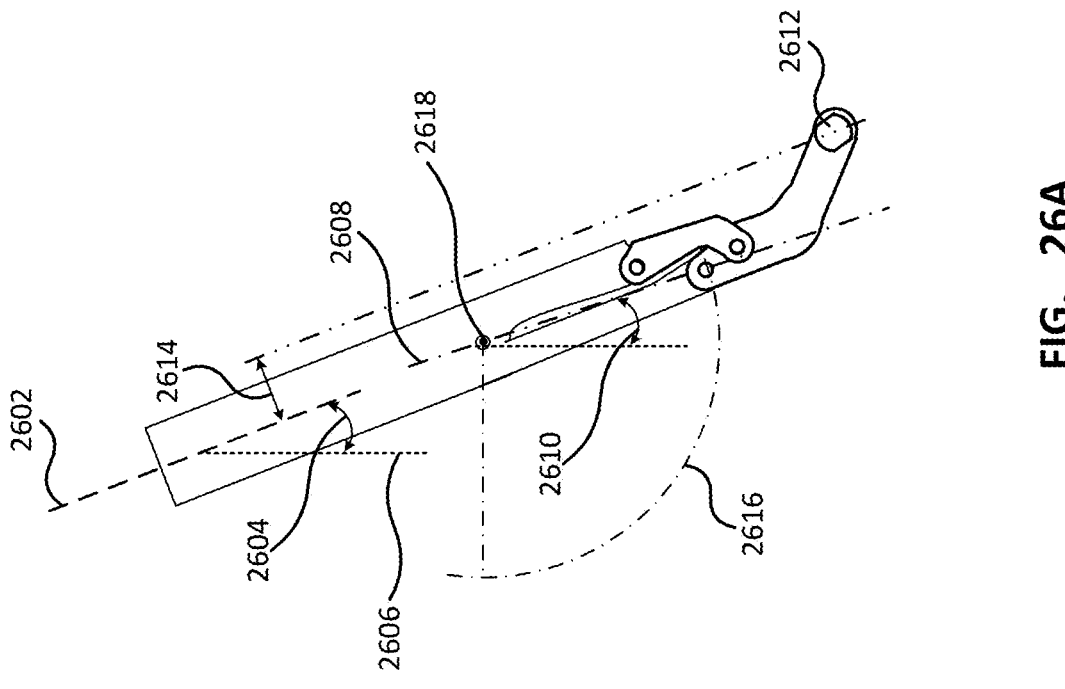

FIG. 26A depicts certain angles and distances of the fork suspension. The fork suspension described above provides a compact linkage that allows the flexible link and lower linkage arms to be substantially in line with the main fork support in the extended position. It will be appreciated that the linkages do not need to be precisely in line to provide the compact aesthetic. For example, the main fork tube may have a longitudinal axis 2602 which may be approximately parallel to the steering axis. The longitudinal axis 2602 may be at some angle 2604 relative to the vertical 2606. For example, the angle 2604 may be approximately 25°. As depicted in FIG. 26A, an axis of the flexible link 2608 may be defined between an imaginary virtual pivot point 2618 about which the lower pivotal connection of the flexible link rotates and the lower pivot point of the flexible link 1908. The axis 2608 can be arranged at an angle 2610 relative to vertical that is approximately the same as the angle 2604 of the longitudinal axis of the main fork support. For example, the angle 2610 may be within 15° of the angle 2604 of the longitudinal axis, more particularly the angles may be within 7.5° of each other, or more particularly within 5° of each other. It will be appreciated that the closer the angles are to each other, the more compact the fork design may appear. As the front suspension transitions from the extended position to the compressed position, or vice versa, the flexible link 2608 provides an arcuate motions to the pivotal movement of the wheel arm. In particular, as the front suspension transitions to the compressed position, the flexible link 2608 rotates clockwise around the imaginary pivot point 2618. As the front suspension returns to the extended position, the movement is reversed such the flexible link 2608 rotates counter-clockwise around the imaginary pivot point 2618. More particularly, the arcuate motion path 2616 of the flexible link 2608 can be described as tracing an imaginary circle formed with a centroid at the imaginary pivot point 2618 and an outer edge at the lower pivot point of the flexible link 2608. A location 2612 of the support opening of the wheel arm may be adjusted to vary an offset distance 2614 between the support opening location and the main fork support, or the centerline longitudinal axis 2602 of the main fork support. For example, the offset distance 2614 may be between 0 cm and 10 cm, or more particularly between 1 cm and 5 cm. As the front suspension system moves between the extended position and the compressed position, the flexible link, lower linkage arm, and the wheel arm may move such that that the movement of the support opening of the wheel arm is approximately parallel to the longitudinal axis 2602 of the main fork support. Alternatively, as the front suspension system moves between the extended position and the compressed position, the flexible link, lower linkage arm, and the wheel arm may follow and arced movement such that that the movement of the support opening of the wheel arm is approximately non-parallel to the longitudinal axis 2602 of the main fork support.

FIG. 26B depicts relative sizes of the linkage arms. While the flexible link 1908 and lower linkage arm 1916 may have varying dimensions depending upon the particular application, the lower linkage arm 1916 is smaller than the flexible link 1908, or more particularly a distance between the pivot point connections of the lower linkage arm is less than a distance between the imaginary pivot point 2618 to the pivot connection of the flexible link 1908. The lower linkage arm may be approximately ¾ the size of the flexible link, or more particularly the lower linkage arm may be less than ½ the size of the flexible link.

The angles and sizes of the components described above with reference to FIGS. 26A and 9B provide for a compact linkage suspension. It will be appreciated that other factors may contribute to the compact appearance of the fork, including for example the size of the linkage arms, and coloring/decals/engravings.

Figure 27:
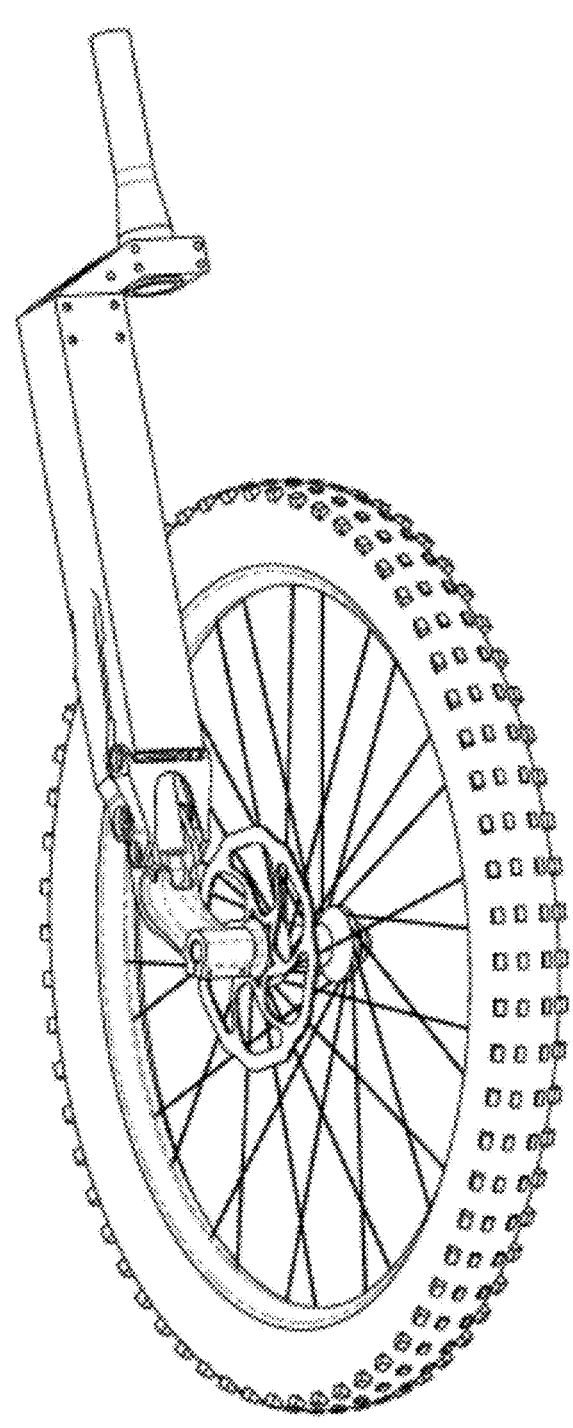
FIG. 27 shows a front suspension system having a single-sided fork design.

FIG. 27 shows a front suspension system having a single-sided fork design. In this embodiment, a "single sided" version of the fork (2700) is shown. This can have the benefit of reduced weight and bill of material cost, for a lighter duty version of the fork. For the design to accommodate the single sided version, the floater brake linkage (not shown) is modified to fit within the more constrained space of the single main tube which also houses the shock absorber. The modification may be for component clearances only. A special axle and wheel hub may be used to withstand the increased loading.

The above has described a front suspension system for bicycles such as mountain bikes in which suspension travel in the range of 80-100 mm or greater is desired. It is possible to provide a similar design of a front fork suspension with less travel.

Figure 28:
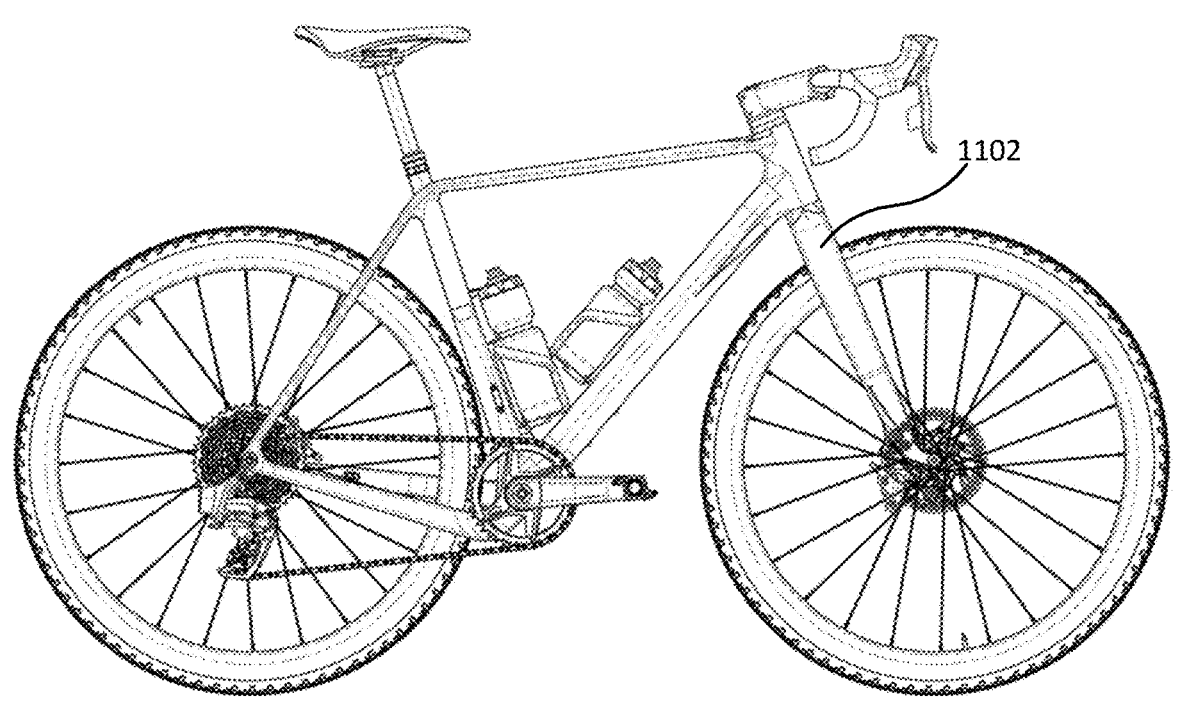
FIG. 28 depicts a bicycle using a further embodiment of a flexible link front suspension.

FIG. 28 depicts a bicycle with a further embodiment of the front suspension. The type of bicycle 2800 depicted is similar to a mountain bike but is often referred to as a gravel bike. These types of bicycles typically do not have a rear suspension, or have 5-20 mm of rear suspension in the form of frame flex, and a rigid front fork or front suspension with less travel. The front suspension 2802 uses a flexible linkage design similar to that described above but provides less travel. The travel may be approximately 20-60 mm.

Figure 29A:
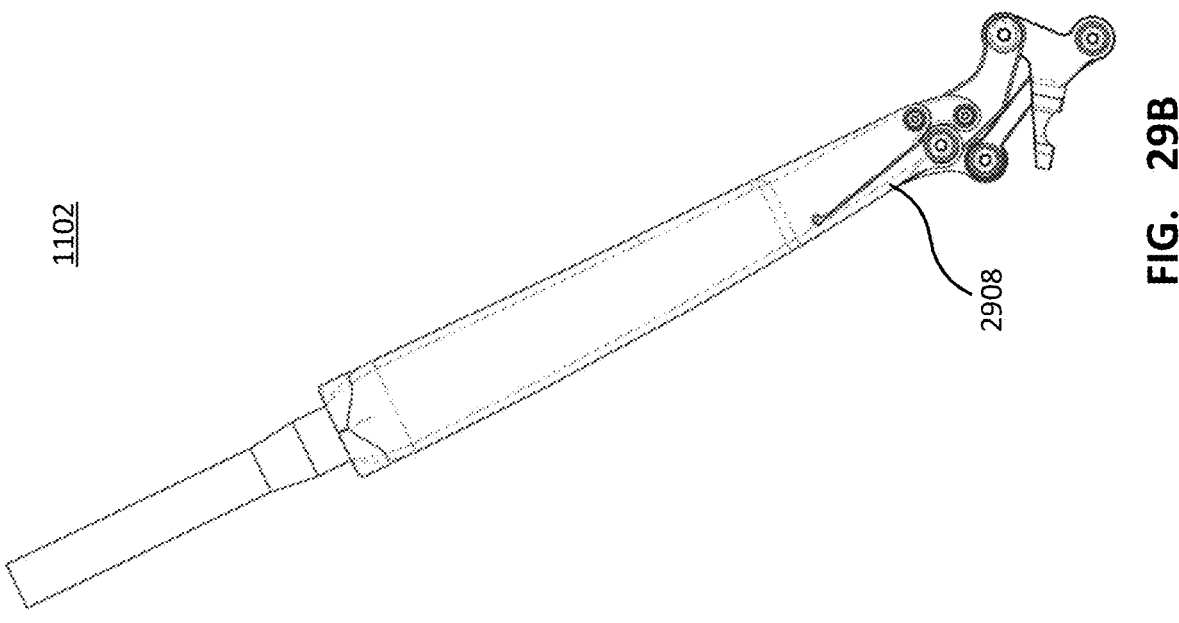
FIGS. 29A and 29B depict the flexible link front suspension of FIG. 28.
Figure 29B:
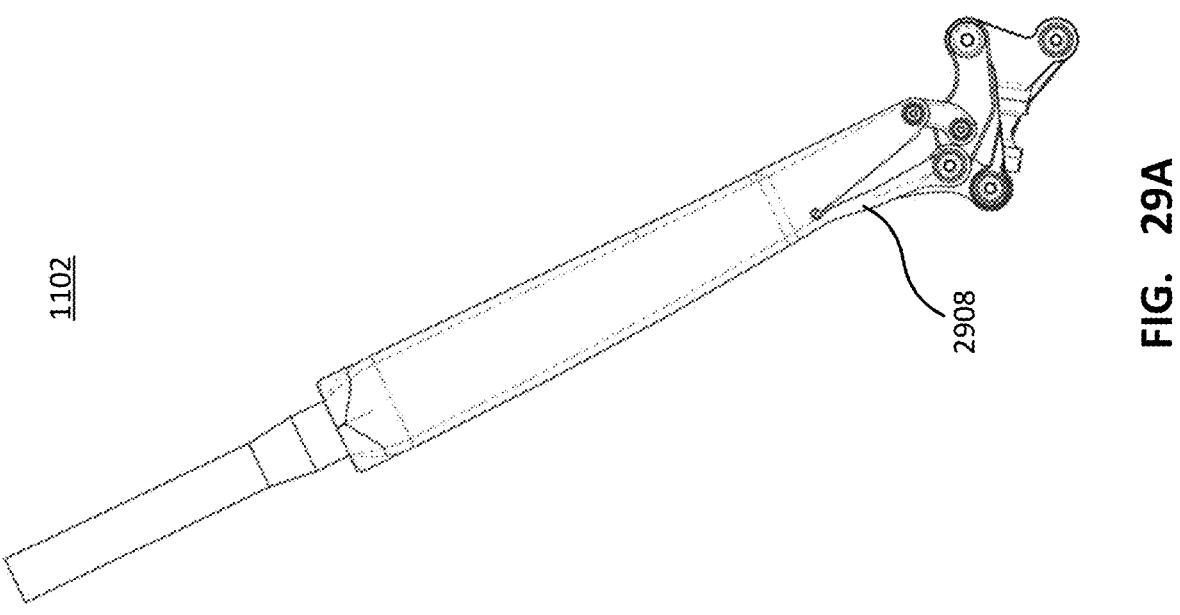

FIGS. 29A and 29B depict the front suspension 2802 in a compressed and extended state respectively. The suspension 2802 is similar to that described above, however the flexible link 2908 may provide less travel to the wheel.

The above has described various front suspensions that use a combination of a flexible link and rigid linkages that are pivotally attached. Depending upon the requirements of the suspension, including an amount of travel, shock absorption requirements, etc., it is possible to replace one or more of the rigid links that are pivotally attached by respective flexible links.

Figure 30:
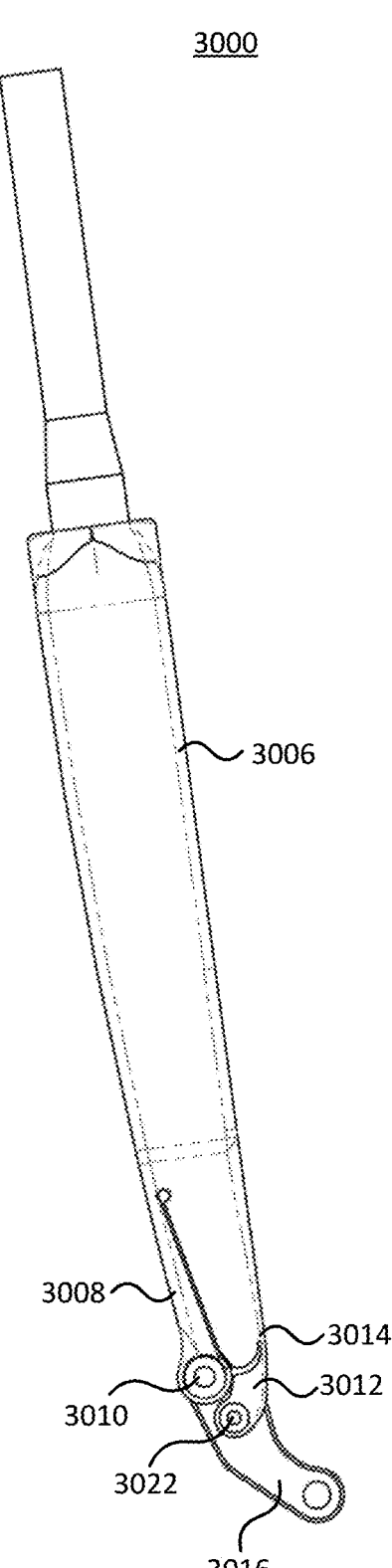
FIGS. 30-32 depict embodiments of front suspensions using multiple flexible links.

FIG. 30 depicts a front suspension using multiple flexible links. The suspension is similar to those described above; however the rigid lower link arm and the pivotal connection to the main fork element is replaced by a flexible lower link 3012 and flexible connection 3014. The main fork element 3006, the first flexible link 3008, the flexible lower link 3012 and the flexible pivot-like connection 3014 between the flexible lower link and main fork element may be formed as a single component, or multiple components bonded or assembled together into a single component. The rigid wheel support arm 3016 is pivotally connected to each of the flexible link 3008 and the flexible lower link 3012 at respective connection points 3010, 3022. Operation of the suspension is substantially the same as described above, however the rotation of the flexible lower link is about a virtual pivot point provided by the flexible connection 3012 rather than by the pivotal connection described above with the rigid lower arm.

The flexible links 3008, 3012 may serve as the primary spring force, as well as providing some damping from the material itself, which may include for example Kevlar reinforcing in a carbon composite layup, which may be used in any of the embodiments described above. The fork may be supplemented by a damper unit, as well as a separate air/coil/elastomer spring. Different layups of carbon fiber and/or Kevlar or other materials could also be used for different stiffness, suiting various rider weights.

Figure 31:
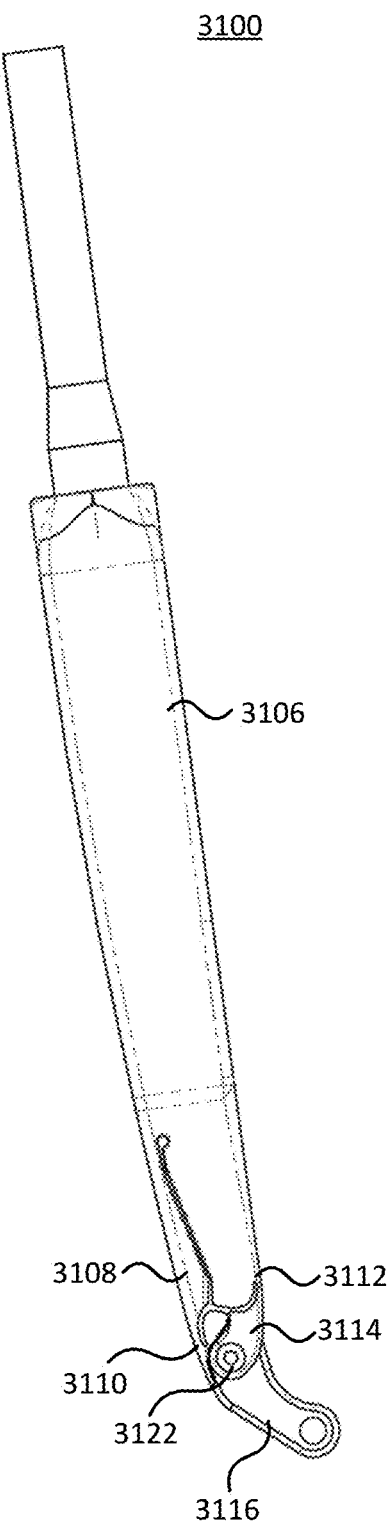

FIG. 31 depicts a front suspension using multiple flexible links. The suspension 3100 is similar to those described above; however the rigid lower link arm and the pivotal connection to the main fork element is replaced by a flexible lower link 3112 and flexible connection 3114 and the pivotal connection between the flexible link 3108 and rigid wheel support arm is replaced by a flexible connection 3110 between the flexible link 3108 and a flexible wheel support 3116. The main fork element 3106, the first flexible link 3108, the flexible lower link 3112, the flexible pivot-like connection 3114 between the flexible lower link and main fork element and the flexible wheel support arm 3116 and flexible connection to the flexible link 3108 may be formed as a single component, or multiple components bonded or assembled together into a single component. The flexible wheel support arm may be pivotally connected to the flexible lower link 3112 at pivot connection 3122.

Figure 32:
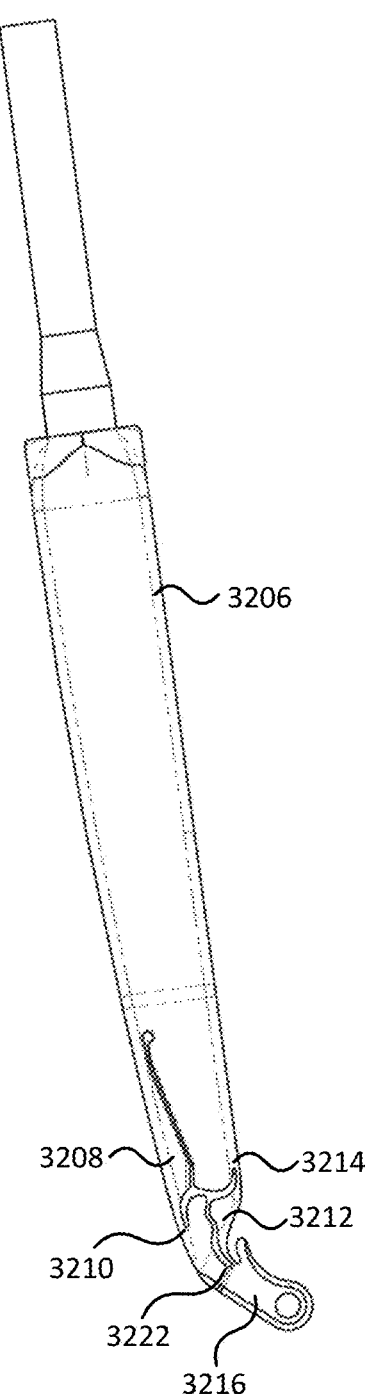

FIG. 32 depicts a front suspension using multiple flexible links. The suspension 3200 is similar to those described above; however all of the rigid links and pivot connections are replaced with flexible links and flex connections. In particular, the rigid lower link arm and the pivotal connection to the main fork element is replaced by a flexible lower link 3212 and flexible connection 3214 and the pivotal connection between the flexible link 3208 and rigid wheel support arm is replaced by a flexible connection 3210 between the flexible link 3208 and a flexible wheel support

3216. Further, the flexible lower link 3212 is connected to the flexible wheel support 3216 by a flexible connection 3222. The main fork element 3206, the first flexible link 3208, the flexible lower link 3212, the flexible pivot-like connection 3214 between the flexible lower link and main fork element, the flexible wheel support arm 3216 and flexible connection 3210 to the flexible link 3208 and the flexible connection 3222 to the flexible lower link 3212 may be formed as a single component, or multiple components bonded or assembled together into a single component. This design with all pivots point connections replaced with flexible connections can provide for a reduced suspension travel, of for example 10-20 mm, while still maintaining suitable fatigue lifecycle of the flexible connections. To improve the fatigue lifecycle, the flexible links may be lengthened, while still maintaining a desired wheel path through the travel, so that each flexible connection requires a smaller flex angle for the particular wheel travel. A flex angle of the flexible connection that can provide suitable suspension characteristics while still achieving an acceptable fatigue lifecycle may be for example up to approximately 7.5 degrees.

Figure 33:
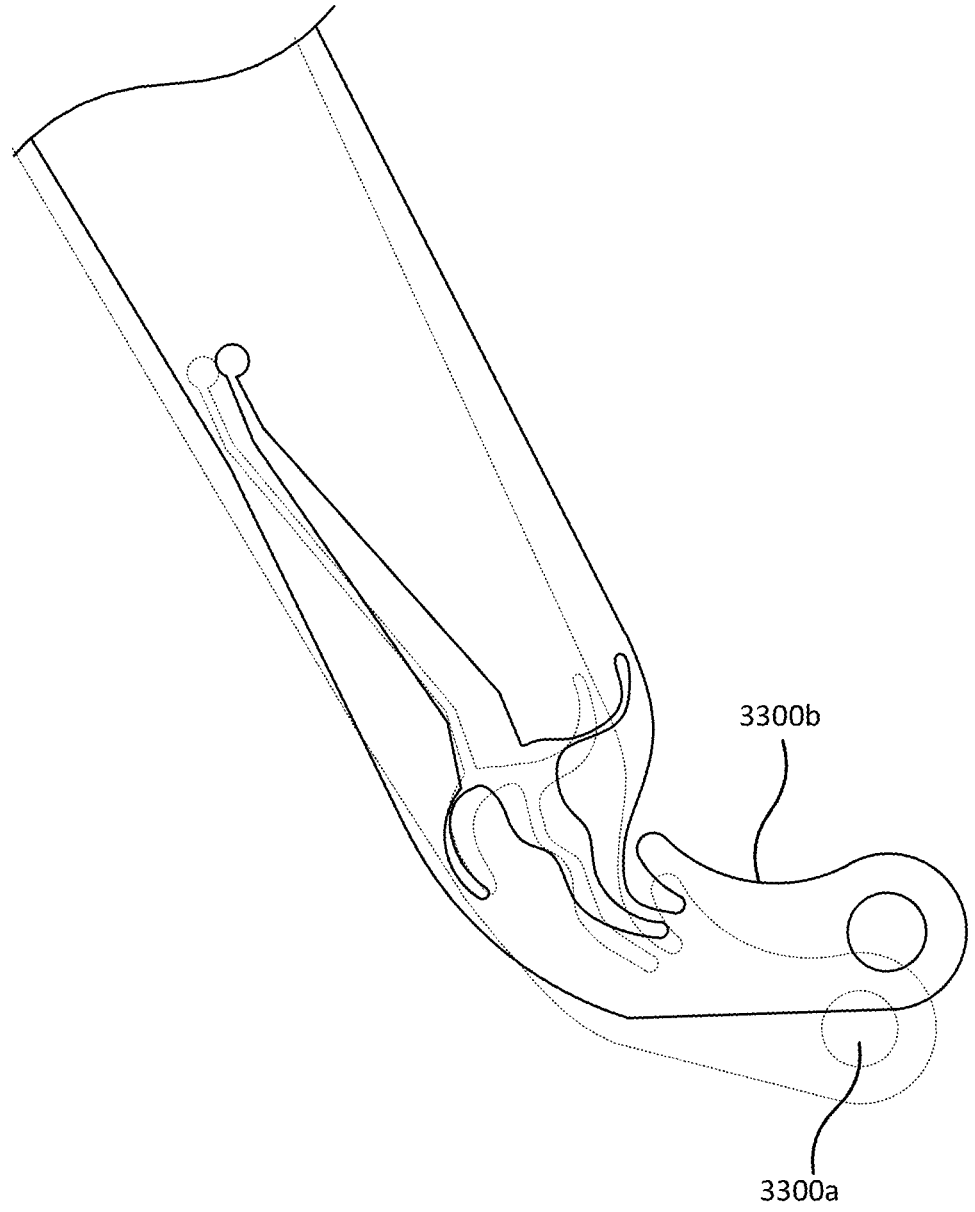
FIG. 33 depicts motion of the front suspension of FIG. 32.

FIG. 33 depicts the movement of the front suspension of FIG. 32. The extended state of the suspension 3300a is depicted in stippled lines while the compressed state 3300b is depicted in solid lines. The movement of the suspension is similar to that described above, however, the pivotal connections pivot about virtual pivot points provided by the respective flexible connections.

Although the overall travel of the suspension may be reduced or limited by replacing one or more rigid links and pivotal connections with corresponding flexible links and flexible connections, there may be other benefits such as reduced weight and/or price which may make one or more of the front suspension embodiments of FIGS. 18-33 particularly well suited for an application. It will be appreciated that other factors may contribute to the compact appearance of the fork, including for example the size of the linkage arms, and coloring/decals/engravings. The above has described a front suspension for a bike. It will be appreciated that the fork can be applied to similar devices such as motorcycles, unicycles, scooters, snowmobiles, e-moto, etc. In addition to providing a suspension fork for a vehicle. It is contemplated that any part of any aspect or embodiment discussed in this specification can be implemented or combined with any part of any other aspect or embodiment discussed in this specification.

It will be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

What is claimed is:

1. A front suspension for a bike capable of moving between an extended position and a compressed position, comprising:

a first main fork leg adapted for rotatably coupling the front suspension to a head tube of the bike, the first main fork leg having a longitudinal axis;

a first linkage connected to the first main fork leg comprising:

a wheel arm comprising a support opening for supporting a wheel of the bike;

an upper link arm having a first end portion movably coupled to the first main fork leg at an upper link connection point and a second end portion pivotally coupled to the wheel arm at a first connection point arranged at an end of the wheel arm opposite the support opening, an upper link axis defined between the first end portion and the second end portion arranged at an angle within 30° of the longitudinal axis of the first main fork leg when the front suspension is in the extended position; and a lower link arm having a first end portion pivotally coupled to the first main fork leg at a lower link connection point below the upper link connection point and a second end portion pivotally coupled to the wheel arm at a second connection point arranged between the support opening and the first connection point along a direction generally perpendicular to the longitudinal axis when the front suspension is in the extended position; and a shock absorber configured to dampen vertical movement of the support opening, wherein the first main fork leg, upper link arm and lower link arm are arranged to be approximately co-linear when viewed from a side to provide a low-profile appearance when the front suspension is in the extended position.

2. The front suspension system of claim 1, wherein the upper link arm is pivotally coupled to the first main fork leg at the upper link connection point.

3. The front suspension system of claim 1, wherein the upper link arm comprises a flexible link comprising a flexible member, the flexible link coupled to the first main fork support.

4. The front suspension system of claim 1, wherein the upper link axis is arranged at an angle within 5° of the longitudinal axis of the first main fork leg when the front suspension is in the extended position.

5. The front suspension system of claim 1, wherein a distance between the first and second end portions of the lower link arm is less than ¾ a distance between the first and second end portions of the upper link arm.

6. The front suspension system of claim 1, wherein a distance between the first and second end portions of the lower link arm is less than ½ a distance between the first and second end portions of the upper link arm.

7. The front suspension system of claim 1, wherein the support opening is offset in front of a center longitudinal axis of the head tube by between 0 cm and 10 cm.

8. The front suspension system of claim 1, wherein the support opening is offset in front of a center longitudinal axis of the head tube by between 1 cm and 5 cm.

9. The front suspension system of claim 1, wherein the upper link arm, lower link arm and wheel arm are arranged to provide movement of the support opening of the wheel arm that is approximately parallel to the longitudinal axis of the first main fork leg when the front suspension system moves between the extended position and the compressed position.

10. The front suspension system of claim 1, wherein the upper link arm, lower link arm and wheel arm are arranged to provide an arced movement of the support opening of the wheel arm that is non-parallel to the longitudinal axis of the first main fork leg when the front suspension system moves between the extended position and the compressed position.

11. The front suspension system of claim 1, wherein the shock absorber is at least partially housed within the first main fork leg.

12. The front suspension system of claim 11, wherein the shock absorber is connected to the first main fork leg at the pivotal connection to the upper link arm and is connected to the wheel arm at a location between the pivotal connections of the upper link arm and lower link arm.

13. The front suspension system of claim 1, further comprising:

a second main fork leg; and a second linkage connected to the second main fork leg comprising:

a second wheel arm comprising a support opening;

a second upper link arm having a first end portion pivotally coupled to the second main fork leg at an upper link connection point and a second end portion pivotally coupled to the second wheel arm at a connection point arranged at an end of the second wheel arm opposite the support opening; and a second lower link arm having a first end portion pivotally coupled to the second main fork leg at a lower link connection point below the upper link connection point and a second end portion pivotally coupled to the second wheel arm between the support opening and the connection point of the second upper link arm.

14. The front suspension system of claim 13, wherein the shock absorber comprises:

a damper at least partially housed within the first main fork leg to dampen the vertical movement of the support opening;

an air spring unit at least partially housed within the second main fork leg to provide a returning spring force.

15. The front suspension of claim 1, wherein a location of the pivotal connection between the wheel arm and the lower link arm is adjustable.

16. The front suspension of claim 15, wherein the pivotal connection between the wheel arm and the lower link arm comprises a bushing arranged in one of the wheel arm and the lower link arm, the bushing having an offset hole such that flipping the bushing adjusts the location of the pivotal connection.

17. The front suspension of claim 15, wherein a location of the support opening of the wheel arm is adjustable to vary a distance between the support opening and a centerline of the first main fork leg.

18. A bike comprising a front suspension system of claim 1.

19. The front suspension system of claim 1, wherein the upper link axis is arranged at an angle within 15° of the longitudinal axis of the first main fork leg when the front suspension is in the extended position.

* * * * *